(12) United States Patent
Lawton et al.

(10) Patent No.: US 11,588,380 B2
(45) Date of Patent: Feb. 21, 2023

(54) POWER GENERATOR

(71) Applicant: Seabourne Solutions, LLC, Landenberg, PA (US)

(72) Inventors: John A. Lawton, Landenberg, PA (US); Alan P. Dutcher, West Deptford, NJ (US)

(73) Assignee: Seabourne Solutions, LLC, Landenberg, PA (US)

( * ) Notice: Subject to any disclaimer, the term of this patent is extended or adjusted under 35 U.S.C. 154(b) by 170 days.

(21) Appl. No.: 17/056,399

(22) PCT Filed: Sep. 23, 2019

(86) PCT No.: PCT/US2019/052383
§ 371 (c)(1),
(2) Date: Nov. 17, 2020

(87) PCT Pub. No.: WO2021/061085
PCT Pub. Date: Apr. 1, 2021

(65) Prior Publication Data
US 2021/0143711 A1    May 13, 2021

(51) Int. Cl.
*H02K 11/04* (2016.01)
*H02K 11/20* (2016.01)
(Continued)

(52) U.S. Cl.
CPC ............ *H02K 11/046* (2013.01); *H02K 1/12* (2013.01); *H02K 1/22* (2013.01); *H02K 11/20* (2016.01); *H02M 7/06* (2013.01)

(58) Field of Classification Search
CPC .... H02P 9/00; H02P 9/008; H02P 9/46; H02P 9/48; H02K 1/00; H02K 1/12; H02K 1/22;
(Continued)

(56) References Cited

U.S. PATENT DOCUMENTS 2,689,327 A   9/1954   Haas
3,058,252 A   10/1962  Matusche
(Continued)

FOREIGN PATENT DOCUMENTS

CN   101013817 A   8/2007
CN   103812366 A   5/2014
(Continued)

OTHER PUBLICATIONS

Bradfield, Mike, "Improving Alternator Efficiency Measurably Reduces Energy Costs." Remy Inc., (2008): 1-32.
(Continued)

*Primary Examiner* — Tran N Nguyen
(74) *Attorney, Agent, or Firm* — Mendelsohn Dunleavy, P.C.; Steve Mendelsohn

(57) ABSTRACT

In certain embodiments, a power generator has a rotor, a stator, a bridge rectifier, and one or more capacitors. The stator has one or more inductors that generate phased AC power when the rotor moves relative to the stator. The bridge rectifier, which is connected between the inductors and two output terminals of the power generator, converts the phased AC power into a DC output current at the two output terminals. The capacitors are connected to the inductors to electro-magnetically resonate when the rotor moves relative to the stator to increase peak amplitudes of the phased AC power and thereby increase the level of the DC output current. In certain applications, the increased DC output current enables the power generator to charge a battery faster and more efficiently.

23 Claims, 35 Drawing Sheets

(51) Int. Cl.
*H02K 1/12* (2006.01)
*H02K 1/22* (2006.01)
*H02M 7/06* (2006.01)

(58) Field of Classification Search
CPC ...... H02K 11/00; H02K 11/04; H02K 11/046; H02K 11/20
See application file for complete search history.

(56) References Cited

U.S. PATENT DOCUMENTS

| | | | |
|---|---|---|---|
| 4,088,108 | A | 5/1978 | Hager |
| 4,325,350 | A | 4/1982 | Bauer et al. |
| 5,119,010 | A | 6/1992 | Shirata et al. |
| 5,444,357 | A | 8/1995 | Illingsworth |
| 5,719,757 | A | 2/1998 | Beyerlein et al. |
| 6,018,200 | A | 1/2000 | Anderson et al. |
| 6,075,716 | A | 6/2000 | He et al. |
| 6,118,678 | A | 9/2000 | Limpaecher et al. |
| 6,215,679 | B1 | 4/2001 | Yamane et al. |
| 6,703,718 | B2 | 3/2004 | Calley et al. |
| 7,053,590 | B2 | 5/2006 | Wang |
| 7,176,658 | B2 | 2/2007 | Quazi et al. |
| 9,444,362 | B2 | 9/2016 | Hartmann et al. |
| 9,929,636 | B2 | 3/2018 | Shinomoto et al. |
| 2006/0006847 | A1 | 1/2006 | Chen |
| 2008/0013351 | A1 | 1/2008 | Alexander |

FOREIGN PATENT DOCUMENTS

| | | | |
|---|---|---|---|
| CN | 208589873 | * | 3/2019 |
| DE | 4430394 | A1 | 1/1995 |
| EP | 0212576 | A2 | 3/1987 |
| EP | 1643626 | A2 | 4/2006 |
| GB | 2193394 | A | 2/1988 |
| JP | 2003134767 | A | 5/2003 |
| JP | 4262299 | * | 5/2009 |
| JP | 4412839 | * | 2/2010 |
| KR | 19980033551 | * | 9/1998 |
| KR | 10-2004-0021707 | A | 3/2004 |
| KR | 10-2015-0066378 | A | 6/2015 |
| RU | 2315420 | C1 | 1/2008 |
| RU | 98652 | U1 | 10/2010 |
| WO | 0233816 | A2 | 4/2002 |

OTHER PUBLICATIONS

International Search Report and Written Opinion for corresponding International application No. PCT/US2019/052383; dated Aug. 6, 2020 (14 pages).

Written Opinion of the International Preliminary Examining Authority for corresponding International application No. PCT/US2019/052383; dated Oct. 1, 2020 (7 pages).

* cited by examiner

POWER GENERATOR

CROSS-REFERENCE TO RELATED APPLICATIONS

This application claims the benefit of the filing date of PCT application No. PCT/US19/52383, filed on 23 Sep. 2019, the teachings of which are incorporated herein by reference in their entirety.

BACKGROUND

The present disclosure relates generally to electronics and, more particularly but not necessarily exclusively, to electronic systems for harvesting potential energy from power sources.

Many power sources are capable of producing potential energy at a voltage that is below the acceptance voltage of a power collection system, such as a power grid or a power storage system such as a battery. That lower-than-acceptance-voltage potential energy is untapped. For example, rectified alternator output to charge a battery is known in the art. In such systems, when the peak-to-peak AC voltage from the alternator is rectified to DC using a full-wave bridge rectifier, a DC voltage is generated. When this DC voltage exceeds the battery acceptance voltage, current flows from the rectifier to the battery, thereby charging the battery. When the DC voltage generated through the rectifier is below the battery acceptance voltage, there is no current and the battery is not charged.

In the context of this disclosure, the terms "speed" and "rpm" (i.e., revolutions per minute) may sometimes be interchanged. It is understood that most power generating systems are rotational in practice and have a rotor. The rotor is usually an electro-magnet or a permanent magnet whose rotation moves magnetic fields relative to a stator. As such, low-speed operation would be synonymous with low-rpm operation. Some power generating systems, for example a linear generator, do not have rotation and therefore no rpm, but it would have speed of operation and usually some cycle of, for example, up and down for wave-driven systems. This cyclical motion also moves magnetic fields relative to a stator. In the context of this disclosure, the term "rotor" encompasses both the rotary relative motion of an alternator and the cyclical relative motion of a linear generator, where alternators and linear generators are two types of power generators.

In a particular example of an alternator, conventional battery-charging systems are not able to capture potential energy for charging the battery during low-speed or moderate-speed conditions. For example, a conventional alternator in low-rpm conditions generates low-voltage AC, which is rectified to low-voltage DC. However, when the DC voltage is less than the battery acceptance voltage, no current flows from the alternator to the battery. The energy remains untapped potential energy, and the low-rpm alternator simply idles.

Even in mid-speed conditions, some energy potential is not harvested by the energy collection system. In mid-speed conditions, the AC voltage is higher and the rectified AC-to-DC voltage is higher, but the DC voltage has significant ripple. Some of the rippled DC voltage is higher than the battery acceptance voltage at the peaks in the voltage ripple. During such periods, current flows to the battery, and therefore the potential energy is harvested as useful stored energy. However, when the valleys of the rippled. DC voltage are below the acceptance voltage of a battery storage system, no current flows from the alternator to the battery, and the energy remains untapped potential energy.

The acceptance voltage of an energy storage or usage system, such as a battery bank or a power grid, may vary over time. For example, as a battery is charged, the voltage increases, and therefore the battery acceptance voltage increases. Or, for example, during peak power periods, a power grid may experience low voltage or brownouts. During such periods, the grid acceptance voltage is lower. A lower grid acceptance voltage makes it easier for low-voltage energy collection systems to release the potential energy into the grid. But a higher battery acceptance voltage makes it more difficult for low-voltage energy collection systems to provide the potential energy to the battery.

It is within the nature of conventional designs that some power generating systems generate AC output or rippled DC output. Many magneto-electric systems such as alternators, oscillating linear generators, induction generators, and the like are examples. The driving forces (such as wind, waves, engines, etc.) that drive these AC output or rippled DC output power generator systems, may have their own inherent oscillations, but the AC output or rippled DC output power generating systems impose a designed-in oscillation that creates the AC output or the DC voltage output. And, some of this designed-in oscillation voltage output potential is too low to be captured by power collection systems that have a higher acceptance voltage.

Three-phase alternators are more commonly used. However, single-phase and two-phase alternators are manufactured and sold. Also, alternators with greater than three phases are manufactured and sold.

"Improving Alternator Efficiency Measurably Reduces Energy Costs" by Mike Bradfield (Remy Inc., 2008), the teachings of which are incorporated herein by reference, describes the efficiency losses associated with alternators. As indicated by FIG. 23 of that report (reproduced (reproduced as FIG. 3 in this disclose, all losses in an alternator are graphed as a function of alternator rpm. The higher the rpm, the greater the losses.

U.S. Pat. No. 6,703,718 Calley et al. teaches a method of boosting alternator output voltage above a battery acceptance voltage by perturbing the alternator inductive circuitry using active components such as MOSFETs adapted to momentarily ground the inductors, increasing current flow and magnetic field flux, and then removing that ground, inducing field collapse and voltage spikes. Portions of those voltage spikes are higher than the acceptance voltage of the energy storage system, thereby tapping some of the potential energy from the modified alternator.

Some related art patents deal with EMI filtering and other filtering to reduce resonances, ripple, and harmonics from affecting three-phase power sources such as a utility. Such filtering is designed for a narrow range of fixed utility frequencies, for example, 50 Hz or 60 Hz. U.S. Pat. No. 6,075,716 (He et al.) is drawn toward EMI filtering for an existing three-phase power source. U.S. Pat. No. 5,444,357 (Illingsworth) employs a voltage-boosting circuit. U.S. Pat. No. 6,118,678 (Limpaecher et al.) is drawn toward filtering for an existing three-phase power source. U.S. Pat. No. 5,719,757 (Beyerlein et al.) is drawn toward harmonic reduction for an existing three-phase power source. US 2008/0013351 (Alexander) is drawn toward converting existing three-phase power source power for powering a motor. CN 101013817A is drawn toward filtering three-phase AC usage from a wind generator. CN 1038123668A (Yang et al.) is drawn toward filtering three-phase power usage from a utility. DE 4430394A1 (Gekeler) employs an active component boost means to convert three-phase power from a utility to DC power. EP 1,643,626 A2 (Takeda et al.) is drawn toward a three-phase power filtering circuit that reduces harmonics, feeding back to a utility, and generates DC power. U.S. Pat. No. 9,444,362 (Hartmann et al.) is drawn toward a three-phase power circuit that smooths and generates DC power. U.S. Pat. No. 9,929,636 B2 (Shinomoto et al.) is drawn toward a DC power supply that smooths and boosts incoming three-phase AC using active components.

KR 20150066378A (Roh et al.) utilizes a resonant circuit when converting three-phase AC to DC. The power factor is improved.

Some related art patents deal with converting an existing power source to a power output that is useful in welding. RU 98,652 is drawn toward an apparatus having an output useful for DC welding. RU 2,315,420 is drawn toward an apparatus with shunt capacitors for altering power factor and having an output useful for welding.

FIG. 1 is a block diagram of an example prior-art battery-charging system 100 implemented with a driven alternator 120, a full-bridge diode rectifier 130, and a battery 160.

FIG. 2 graphically shows signals associated with the conventional battery-charging system 100 of FIG. 1. In FIG. 2, the X-axis represents time (sec), and the Y-axis represents voltage or amperage. The dotted curve at the top of FIG. 2 is a representation of the DC voltage of the battery 160 as measured between connections DC+ and DC−. The oscillating curve represents a single AC phase, for example, L1 relative to battery ground DC−, peak-to-peak voltage (multiplied by two). When the AC voltage is multiplied by two, it approximates the amplitude of the rectified AC or DC voltage that charges a battery.

As the alternator 120 begins rotation, the frequency and amplitude of the AC voltage increases. Once the rectified AC voltage exceeds the battery's acceptance voltage (which, in this example, is the sum of (i)~13.5 V DC and (ii) the rectifier's diode drop of approximately 0.6 V), rectified DC current (A Total), shown as the dark curve at the center of FIG. 2, is transferred to the battery 160. When the rectifier AC voltage is lower than the battery 160 voltage, no energy is extracted from the alternator 120. When the rectified AC voltage exceeds the sum of the rectifier 130 diode drop voltage and the battery 160 acceptance voltage, power is extracted from the alternator 120.

Therefore, during acceleration of the alternator 120 and at speeds that drive the alternator 120 to produce rectified AC voltages below the battery 160 acceptance voltage, the alternator 120 turns but produces no useful power. Furthermore, during low-speed conditions, the alternator turns but produces no energy. The energy is available but it is untapped potential power.

SUMMARY

This disclosure teaches means and apparatus to harvest the hitherto untapped potential energy from AC and rippled DC power generator systems. To achieve this, resonance-inducing passive circuit components are added that increase the oscillation voltage of the alternator, thereby raising portions of the voltage above the acceptance level of the battery. As such, the resonated generator system is capable of harvesting the energy at lower alternator speeds compared to prior-art techniques.

Certain embodiments of this disclosure yield one or more advantages including efficiency, reduced mechanical wear, lower weight, lower noise, and/or lower fuel usage. For example, often the potential energy from an engine-driven alternator during high-RPM operation is wasted or regulated because the energy-collection system cannot absorb or use the excess energy. Certain embodiments of this disclosure allow harvesting of potential energy from an engine-driven alternator at lower RPMs compared to prior-art techniques. As such, the rotation speeds of the alternator at engine idle can be reduced and, for example, the pulley drive ratios that cause the alternator to rotate at speeds greater than engine RPM can be reduced. Such reduction in pulley drive ratio reduces the rotation speed of the alternator at high engine speeds. The lower-RPM operation of the alternator reduces the RPM-related efficiency losses. It allows the alternator manufacturer to design an alternator for efficiency rather than centrifugal-proof strength. At high engine RPM operation, an engine-driven alternator, driven with a lower engine-to-alternator pulley ratio, has less potential energy waste and less regulation. The alternator useful energy is distributed more uniformly over the RPM range of operation. More useful energy is collected when the engine is at idle, and less potential energy is wasted at higher engine RPM.

Some engine-driven alternator systems require that the engine be operated at a relatively high speed that allows the alternator to generate enough current to charge, for example, a battery bank quickly. Certain embodiments of this disclosure cause the alternator to produce more current at lower engine RPM, thereby saving fuel and reducing engine wear, alternator wear, and engine noise.

Therefore this disclosure details an energy collection technique comprising an energy drive system that drives an energy generation system, said energy generation system comprising an inductor resonating with a passive component and generating a rectified AC or rippled DC voltage potential output, and an energy collection system having an acceptance voltage, wherein at least portions of said rectified AC or rippled DC voltage are higher than said acceptance voltage, thereby harvesting at least some of said potential output even at low-RPM operation.

The energy drive system may be blades adapted to convert fluid energy such as wind or water energy to rotational energy. Alternatively, the energy drive system may be waves adapted to raise and lower a lever or other device to convert wave energy to linear motion. Furthermore, the energy drive system may be an engine or regenerative braking system adapted to produce rotational energy.

The generation systems may be generators, alternators, or linear generators adapted to generate AC voltages that can be rectified to rectified AC or rippled DC voltage output. The AC voltage may be rectified using a diode bridge rectifier adapted to convert the AC to DC voltage. The AC voltage may be rectified using an active rectifier system comprising gate-driven FETs wherein said FETs are selectively gated to convert AC to rectified AC or DC voltage. The AC voltage may be rectified using selectively gate-driven FETs that route positive portions of the AC cycle to one portion of a circuit and negative portions of the AC cycle to another portion of a circuit. The rectified AC voltage or rippled DC voltage may be completely below the acceptance voltage. Alternatively, the rectified AC voltage or rippled DC voltage may comprise valley portions of voltage that are below the acceptance voltage. The AC voltage may be DC biased to a predominately rippled DC voltage.

The energy collection systems may be power grid systems, battery systems, or other potential energy storage systems, such as water pumped to a height or energy stored in a flywheel, or any combination of said systems. Such energy collection systems have an acceptance voltage wherein energy with voltages generated from the generation systems that are higher than the acceptance voltage, can be collected, and wherein energy from the generation systems having voltages that are lower than said acceptance voltage remains as unused and uncollected potential energy.

The passive component resonator may be, for example, capacitors, oscillators, crystals, resonators, and/or diodes adapted to induce resonance or resonant perturbation in the inductor. The capacitors may be, for example, ceramic capacitors, supercapacitors, ultracapacitors, aluminum electrolytic capacitors, polymer capacitors, tantalum capacitors, mica capacitors, PTFE capacitors, and/or silicon capacitors. Preferred capacitors are ceramic capacitors due to lack of polarity and high temperature capability. Also preferred are aluminum electrolytic capacitors. The capacitors may be connected to the inductive circuit in wye and/or delta intra-stator configurations. In a wye (aka star) configuration, the components are all connected to a common node. If capacitors are in a wye configuration, one lead of each capacitor would be connected to a common capacitor node. If inductors are in a wye configuration, one lead of each inductor would be connected to a common inductor node. The name "wye" refers to the fact that three wye-connected components have the topology of the letter "Y". In a delta configuration, each component is connected between exactly two other components. The name "delta" refers to the fact that three delta-configured components have the topology of the Greek letter "Δ". Ceramic capacitors are preferred in delta intra-stator configurations, and aluminum capacitors are preferred in wye intra-stator configurations. Ceramic capacitors are preferred in inter-stator configurations where the alternator has more than one stator. The capacitors may be connected internally to the inductive circuit (i.e. within the alternator) or externally by bringing the phase connections outside the alternator. It is preferred to connect aluminum electrolytic capacitors externally to improve lifetime at temperature.

Some alternators have multiple inductor circuits in wye-wye, wye-delta, or delta-delta circuit configurations. In some cases of three-phase alternators, two three-phase inductor circuits are "clocked" with a phase offset, for example, a 30° phase offset. The common inductor nodes of each inductor circuit can be connected to the same node or different nodes. For example, one inductor circuit's common inductor node could be connected to a battery negative, while the second inductor circuit's common inductor node could be a floating node. Inter-stator and/or intra-stator capacitors can be advantageously connected in ways that allow many combinations of inductor-capacitor phase connections.

At moderate to high rotation speeds, the alternator output may be adequate or better without the passive resonance boost circuit. Various methods are taught to decouple the passive resonance circuit from the inductive circuit returning the alternator to normal operation and performance. In some cases, the passive resonance boost increases operating temperatures. This temperature increase gives rise to the need to decouple the passive resonance circuit from the inductive circuit.

Although modern alternators and internal circuits have been designed to withstand inductive energy spikes even when the energy collector is disconnected from the alternator, capacitors remain sensitive to these energy spikes. Various methods are taught to diminish and absorb these energy spikes in order to protect the capacitors and other equipment that may be subject to the energy spikes.

Furthermore, this disclosure teaches an energy collection technique comprising a driven alternator system having a rectified AC or rippled DC energy output voltage, and an energy collection system having an acceptance voltage, wherein at least a portion of said energy is potential energy having a voltage below the acceptance voltage and wherein the low-voltage potential energy is converted to an energy with a voltage at least as high as the acceptance voltage using passive resonance boost circuitry, thereby allowing collection of the potential energy. The driven alternator system may be a wind-driven alternator system using rotating blades, having a rotation speed, and having a noise, wherein collection of the potential energy slows the rotation speed of the blades and reduces the noise. The alternator system may comprise a field coil rotor powered externally or internally via a diode trio or a permanent magnet rotor.

According to certain embodiments (e.g., FIGS. 5, 6, 11, 13, 15, 18B-18E, 20A-20D, 22A-22D, 24, 25B-25D), an article of manufacture comprises a power generator, the power generator comprising a rotor, a first stator, a first bridge rectifier, and one or more first capacitors. The rotor is configured to move relative to the first stator, and the first stator comprises one or more first inductors, each first inductor configured to generate phased AC power when the rotor moves relative to the first stator. The first bridge rectifier is connected between (i) the one or more first inductors and (ii) two output terminals of the power generator and configured to convert the phased AC power into a DC output current at the two output terminals. The one or more first capacitors are connected to one or more of the first inductors, wherein the one or more first capacitors and the one or more corresponding first inductors are configured to electro-magnetically resonate when the rotor moves relative to the first stator to increase peak amplitudes of the phased AC power and thereby increase the level of the DC output current.

According to certain embodiments of the above (e.g., FIGS. 5, 20C, 20D, 22C, 22D, 24), the first inductors are connected in a first inductor wye configuration such that the first inductors are connected to a first common inductor node, and the first capacitors are connected to the first inductors in a first capacitor wye configuration such that each first capacitor is connected between a different first inductor and a first common capacitor node of the first capacitor wye configuration.

According to certain embodiments of the above (e.g., FIGS. 5, 20C, 20D, 22C, 22D, 24), the first common capacitor node is one of the two output terminals of the power generator.

According to certain embodiments of the above, the first common capacitor node is not connected to either of the two output terminals of the power generator.

According to certain embodiments of the above (e.g., FIGS. 6, 11, 13, 20A, 20B, 20C, 22A, 22B, 22D, 24), the first inductors are connected in a first inductor wye configuration such that the first inductors are connected to a first common inductor node, and the first capacitors are connected to the first inductors in a first capacitor delta configuration such that each first capacitor is connected between a different pair of the first inductors.

According to certain embodiments of the above (e.g., FIG. 25C), the first inductors are connected in a first inductor delta configuration such that each first inductor is connected between exactly two other first inductors at two different first inductor nodes, and the first capacitors are connected to the first inductors in a first capacitor wye configuration such that each first capacitor is connected between a different first inductor node and a first common capacitor node of the first capacitor wye configuration.

According to certain embodiments of the above (e.g., FIG. 25C), the first common capacitor node is one of the two output terminals of the power generator.

According to certain embodiments of the above, the first common capacitor node is not connected to either of the two output terminals of the power generator.

According to certain embodiments of the above (e.g., FIG. 25B), the first inductors are connected in a first inductor delta configuration such that each first inductor is connected between exactly two other first inductors at two different inductor nodes, and the first capacitors are connected to the first inductors in a first capacitor delta configuration such that each first capacitor is connected between a different pair of the inductor nodes.

According to certain embodiments of the above (e.g., FIGS. 11, 13, 15), the power generator further comprises a regulator circuit (e.g., 1130, 1330, 1530) configured to selectively modulate current flowing through the rotor.

According to certain embodiments of the above (e.g., FIGS. 11, 13, 15), the power generator further comprises a spark-suppression circuit (e.g., 1140, 1340, 1540) configured to inhibit inductive sparks from damaging the first capacitors.

According to certain embodiments of the above (e.g., FIG. 13), the power generator further comprises a decoupling circuit (e.g., 1360) configured to selectively couple and decouple the first capacitors from the first inductors.

According to certain embodiments of the above (e.g., FIG. 15), the power generator further comprises a voltage-boosting circuit (e.g., 1570) configured to increase DC output current.

According to certain embodiments of the above (e.g., FIG. 15), the power generator further comprises a decoupling circuit (e.g., 1580) configured to selectively couple and decouple the voltage-boosting circuit from the alternator.

According to certain embodiments of the above (e.g., FIGS. 18B-18E, 20A-20D, 22A-22D, 24), the power generator further comprises a second stator and a second bridge rectifier. The rotor is configured to move relative to the second stator, and the second stator comprises a plurality of second inductors, each second inductor configured to generate phased AC power when the rotor moves relative to the first and second stators. The second bridge rectifier connected between (i) the second inductors and (ii) the two output terminals of the power generator and configured to convert the phased AC power into DC output current at the two output terminals.

According to certain embodiments of the above (e.g., FIGS. 18B-18E), each first capacitor is connected between a first inductor and a second inductor.

According to certain embodiments of the above (e.g., FIGS. 20B-20D, 22A-22D, 24), the power generator further comprises one or more second capacitors connected to one or more of the first and second inductors, wherein the one or more second capacitors and the one or more corresponding first and second inductors are configured to electro-magnetically resonate when the rotor moves relative to the first and second stators to increase peak amplitudes of the phased AC power and thereby increase the level of the DC output current.

According to certain embodiments of the above (e.g., FIGS. 20B, 20D, 22B-22D, 24), the one or more second capacitors are connected to the second inductors.

According to certain embodiments of the above (e.g., FIG. 20C, 24), the one or more second capacitors are connected to the first inductors.

According to certain embodiments of the above (e.g., FIGS. 22A-22D, 24), each second capacitor is connected between a first inductor and a second inductor.

According to certain embodiments of the above (e.g., FIGS. 22B-22D, 24), the power generator further comprises one or more third capacitors connected to one or more of the second inductors, wherein the one or more second capacitors and the one or more corresponding second inductors are configured to electro-magnetically resonate when the rotor moves relative to the first and second stators to increase peak amplitudes of the phased AC power and thereby increase the level of the DC output current.

According to certain embodiments of the above (e.g., FIGS. 22D, 24), the power generator further comprises one or more fourth capacitors connected to one or more of the first inductors, wherein the one or more fourth capacitors and the one or more corresponding first inductors are configured to electro-magnetically resonate when the rotor moves relative to the first and second stators to increase peak amplitudes of the phased AC power and thereby increase the level of the DC output current.

According to certain embodiments of the above (e.g., FIG. 15), the power generator further comprises a second bridge rectifier, wherein each first capacitor is connected between a corresponding first inductor and the second bridge rectifier.

BRIEF DESCRIPTION OF THE DRAWINGS

Embodiments of the present disclosure are illustrated by way of example and are not limited by the accompanying figures, in which like references indicate similar elements.

DETAILED DESCRIPTION

Figure 1:
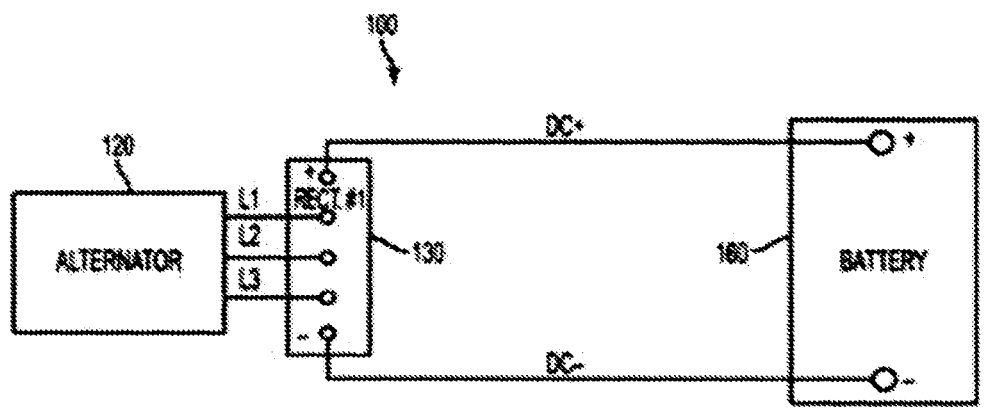
FIG. 1 shows a block diagram of a prior-art battery-charging system.
Figure 2:
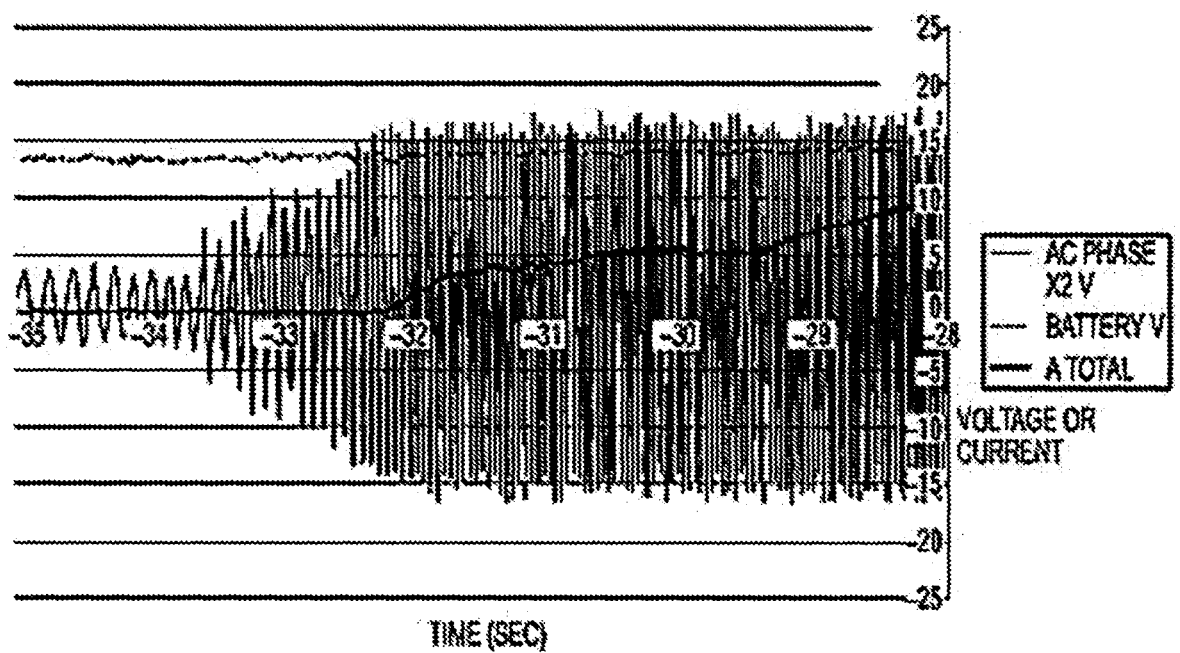
FIG. 2 graphically shows signals associated with the conventional battery-charging system of FIG. 1.
Figure 3:
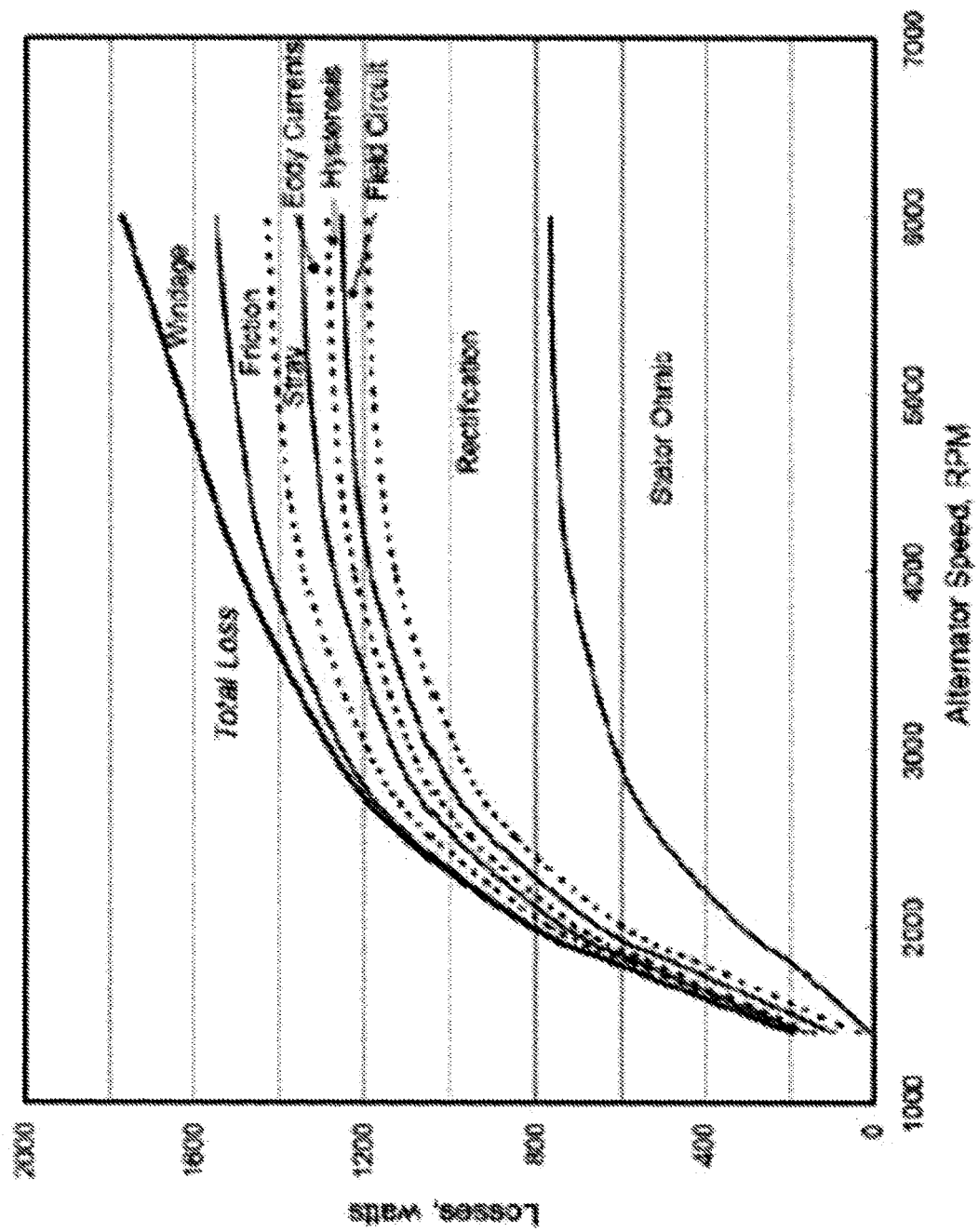
FIG. 3 shows energy losses as a function of alternator rpm.

Detailed illustrative embodiments of the present disclosure are disclosed herein. However, the specific structural and functional details disclosed are merely representative for purposes of describing example embodiments of the present disclosure. Embodiments of the present disclosure may be embodied in many alternative firms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "has," "having," "includes," and/or "including" specify the presence of stated features, steps, or components, but do not preclude the presence or addition of one or more other features, steps, or components. It also should be noted that, in some alternative implementations, the functions/acts noted may occur out of the order noted in the figures. For example, two figures shown in succession may in fact be executed substantially concurrently or may sometimes be executed in the reverse order, depending upon the functionality/acts involved. The terms intra-stator and inter-stator refer to the way in which connections are made to stator components. In particular, the term intra-stator refers to a component connected within a single stator, while the term inter-stator refers to a component connected between two stators. The terms intra-stator and inter-stator do not describe whether the connections are made inside or outside an alternator. An alternator with a single stator can only have intra-stator connections. An alternator with multiple stators can have both intra-stator and inter-stator connections. For the purposes of this disclosure, the term "resonance" refers to electro-magnetic resonance rather than mechanical resonance.

A linear generator "rotor" will have dead spots of no relative motion at the top and bottom of a cycle whereas a rotor in an alternator has no dead spots. Each may have different average speeds of rotation or cycling, the alternator having a more uniform speed than the stop-and-go motion of the linear-generator. The linear generator has acceleration and deceleration of relative motion during each cycle, while a rotor in an alternator has more uniform relative motion during each rotation. The linear generator therefore has periods of low-speed operation while accelerating from one dead-spot to the next dead-spot during each cycle of its "rotor". As such, the teachings of this disclosure, wherein the output of a generator is boosted during low-speed operation (low-speed relative motion), are beneficial during every cycle for a linear generator.

When generator output is boosted, more torque is required to drive the generator. Regenerative braking systems allow a motor to act as a generator during braking. In regenerative braking systems, the effectiveness of braking diminishes at lower speeds. The teachings of this disclosure, wherein the output of a generator is boosted during low-speed operation, would improve the effectiveness of regenerative braking systems at lower speed because the increased energy collected would translate to greater braking torque. Indeed, the reversible nature of motors and generators suggest that the introduction of resonant components, such as those taught in this disclosure, would increase motor torque during low-speed operation.

In this disclosure, some of the alternators have internal regulators and some alternators are used with external regulators. Some of the examples describe removal of the regulator. Some of the examples do not remove the regulator but keep all test voltages below a voltage where the regulator would start to function and skew test results. A generator may or may not require a regulator, depending on the usage. An example of when a regulator is not needed is when there is such a large capacity of energy absorption, by for example a massive battery bank or by a large grid, compared to the generator capacity. In such a situation the generator would not be able to raise the voltage, of say a battery, to a damaging level.

Figure 4:
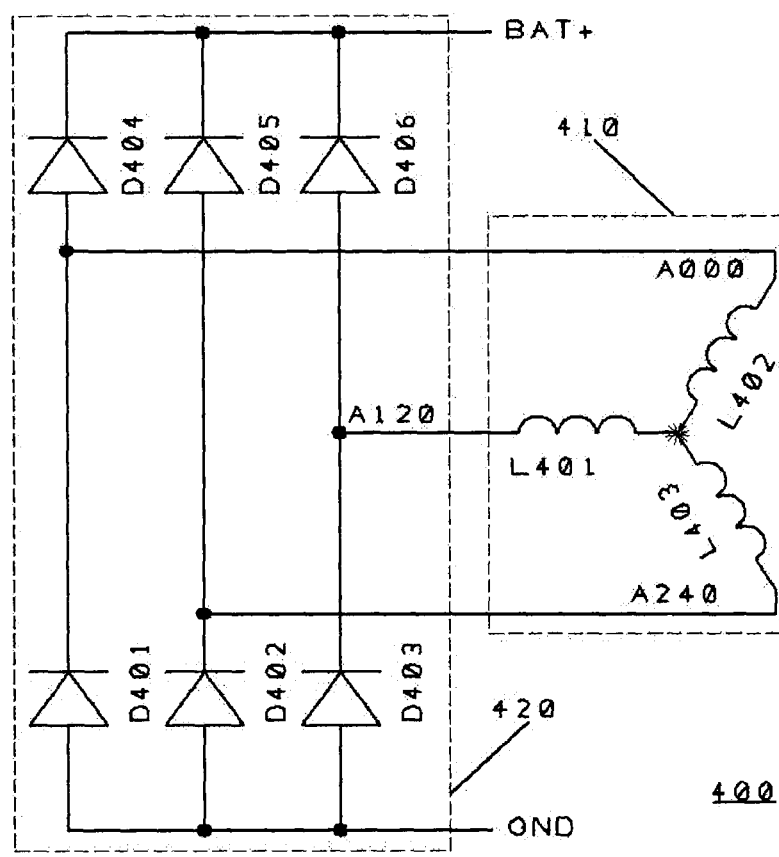
FIG. 4 shows a schematic circuit diagram of a prior-art alternator comprising a three-inductor stator with a bridge rectifier.

FIG. 4 is a schematic diagram of a prior-art, three-phase alternator 400 which comprises a stator 410 comprising three inductors L401, L402, and L403 and a bridge rectifier 420 comprising six diodes D401, D402, D403, D404, D405, and D406. Note that, in FIG. 4 and similarly in other, analogous figures in this disclosure, the rotor of alternator 400 is not explicitly depicted in the figure. The stator 410, shown in wye configuration, generates AC in phases A120, A000, and A240 within the inductors which are connected to the bridge rectifier 420. The designations of the phases A120, A000, and A240 represent the relative phase relationship of the AC current and voltage. That is, for example, the phase A000 is 120 degrees different from phases A120 and A240. This phase relationship will be consistent throughout this disclosure. The bridge rectifier 420 is connected to a battery (not shown) having BAT+ and GND terminals. The term "phase net" indicates that a phase passes through a wire or connection from component to component. As such, in some descriptions, A120 is a phase as well as a phase net.

In the figures, BAT+ and GND should be interpreted liberally in that the current from an alternator generally makes its way to battery or grid positive and negative terminals, respectively, though there may be switches and other components along the path. Like phases, terms like BAT+ and GND may represent terminals on a battery or terminals on an alternator. In some descriptions, wire connections are also termed as nets. As such, net BAT+ would be the wire connection leading to the positive battery terminal. A bridge rectifier converts AC to DC which then may charge the battery. During low-speed operation of the alternator, the AC voltage peaks might not convert to DC voltage at a high enough level to charge the battery. At moderate speed operation of the alternator, only portions of the AC peaks might convert to DC voltage at a high enough level to charge the battery.

Figure 5:
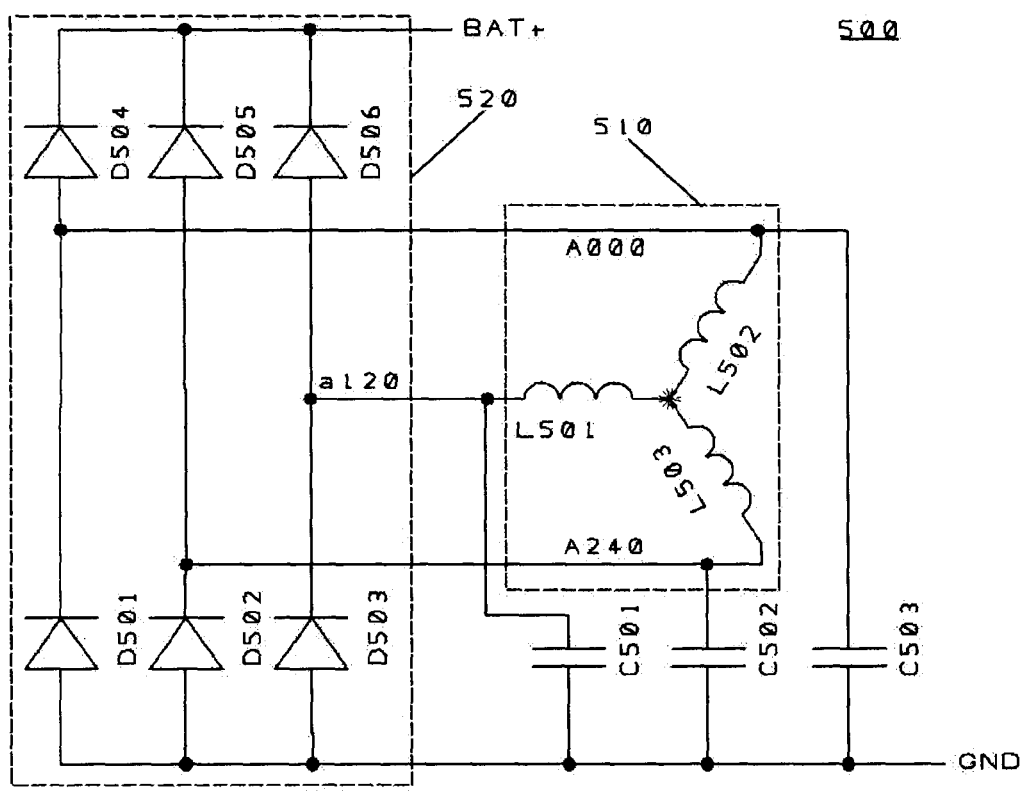
FIG. 5 shows a schematic circuit diagram of an exemplary embodiment of the disclosure wherein the alternator of FIG. 4 is modified with wye-configured intra-stator resonant boost capacitors.

FIG. 5 is a schematic circuit diagram of a three-phase alternator 500, according to an embodiment of the disclosure, based on the alternator 400 of FIG. 4, modified by further comprising three intra-stator capacitors in a wye configuration. As in FIG. 4, stator 510 comprises inductors L501-L503, and bridge rectifier 520 comprises diodes D501-D506. The stator 510, shown in wye configuration, generates AC in phases A120, A000, and A240 within the inductors which are connected to the bridge rectifier 520. The bridge rectifier 520 converts the AC to DC which may be used to charge, for example, a battery via terminals BAT+ and GND. In this embodiment, the alternator 500 further comprises three intra-stator resonance capacitors C501, C502, and C503 connected in star or wye fashion from GND) to each phase. The intra-stator capacitors introduce a resonance within the phase inductors at certain speeds of alternator operation. This resonance causes a larger variation in the voltage of the AC in the phases. During low-speed operation of the alternator 500, portions of the resonance-enlarged AC voltage peaks may convert to DC voltage at a high enough level to charge the battery. At moderate-speed operation of the alternator 500, greater portions of the resonance-enlarged AC peaks convert to DC voltage at a high enough level to charge the battery.

Figure 6:
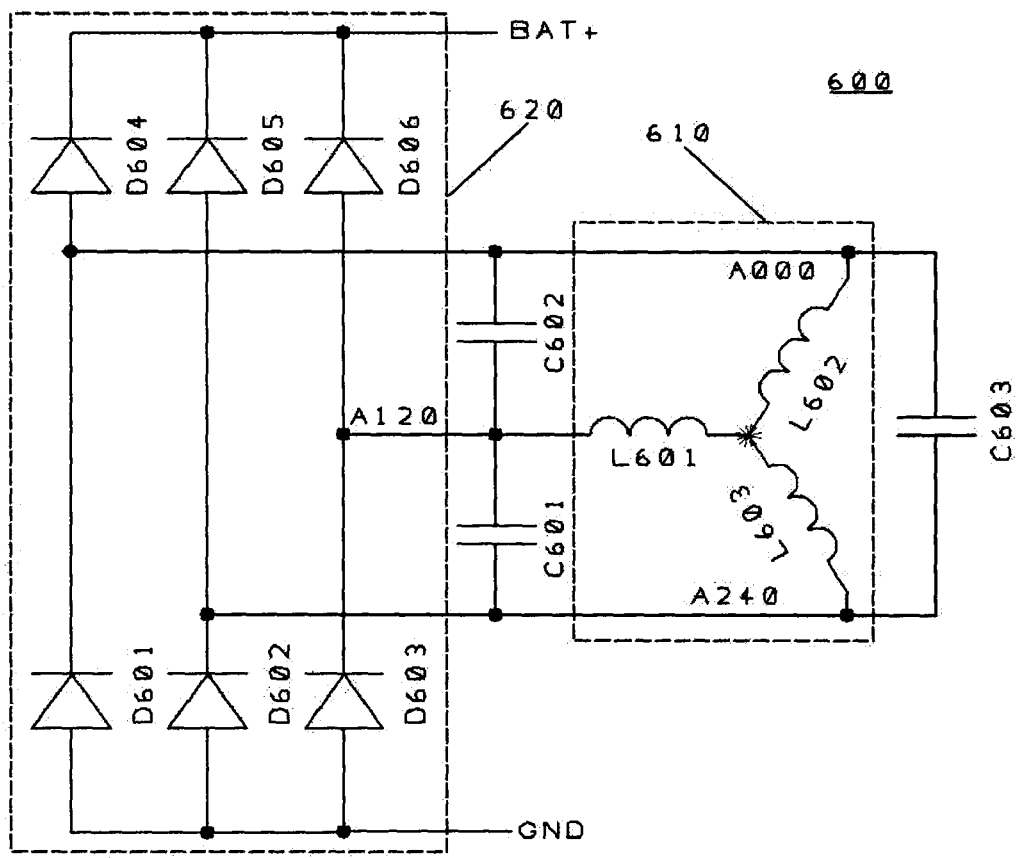
FIG. 6 shows a schematic circuit diagram of an exemplary embodiment of the disclosure wherein the alternator of FIG. 4 is modified with delta-configured intra-stator resonant boost capacitors.

FIG. 6 is a schematic circuit diagram of a three-phase alternator 600 according to another embodiment of the disclosure, based on the alternator 400 of FIG. 4, modified by further comprising three intra-stator resonance capacitors in a delta configuration. As in FIG. 4, stator 610 comprises inductors L601-L603, and bridge rectifier 620 comprises diodes D601-D606. The stator 610, shown in wye configuration, generates AC in phases A120, A000, and A240 within the inductors which are connected to the bridge rectifier 620. The bridge rectifier 620 converts the AC to DC which may be used to charge, for example, a battery via terminals BAT+ and GND. In this embodiment, the alternator 600 further comprises three intra-stator resonance capacitors C601, C602, and C603 connected among the phases in delta fashion. The intra-stator capacitors introduce a resonance within the phase inductors at certain speeds of alternator operation. This resonance causes a larger variation in the voltage of the AC in the phases. During low-speed operation of the alternator 600, portions of the resonance-enlarged AC voltage peaks may convert to DC voltage at a high enough level to charge the battery. At moderate-speed operation of the alternator 600, greater portions of the resonance-enlarged AC peaks convert to DC voltage at a high enough level to charge the battery.

Example 1

Figure 7:
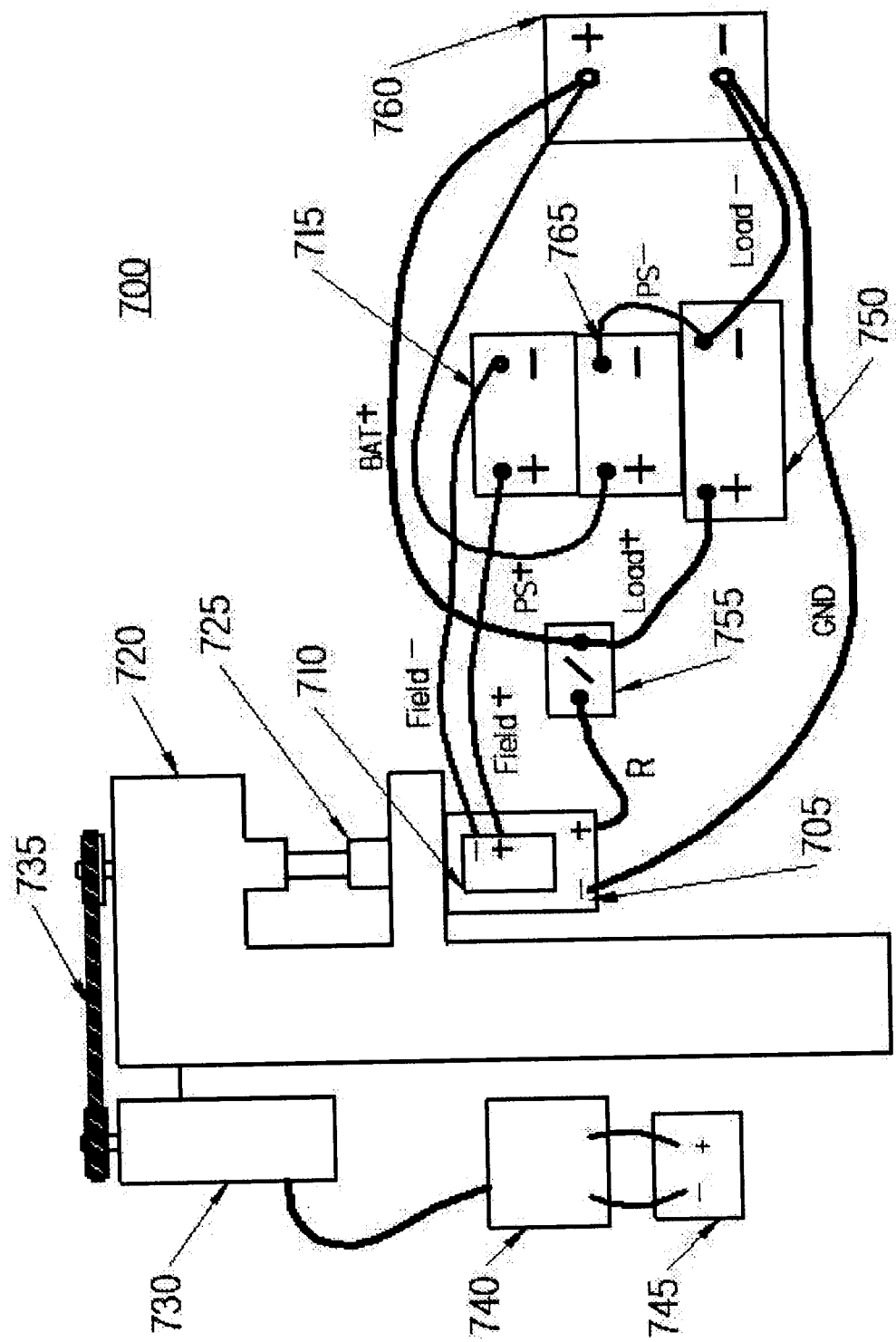
FIG. 7 shows a schematic block diagram of the test apparatus used for testing various embodiments of the disclosure.

FIG. 7 shows a schematic block diagram of test apparatus 700 used for testing various embodiments of the disclosure. Referring to FIG. 7, a Delco Remy 10si alternator 705 (available from Pep Boys of Philadelphia, Pa., as PIN 7127109) was modified bringing wire connections from the three phases A120, A000, and A240 of the stator (not shown) to outside the alternator 705 using #12 gauge stove wire (Tempco PIN LDWR-1023, not shown, available from Grainger of Lake Forest, Ill.). Also, the alternator diode trio (not shown) was removed ensuring that the rotor 710 field could be powered only via an external power supply 715 (Mastech HY3020 from Acifica. Inc. of San Jose, Calif. adjusted to supply a constant 4A DC through wires Field+ and Field–. The alternator 705 was mounted on a drill press 720 table with the rotor 710 shaft attached to the drill press chuck 725. The drill press was a Craftsman Model 103.24521 purchased from Sears Roebuck of Hoffman Estates, Ill. A Leeson 1 hp DC motor 730 (Model C4D17FK6, available from Leeson Electric Corp. of Grafton, Wis.) powered the drill press 720 via a belt drive 735. The rpm of the alternator rotor 710 was measured at the drill chuck 725 using a Cen-Tech™ 66632 hand-held, tachometer (not shown, available from Harbor Freight of Calabasas, Calif.). The motor 730 was controlled using a Leeson Speedmaster™ Model 174307 (available from Electric Motor Warehouse of Corunna, Mich.) motor controller 740. In order to gain greater speed control resolution, the motor controller 740 was modified to work in voltage-following mode per the manufacturer's instructions. An HP 6212C DC power supply 745 (available from Hewlett-Packard of Palo Alto, Calif.) was used to supply the control voltage for the voltage-following mode. A resistor-divider circuit (not shown) was used to drop the 0-120V DC supply voltage to 0-2.8V DC. This allowed adjustment of the alternator to ~+/−5 rpm. The output R of the alternator 705 was connected through a circuit breaker 755 (Bussmann. CB285-100 Surface-Mount Circuit Breakers, 100 Amps, available from Cooper Industries of Houston, Tex.) to a Kikusui electronic load 750 Model PIA-700W (available from Kikusui Electronics Corporation of Japan) adapted to operate in constant-voltage mode. The electronic load 750 was connected to net Load+ in parallel through net BAT+ to the batteries 760 and in parallel through net R with the alternator 705. In this test, the electronic load 750 absorbed any current that would cause the alternator 705-to-electronic load 750-to-battery 760 path to go over 13.8V. The batteries 760 (available from Tri-State Battery Warehouse of Newark, Del.) were three Group 32 deep-cycle units connected in parallel. A Mastech DC power supply 765 Model HY3005F-3 (available from Acifica Inc. of San Jose, Calif.) was also connected in parallel through net PS+ with the batteries and adjusted to provide a maximum of 13.7V at the batteries 760. A pair of Diodes Inc. SBR1045SD1-T diodes (not shown, available from Diodes Inc. of Plano, Tex.) were used to prevent any current flow in net PS+ from the battery 760 to the power supply 765. This assured that, at all test speed conditions, the batteries were at least 13.7V; however, in some tests, the battery 760 was 13.8 volts when the alternator 705 was operating. As such, the power supply 765 did not contribute to or absorb energy during the actual testing. Voltage and current measurement data were collected using a Fluke 190-204 4-channel scope (not shown, available from Fluke Corporation of Everett, Wash.). Battery 760 voltage data was collected using a 10:1 voltage probe. Current data, coming from the alternator 705 in net R before the circuit breaker 755 connections, was collected using a Fluke 80i-110s current clamp (not shown). A Fluke i30 current clamp (not shown) encircled the field positive wire Field+ to monitor the field current to the rotor 710 from the power supply 715.

Table 1 details the measured results of the 10si alternator 705 at various speeds. In the Normal 10si column, the phase wires were left unconnected.

In the 10si Delta 10×22 µF column, ten 22 µF ceramic intra-stator resonant capacitors (wired in parallel acting as one nominal 220 µF capacitor) were connected among the phases in delta configuration as shown in FIG. 6 as capacitors C601, C602, and C603. That is, capacitor C601 had a total capacitance of nominally 220 µF, capacitor C602 had a total capacitance of nominally 220 µF, and capacitor C603 had a total capacitance of nominally 220 µF. Each of the 22 µF capacitors was a Murata RDEC71H226MWK1H03B capacitor available from Murata Electronics North America of Smyrna, Ga.

In the 10si Wye 5×220 µF column, five 220 µF aluminum electrolytic intra-stator resonant capacitors (wired in parallel acting as one 1100 µF capacitor) were connected in wye fashion to the phases as shown in FIG. 5 as capacitors C501, C502, and C503. That is, capacitor C501 has a total capacitance of 1100 µF, capacitor C502 has a total capacitance of 1100 µF, and capacitor C503 has a total capacitance of 1100 µF. Each of the 220 µF intra-stator capacitors was a United Chemi-Con EKYB800ELL221MJ25S capacitor available from United Chemi-Con Inc. of Rolling Meadows, Ill.

TABLE 1

| Alternator rpm | Normal 10si Amps | 10si Delta 10 × 22uF Amps | 10si Wye 5 × 220uF Amps |
| --- | --- | --- | --- |
| 700 | 0 | 0 | 0 |
| 800 | 0 | 0 | 0.1 |
| 900 | 0.1 | 0.2 | 1.3 |
| 1000 | 0.3 | 0.98 | 5.1 |
| 1100 | 2.7 | 4.4 | 11 |
| 1200 | 7.3 | 12.5 | 17 |
| 1300 | 11.9 | 19.5 | 22.3 |
| 1400 | 16.3 | 24.8 | 26.6 |
| 1500 | 21.1 | 29.2 | 30.1 |
| 1600 | 24.4 | 32.6 | 33.1 |
| 1700 | 27.7 | 35.8 | 35.4 |
| 1800 | 30.8 | 38.7 | 37.4 |
| 1900 | 33.6 | 41 | 39.3 |
| 2000 | 36.3 | 43.6 | 41.1 |
| 2100 | 38.6 | 45.8 | 42.9 |
| 2200 | 41.3 | 48.1 | 44.7 |
| 2276 | 43.1 | 50.2 | 46 |

Figure 8:
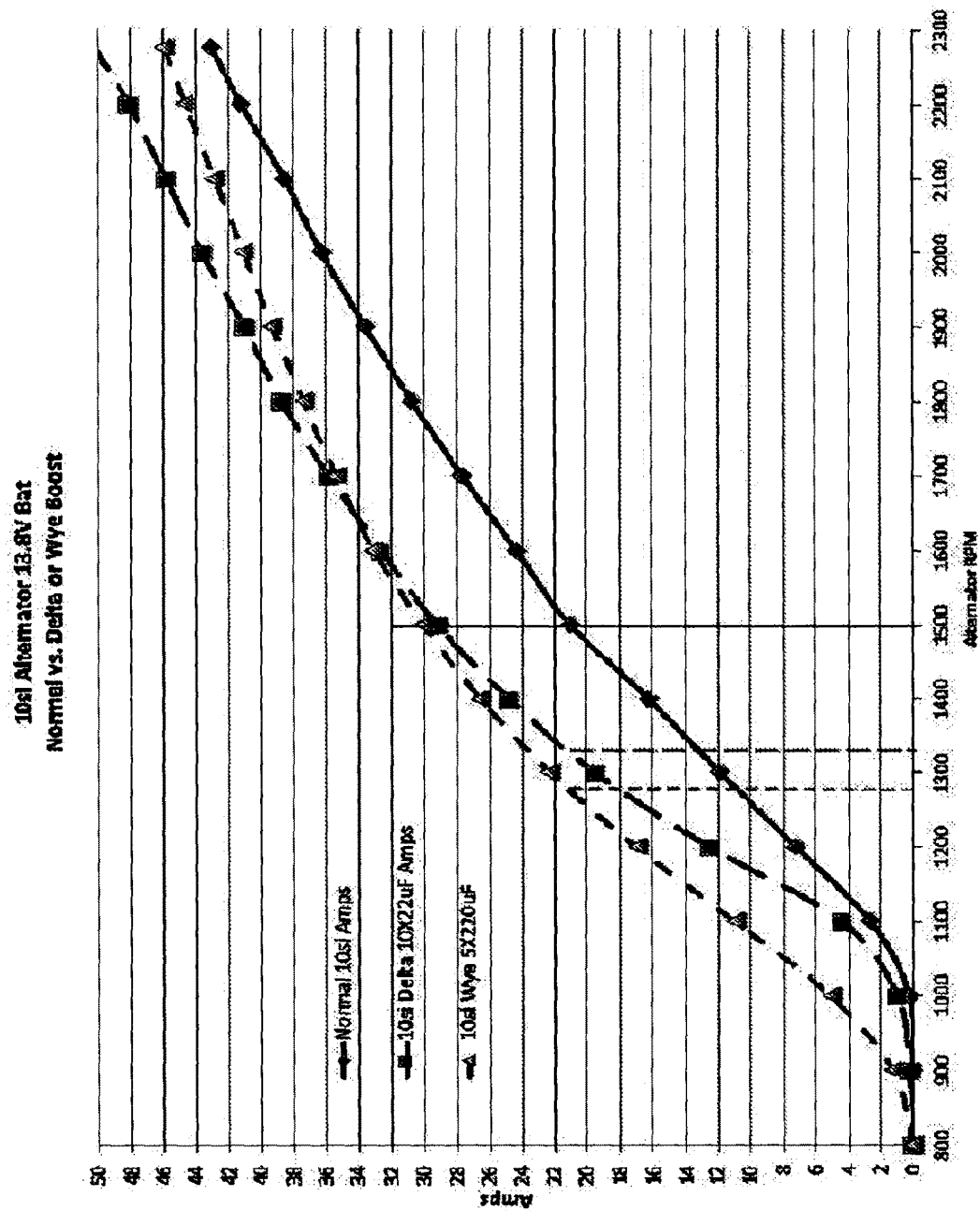
FIG. 8 shows a graph of test results.

The results of the measurements in Table 1 are graphed in FIG. 8. If an engine is idling at 750 rpm and if the alternator pulley ratio is 2:1, then the alternator rotates at 1500 rpm. If a delta intra-stator resonance capacitor alternator (as in FIG. 6) or if a wye intra-stator resonance capacitor alternator (as in FIG. 5) is used, there will be a~38% increase in output potential at idle.

Alternatively, if a 1.7:1 pulley ratio is used with the wye intra-stator capacitor alternator of FIG. 5, then the alternator spins~1280 rpm at engine idle or 15% slower at any engine speed. Yet, it would potentially produce the same output as a normal 10si alternator at idle. Since the centrifugal forces on a rotating mass vary as the square of the rotation speed, the centrifugal loads would decrease by~28%. The alternator could be made smaller and designed for the lower loads.

Alternatively, if a 1.77:1 pulley ratio is used with the delta intra-stator capacitor alternator of FIG. 6, then the alternator spins~1330 rpm at engine idle or 11.3% slower at any engine speed. Yet, it would potentially produce the same output as a normal 10si alternator at idle. Since the centrifugal forces on a rotating mass vary as the square of the rotation speed, the centrifugal loads would decrease by~21%. The alternator could be made smaller and designed for the lower loads.

Alternatively, the intra-stator resonant capacitors C501, C502, and C503 of FIG. 5 may be respectively connected between the phases A120, A000, and A240 and terminal BAT+. That is, capacitor C501 would be connected between phase A120 and terminal BAT+; capacitor C502 would be connected between phase A000 and terminal BAT+; and capacitor C503 would be connected between phase A240 and terminal BAT+. The performance might be equivalent to that shown in FIG. 5, but coupling and decoupling (as described later) of the intra-stator resonant capacitors C501, C502, and C503 would involve less-desirable components.

Alternatively, additional intra-stator resonant capacitors could be connected between terminal BAT+ and each phase in addition to the intra-stator resonant capacitors C501, 0502, and C503 which are connected between the phases and terminal GND in FIG. 5.

Alternatively, the intra-stator resonant capacitors C501, C502, and C503 may be respectively connected between the phases A120, A000, and A240 and a common, floating node that is not connected to either GND or BAT+. The boost performance of such "floating" resonant capacitors C501, C502, and C503 is lower than a "non-floating" configuration.

Alternatively, for FIG. 5, fewer intra-stator resonant capacitors than the number of phases might be connected between the phases and GND (or BAT+ or a common, floating node). For example, intra-stator resonant capacitor C503 could be deleted. Or, for example, intra-stator resonant capacitors C502 and C503 could be deleted. When fewer capacitors than the number of phases A000, A120, and A240 are used, resonant boost performance drops. Higher capacitance in the remaining intra-stator resonant wye-configured capacitor(s) could offset the performance drop.

Any combination of the above-described embodiments may be mixed to provide some degree of resonant boost.

Alternatively, for FIG. 6, fewer intra-stator resonant delta-configured capacitors than the number of phases A000, A120, and A240 can be used. For example, capacitor C603 can be deleted. Or, for example, capacitors C602 and C603 can be deleted. When fewer capacitors than the number of phases A000, A120, and A240 are used, resonant boost performance drops. Higher capacitance in the remaining intra-stator resonant delta-configured capacitor(s) could offset the performance drop.

There is an incentive from a manufacturing perspective to simplify the boost implementation while still retaining reliability and performance. Surprisingly, just providing higher capacitance does not always improve desired performance. Indeed, higher capacitance may lead to potential alternator failure due to overheating of components.

Example 2

This overheating condition occurred using a remanufactured LR135-15 alternator available from Pep Boys as the alternator 705 in the test apparatus 700 of FIG. 7. The alternator 705 was disassembled and new stove wire (op. cit. Example 1) was crimped and soldered to the three phases A120, A000, and A240. Upon reassembly, the wire was extended out from the alternator 705 allowing connection of the phases A120, A000, and A240 to various intra-stator capacitance values C601, C602, C603 via a terminal block (not shown). Type K thermocouple wires were also positioned in the alternator 705 on the regulator and the stator. The thermocouple wires were connected to an Omega HH309A four-channel data logger (not shown, available from Omega Engineering Inc. of Norwalk, Conn.), which also had one thermocouple wire attached to the intra-stator resonance capacitor C601 and one thermocouple wire monitoring ambient temperature. The output of the alternator 705 was connected to the electronic load 750 and the batteries 760 as described in Example 1. A power supply 765 was connected to the batteries as described in Example 1 that maintained the batteries 760 at a minimum of 13.2V. The actual voltage of testing when the alternator 705 was running was between 13.3V and 13.5V. Battery 705 voltage, phase A120 voltage, rotor 710 field current, and alternator 705 current measurements were collected using the Fluke 190 scope as described in Example 1. During testing, the alternator 705 was run until the stator reached a temperature equilibrium. The LR135-105 alternator 705 has a diode trio. The rotor 710 Field+was connected to the circuit breaker 755 and net R rather than to a power supply 715. As such, if the circuit breaker 755 is opened both Field+ and net R will be disconnected from the battery 760. The rotor 710 Field− is internally connected to GND in the alternator 705. At low rpm, the battery 760 provides all the rotor 710 field current. As the alternator 705 rpm increases, the diode trio contributes to the rotor 710 field current alleviating the need for the battery 760 to provide that current. The Fluke 80i-110s encircled both the R and Field+ wires measuring this combined, current output. The Fluke 30i current clamp was used to measure only the rotor 710 Field+ current from the battery 760. The intra-stator capacitors C601, C602, and C603 used were the RDEC71H226MWK1H03B ceramic capacitors (op. cit. Example 1). However, it was found that, on average, the capacitance of each capacitor was ~20 μF rather than the nominal 22 μF.

Table 2 details the results of current output using the modified. LR135-105 alternator 705 when charging into a 13.4V battery 760 and run until an equilibrium temperature was reached at each rpm step. The Normal column is the alternator 705 without any capacitors. All the other columns involve the use of delta-configured intra-stator resonance capacitors C601, C601, and C603 where, the example, 60 μF would be the capacitance of three nominally 22 μF capacitors wired in parallel as capacitors C601, C602, and C603. The negative measurement of amps at 800 rpm is due to the battery 760 powering the rotor 710 coil. As such, the current reported represents the total alternator 705 output to the system.

TABLE 2

| Alternator RPM | Normal Amps | 20 uF Boost Amps | 40 uF Boost Amps | 60 uF Boost Amps | 100 uF Boost Amps | 200 uF Boost Amps | 400 uF Boost Amps |
|---|---|---|---|---|---|---|---|
| 800 | −2.76 | −2.9 | −2.8 | −2.6 | −2.9 | −2.6 | −2.8 |
| 1000 | 3.03 | 3.2 | 3.6 | 3.5 | 3.7 | 6.3 | 8.2 |
| 1200 | 10.8 | 11.3 | 12.7 | 13.5 | 14.3 | 15.5 | 16.1 |
| 1400 | 17.2 | 18.7 | 19.6 | 20 | 20.7 | 21.3 | 21.1 |
| 1600 | 22.1 | 23.6 | 24.3 | 24.4 | 24.9 | 25.2 | 24.1 |
| 1800 | 25.8 | 27.3 | 27.8 | 27.8 | 28 | 27.7 | 26.2 |
| 2000 | 29 | 29.9 | 30.2 | 30.4 | 30.3 | 30 | 27.6 |
| 2200 | 31.1 | 32.1 | 32.2 | 32 | 32.1 | 30.9 | 29.1 |
| 2400 | 33.2 | 33.6 | 33.9 | 33.6 | 34.1 | 32.6 | 29.2 |
| 2600 | 34.2 | 34.8 | 35.3 | 34.6 | 34.7 | 33.2 | |
| 2800 | 35.5 | 36 | 36.2 | 35.8 | 35 | 34 | |
| 3000 | 36.5 | 37 | 36.8 | 36.6 | 35.3 | 34.3 | |

Figure 9:
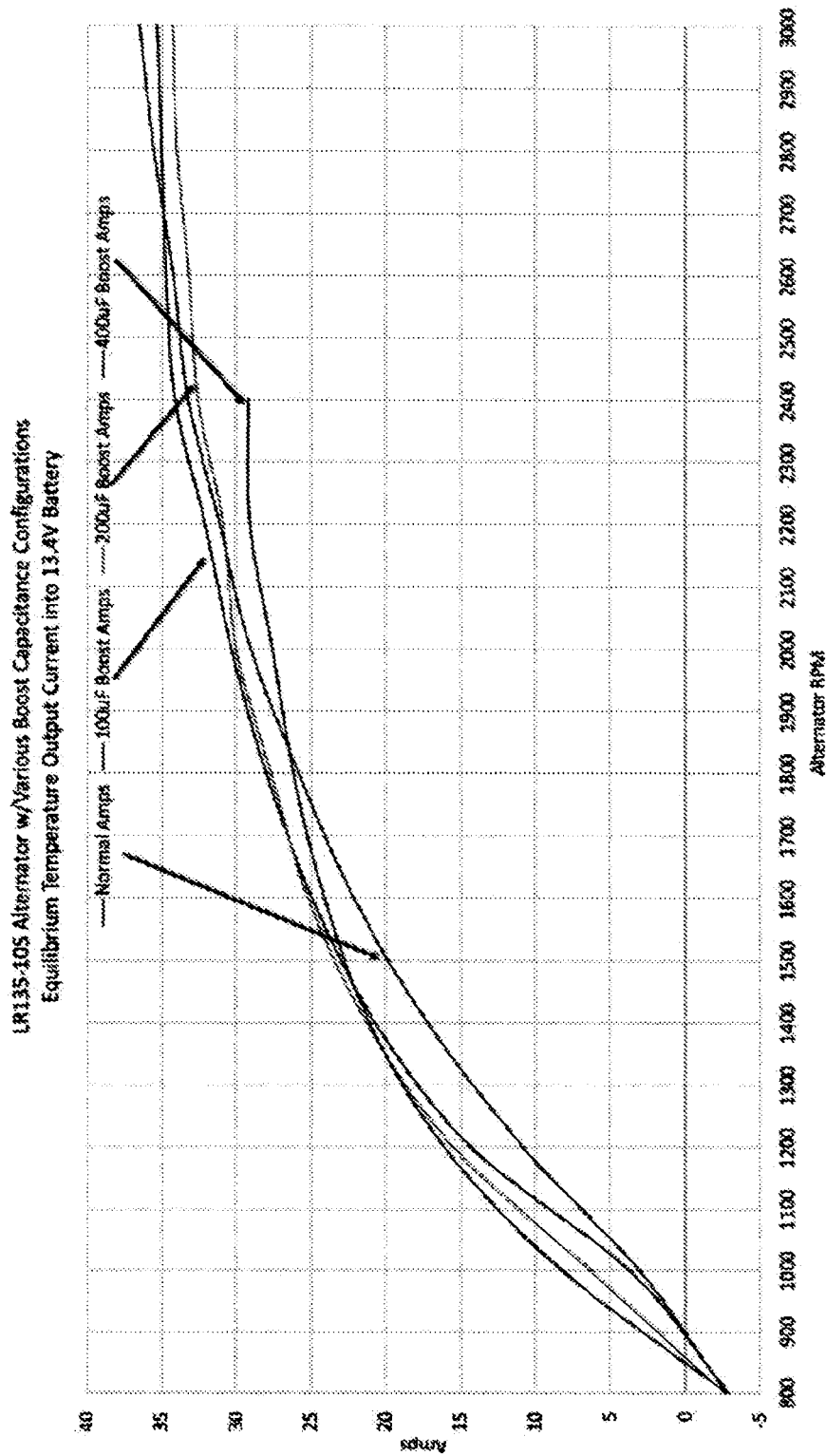
FIG. 9 shows a graph of test results.

FIG. 9 depicts the performance of three different configurations of the boosted LR135-105 alternator 705: a first configuration with intra-stator 100 μF resonance capacitors as capacitors C601, C602, and C603; a second configuration with intra-stator 200 μF resonance capacitors as capacitors C601, C602, and C603; and a third configuration with intra-stator 400 μF resonance capacitors as capacitors C601, C602, and C603. FIG. 9 compares those boosted performances with a normal alternator 705 without any capacitive boost. It can be seen that, at low to mid rpm, the intra-stator capacitive boost improves alternator 705 output, but above 2700 rpm all boost configurations exhibit degraded performance. These higher intra-stator capacitance boost configurations are less preferred. Were they to be used, extra circuitry would probably be used to decouple the intra-stator resonance capacitors C601, C602, and C603 at, for example, higher rpm. Such decoupling circuitry is described later in this disclosure.

Figure 10:
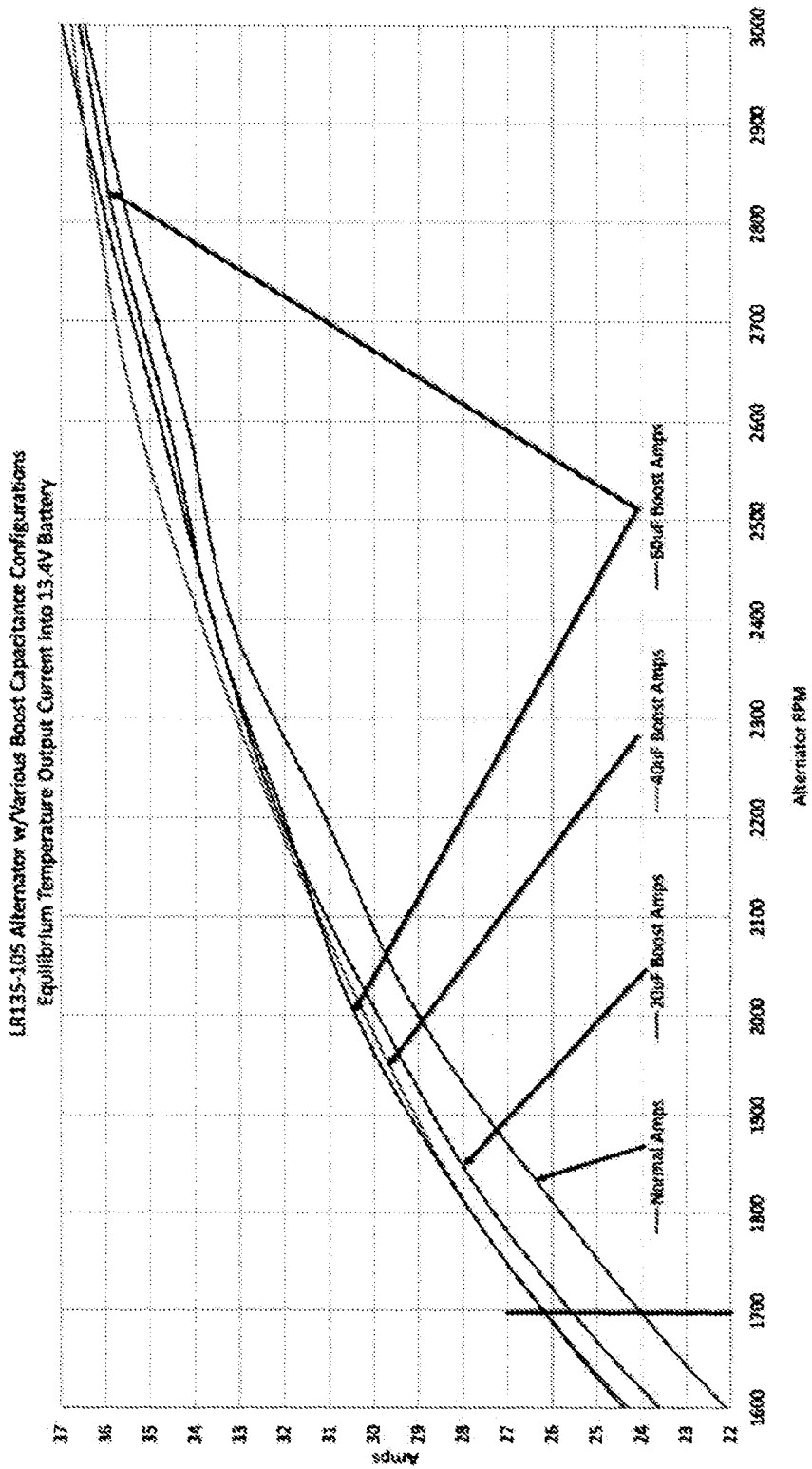
FIG. 10 shows a graph of test results.

The LR135-105 alternator 705 is often used on small Yanmar diesel engines (available from Yanmar Co., Ltd., of Japan) that power tractors and small marine watercraft. The engine idles at ~850 rpm and the pulley ratio is around 2:1. This means the alternator 705 runs at ~1700 rpm when the engine idles. FIG. 10 depicts the performance of the normal alternator 705 from 1600 rpm to 3000 rpm and also shows the performance when delta-configured intra-stator resonance capacitance boost is employed. The intra-stator capacitance boost is varied as 20 μF, 40 μF, and 60 μF as capacitors C601, C602, and C603 as shown in FIG. 6. That is, for example, in one test, capacitor C601 would be 40 μF, capacitor C602 would be 40 μF, and capacitor C603 would be 40 μF, and the result on the chart would be depicted as 40 μF Boost Amps.

At engine idle and with the alternator 705 running at 1700 rpm, the 60 μF and 40 intra-stator capacitance boost performance is about the same. But above 2100 rpm, the 40 μF resonant boost is superior to the 60 μF resonant boost. For this application, a 40 μF intra-stator capacitive boost is preferred and provides a 9% improvement in potential output at idle.

In practical marine applications, the engine is run to recharge the batteries. Typically, an initial bulk charging is performed using higher engine speeds to produce higher current. This bulk charging may take, for example, 15 minutes. Then the charging routine drops to an absorption charging phase. This can take a long time but it does not need the full speed of the engine and the attendant engine noise during the entire absorption charge time. With boosted alternator performance, the engine can be slowed, to idle sooner, reducing noise and reducing fuel consumption.

For some alternators 705 tested, employing intra-stator resonant capacitive boost has a significant effect on alternator operation temperature. The LR135-105 alternator is one of the more temperature-sensitive alternators. Table 3 shows the increase in temperature of the externally connected intra-stator resonant boost capacitors used during the alternator 705 operation.

TABLE 3

| Alternator RPM | 20 uF Cap ° C. | 40 uF Cap ° C. | 60 uF Cap ° C. | 100 uF Cap ° C. | 200 uF Cap ° C. | 400 uF Cap ° C. |
|---|---|---|---|---|---|---|
| 3000 | 51.1 | 52.6 | 56.6 | 62.2 | 60.8 | |
| 2800 | 50 | 49.8 | 55.3 | 58.2 | 59.5 | |
| 2600 | 46 | 48 | 52.8 | 55.9 | 57.1 | |
| 2400 | 43.8 | 46.2 | 50.8 | 54.6 | 58.2 | 54.6 |
| 2200 | 40.3 | 43.7 | 49.2 | 52.5 | 57.2 | 53.4 |
| 2000 | 38.8 | 41.5 | 46.4 | 49.7 | 53.9 | 53.7 |
| 1800 | 38.1 | 39.2 | 44.1 | 46.5 | 51.8 | 51.2 |
| 1600 | 37 | 37.9 | 40.1 | 43.4 | 47.2 | 48.6 |

TABLE 3-continued

| Alternator RPM | 20 uF Cap °C. | 40 uF Cap °C. | 60 uF Cap °C. | 100 uF Cap °C. | 200 uF Cap °C. | 400 uF Cap °C. |
|---|---|---|---|---|---|---|
| 1400 | 34.5 | 35.6 | 37 | 41.8 | 45.5 | 43.8 |
| 1200 | 31.7 | 33.4 | 33.6 | 37.8 | 42.6 | 40.7 |
| 1000 | 28.5 | 30.5 | 30.7 | 34.5 | 36.1 | 37.1 |
| 800 | 25.7 | 25.9 | 27.3 | 29.9 | 30.2 | 28.4 |

As can be seen, in general, the higher the intra-stator resonant capacitive boost, the higher the operating temperature of the intra-stator capacitors C601, C602, and C603. During this testing, the intra-stator capacitors C601, C602, and C603 were located outside the alternator 705. Inside the alternator 705, the temperatures likely would be higher. Over the past several years, ceramic capacitors have seen a significant improvement in high temperature performance, as well as reduction in size, and an increase in maximum voltage capability.

The stator temperatures of the LR135-105 alternator 705 increase significantly when intra-stator resonant capacitive boost is employed. The higher the intra-stator capacitive boost, the higher the stator temperature. Some temperatures get high enough to reduce the life of the alternator 705. This can be seen in Table 4. A circuit that decouples the intra-stator resonant capacitors C601, C602, and C603 from the phases at high temperatures would allow the use of higher capacitance if that were advantageous for the alternator 705.

TABLE 4

| RPM | Normal Stator °C. | 20 uF Boost Stator °C. | 40 uF Boost Stator °C. | 60 uF Boost Stator °C. | 100 uF Boost Stator °C. | 200 uF Boost Stator °C. | 400 uF Boost Stator °C. |
|---|---|---|---|---|---|---|---|
| 800 | 34.8 | 34 | 36.5 | 32.7 | 32.5 | 35.4 | 35.3 |
| 1000 | 41.1 | 41.8 | 42.2 | 40.3 | 42.2 | 44.8 | 57.4 |
| 1200 | 52.6 | 53.1 | 55 | 55.6 | 58.1 | 66.3 | 76.9 |
| 1400 | 63 | 71.2 | 71.7 | 74.8 | 78.2 | 85.4 | 95.7 |
| 1600 | 72.8 | 83.1 | 85 | 89.7 | 91.8 | 101.3 | 115.9 |
| 1800 | 84.2 | 91.3 | 94.8 | 99.9 | 103.3 | 115.4 | 127.8 |
| 2000 | 89.4 | 99.3 | 103 | 107.3 | 111.8 | 120.8 | 137 |
| 2200 | 95.8 | 104.4 | 108 | 114.8 | 115.2 | 124.9 | 139.6 |
| 2400 | 99.2 | 109.9 | 111 | 116.9 | 117.6 | 127.2 | 139.2 |
| 2600 | 102.4 | 113.3 | 114 | 118 | 118.5 | 128.9 | |
| 2800 | 104.1 | 113.1 | 113 | 118.5 | 113.7 | 126.1 | |
| 3000 | 104.5 | 113.5 | 111 | 116.9 | 110.9 | 121.9 | |

One concern with regard to alternators 705 relates to the robustness of components when the alternator 705 is operating at speed, and the battery 760 suddenly gets disconnected. A circuit breaker 755 might trip or someone could decide to remove a battery cable BAT+. When this happens, a substantial amount of inductive energy is released, resulting in high voltage and current spikes. It is not unusual for such voltage spikes to exceed 100V. These could damage components in the alternator 705, but modern alternators 705 are designed to withstand the spikes. The alternator 705 may be connected to the battery 760 with cables R where other powered components are also connected. For example, a vehicle's electronic control module (ECM) might be tied to the alternator cable R. If the battery 760 lug is disconnected only from the battery 760 but not the ECM, then the inductive spike in net R might discharge through the ECM and damage it.

The intra-stator resonant capacitors C601, C602, and C603 that are connected to the phases A120, A000, and A240 could also be damaged. Higher-voltage intra-stator resonant capacitors C601, C602, and C603 could be used but the costs and complexity of using higher-voltage intra-stator resonant capacitors C601, C602, and C603 is prohibitive. For example, ceramic capacitors that can withstand 100+V tend to be expensive and of lower capacitance. In general, for all embodiments of this disclosure, it is preferred that the phase A120, A000, and A240 voltages be less than 100V, and allowing for spark suppression voltages less than 80V and less than 60V are more preferred. Other solutions employ spark suppressors such as transient-voltage-suppression (TVS) diodes and varistors. These solutions are suitable for permanent magnet alternators.

Figure 11:
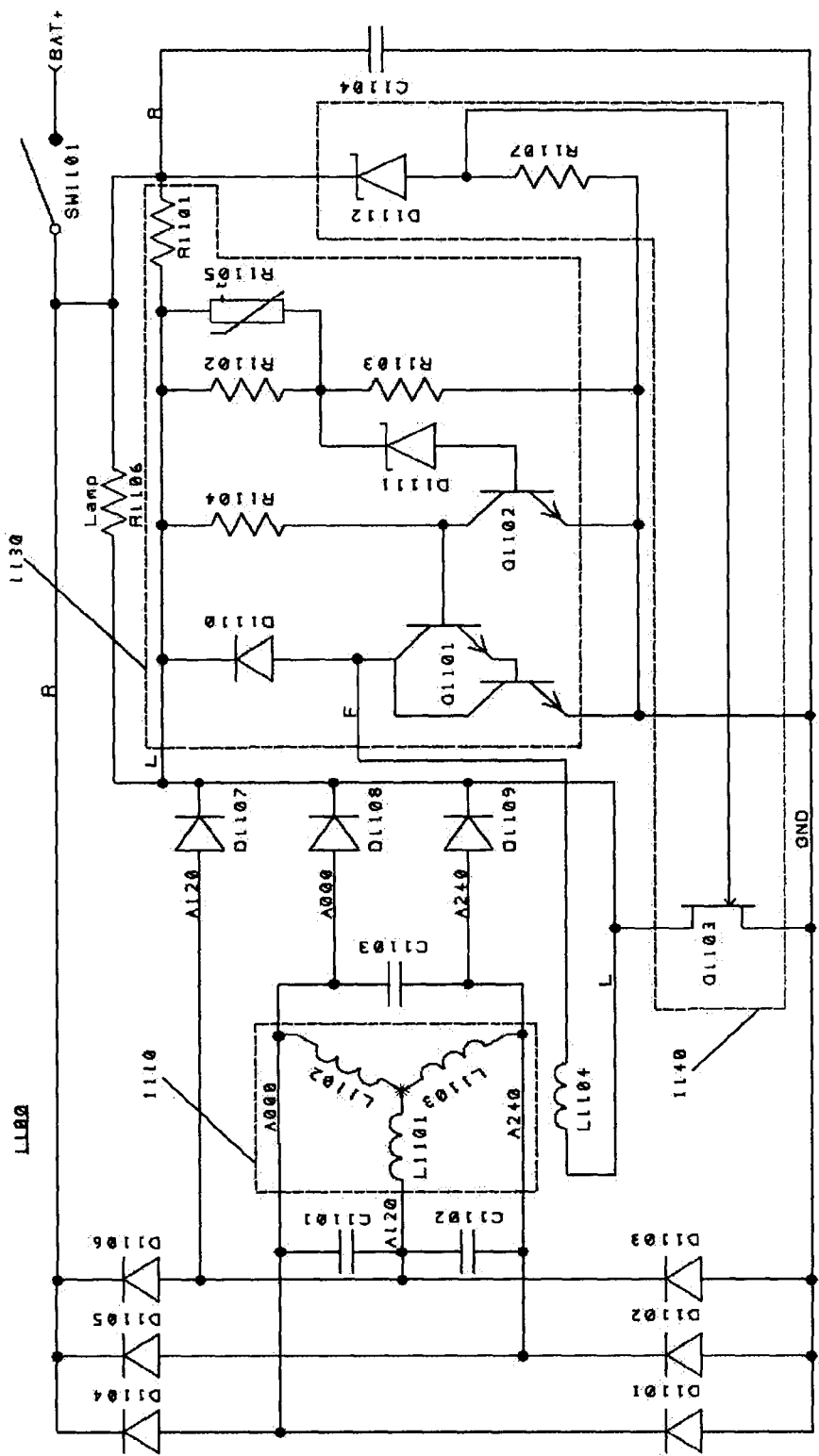
FIG. 11 shows a schematic circuit diagram of an exemplary embodiment of the disclosure.

FIG. 11 is a schematic circuit diagram of an alternator 1100 according to an embodiment of the instant disclosure that suppresses the voltage spikes near the regulator circuit that controls the rotor coil L1104 field current. If the rotor coil L1104 field is collapsed, then the stator 1110 can no longer generate power, although the instant inductive energy in the stator 1110 still needs to be released. Alternator 1100 comprises spark suppression circuitry 1140 that inhibits inductive spikes from damaging the intra-stator capacitors C1101, C1102, and C1103 as well as other internal and external electrical components.

In FIG. 11, most components are embodied in the alternator 1100 as a unit assembly. These components are bridge-rectifier diodes D1101, D1102, D1103, D1104, D1105, and D1106; trio diodes D1107, D1108, and D1109; stator 1110 inductors L1101, L1102, and L1103; rotor coil L1104 and capacitor C1104. The alternator 1100 also embodies a regulator circuit 1130 comprising diodes D1110 and D1111; resistors R1101, R1102, R1103, and R1104; thermistor R1105; and transistors Q1101 (as a Darlington transistor) and Q1102. The regulator circuit 1130 senses the voltage of the battery 760 and also monitors the temperature of the alternator 1100. If the battery 760 voltage reaches, for example, 14.4V, then the regulator circuit 1130 modulates the current flowing through the rotor coil L1104. At lower coil L1104 currents, the rotor 710 magnetic field weakens, thereby reducing the output of the stator 1110 phase power. The thermistor R1105 also helps to modulate the current flowing through the rotor coil L1104 when the alternator heats up. The higher the temperature, the lower the alternator 1100 output, leading to a reduction in heat being generated inside the alternator. The phase nets are A120, A000, and A240. Net labels L, and F provide descriptions of important nets in the alternator 1100. Net labels R and GND also represent terminals on the alternator 1100 that are connected to a battery 760 via circuit breaker 755. In normal installations, lamp R1106 and ignition switch SW1101 are provided elsewhere, for example, on an instrument panel. The lamp R1106 is shown in FIG. 11 only to distinguish net R from net L. In this example, SW1101 was a circuit breaker 755 (op. cit. Example 2). Added to the alternator 1100, as part of the instant disclosure, were intra-stator resonance capacitors C1101, C1102, and C1103 and a spark suppression circuit 1140 that comprises FET Q1103, zener diode D1112, and resistor R1107.

In FIG. 11, the intra-stator capacitors C1101, C1102, and C1103 induce a resonance with the stator 1110 inductors L1101, L1102, and L1103, thereby providing boosted alternator 1100 output. The spark suppression circuit 1140 acts to ground and collapse the rotor coil L1104 field and the stator 1110 field such that spikes are absorbed when, for example, switch SW1101 is opened-up while the alternator 705 remains running. Because the rotor coil L1104 field is grounded anytime the voltage on R goes momentarily high, the stator 1110 inductors L1101, L1102, and L1103 never rebuild high field strength. Subsequent spikes of voltage and current are therefore suppressed.

Example 3

In Example 3, all the equipment setup was the same as for Example 2 except as detailed in the following description. The LR135-105 alternator 1100 phase A120, A000, and A240 stove wires were removed. Intra-stator resonant capacitors C1101, C1102, and C1103 were soldered across the phases inside the alternator 1100. Each of capacitors C1101-C1103 consisted of two nominally 22 g RDEC71H226MWK1H03B ceramic capacitors in parallel. The lamp R1106 was not used. FIG. 11 nets R and L were connected together on one terminal of the circuit breaker 755. The other terminal of the circuit breaker 755 was connected via Load+ and BAT+ to the electronic load 750 and to the battery bank 760, respectively. As such, when the circuit breaker 755 was opened, the alternator 1100 output on power nets R and L were disconnected from both the electronic load 750 and the battery bank 760. A wire (not shown) was connected to L inside the alternator 1100 and brought out for connection to the externally mounted suppression circuit 1140 FET Q1103 drain. The FET Q1103 was an ON Semiconductor/Fairchild FDH44N50 available from On Semiconductor of Phoenix, Ariz. Suppression circuit 1140 zener diode D1112 and resistor R1107 were also connected externally to the alternator 1100. Zener diode D1112 was a Nexperia 16V BZX79-B16,133 zener available from Nexperia of the Netherlands. Resistor R1107 was a 1 k ohm resistor From RadioShack of Fort Worth, Tex. A Fluke 80i-110s current clamp encircled the net L FET Q1103 drain wire. A Fluke i30 current clamp encircled the power not R and L wires between the alternator and the circuit breaker 755 terminal. A 10:1 voltage probe measured the voltage at that terminal.

Figure 12:
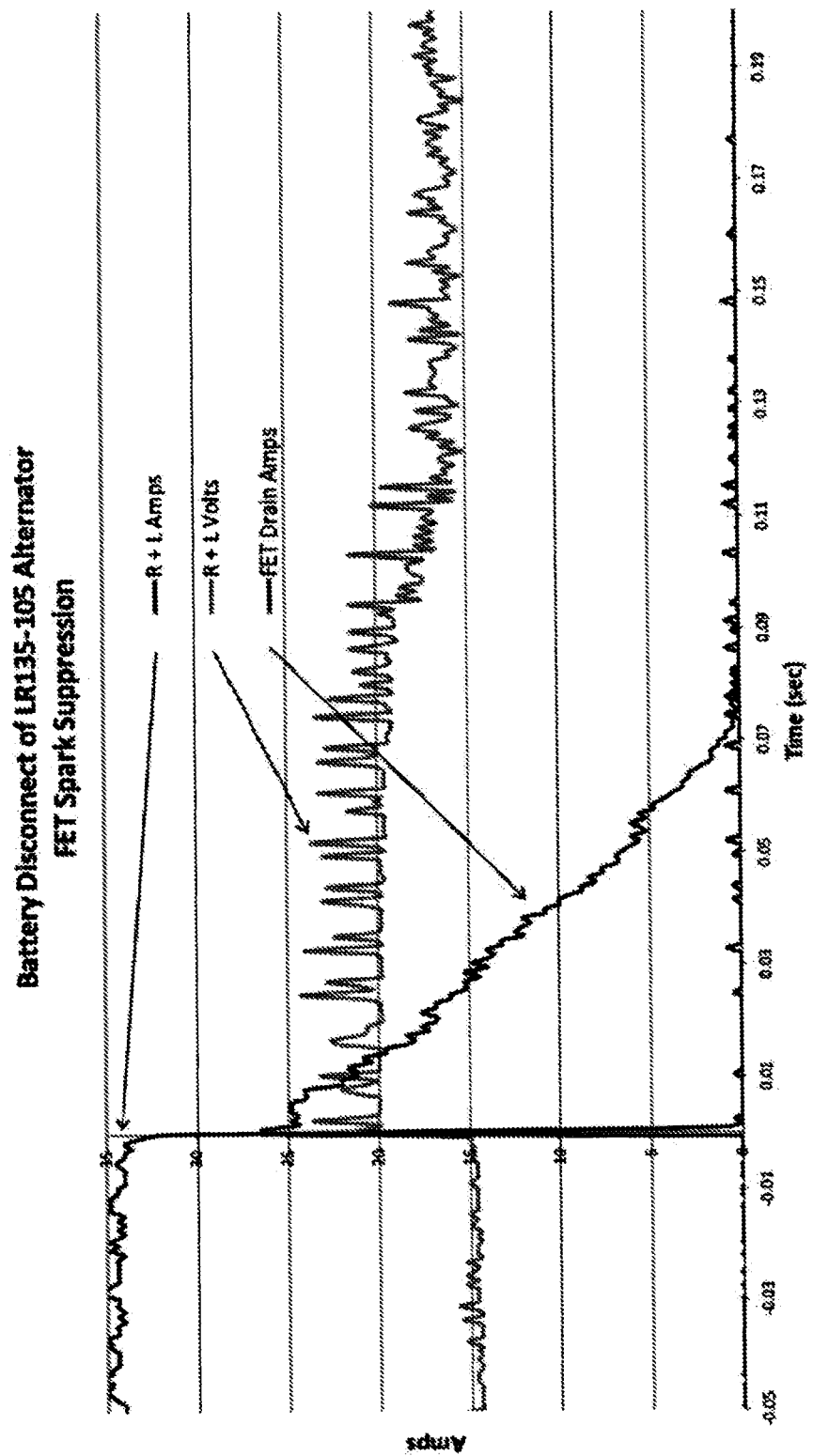
FIG. 12 shows a graph of test results.

The alternator 705 was powered, by the DC motor 730, to run such that it provided an output of nearly 35 A at 13.4V. Then the circuit breaker 755 was opened disconnecting nets R and L from the battery 760 and the electronic load 750. FIG. 12 shows what occurred during the spike suppression. Time 0 represents the moment the circuit breaker 755 was opened. The current in the R and L wires going to the battery 760 drops from ~35 A to 0 A quickly. The current in the FET Q1103 drain wire jumps from 0 A to 27 A and then continues to flow dropping in a linear fashion for about 0.08 seconds.

This current spike (FET Drain Amps) was within the safe operating area specified for the FDH44N50 FET Q1103. The R and L voltage jumps from a battery 760 voltage of 13.4V to around 20V with voltage peaks up to −25V. This voltage spike was well within the voltage limits of the RDEC71H226MWK1H03B intra-stator resonant capacitors C1101, C1102, and C1103. The test was repeated many times, and there was no sign of spark suppression circuit 1140 degradation. The circuits were monitored for ~20 seconds while the alternator 1100 kept running. During that period, the R voltage dropped below the suppression zener D1112 voltage, turning off the suppression FET Q1103. During that time, the alternator 1100 regulator 1130 allowed the alternator rotor coil L1104 to generate a small field that re-excited the stator 1110 coils L1101-L1103. But any current and voltage spikes after 0.08 seconds (referring to FIG. 12) were negligible. Electronic devices, such as an ECM, would be protected as long as they are designed for at least 25-30V.

Example 4

Optionally, it might be determined that higher intra-stator capacitance is advantageous for low-rpm and even mid-rpm operation. But at higher rpm, the intra-stator capacitors are decoupled from the stator inductors. This decoupling could occur, for example, because the alternator 705 is getting too hot and/or because the resonant voltage reaches a set point.

Figure 13:
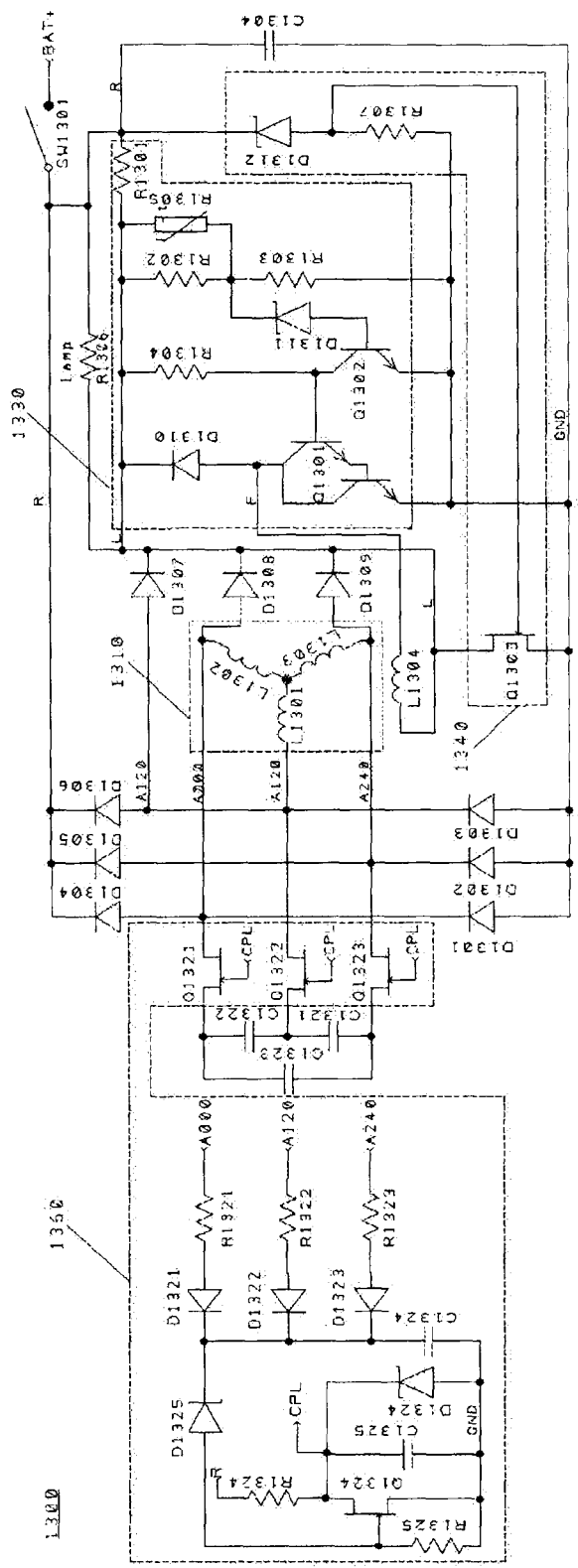
FIG. 13 shows a schematic circuit diagram of an exemplary embodiment of the disclosure.

FIG. 13 is a schematic circuit diagram of an alternator 1300 according to an embodiment of the disclosure. In FIG. 13, most components are embodied in the alternator 705 of FIG. 7 as a unit assembly. These components are bridge-rectifier diodes D1301, D1302, D1303, D1304, D1305, and D1306; trio diodes D1307, D1308, and D1309; stator 1310 inductors L1301, L1302, and L1303; rotor inductor L1304; and capacitor C1304. Alternator 1300 also embodies a regulator circuit 1330 comprising resistors R1301, R1302, R1303, and R1304; thermistor R1305; diode D1310; zener diode D1311; and transistors Q1301 (as a Darlington transistor) and Q1302. The phase nets are A120, A000, and A240. Net labels R, L, and F provide descriptions of important nodes in the alternator 1300. Nets R and GND also comprise terminal nodes on the alternator 705 that are connected to the battery 760 via circuit breaker 755. In normal installations, lamp R1306 and ignition switch SW1301 are provided elsewhere, for example, on an instrument panel. The lamp R1306 is shown in FIG. 13 only to distinguish node R from node L. In this example, SW1301 is a circuit breaker 755 (op. cit. Example 2).

Added to the alternator 1300, as part of the instant disclosure, are intra-stator resonant capacitors C1321, C1322, and C1323. Also added to the alternator 1300 is a voltage-sense decoupling circuit 1360 comprising FETs Q1321, Q1322, Q1323, and Q1324; resistors R1321, R1322, R1323, R1324, and R1325; capacitors C1324 and C1325; diodes 1321, D1322, and D1323; and zener diodes D1324 and D1325. Further added to the alternator 1300 is a spark suppression circuit 1340 comprising FET Q1303, zener diode D1312, and resistor R1307. In this example, all the added components are assembled and connected via wires leading outside the alternator 705.

As the alternator 1300 speed increases, the phase A120, A000, and A240 voltages rise to a level that triggers the phase voltage-sense decoupling circuit 1360. Once triggered, FETs Q1321, Q1322, and Q1323 decouple the resonant capacitors C1321, C1322, and C1323 from the stator 1310 inductors L1301, L1302, and L1303, thereby interrupting the circuit resonance. Should the alternator 1300 speed decrease, the phase voltage-sense decoupling circuit 1360 allows the resonant capacitors C1321, C1322, and C1323 to be coupled (reconnected) to the stator inductors L1301, L1302, and L1303, thereby reintroducing circuit resonance and alternator 1300 boost.

In Example 4, all the equipment setup is the same as for Example 2 except as detailed in the following description. The lamp R1306 is not used. In FIG. 13, nets R and L are connected together on one terminal of the circuit breaker 755 (op. cit. Example 2). The other terminal of the circuit breaker 755 is connected via BAT+ and Load+ to the battery batik 760 and the electronic load 750, respectively. As such, if the circuit breaker 755 is opened, the alternator 1300 output nets R and L would be disconnected from both the electronic load 750 and the battery bank 760. The rotor 710 Field+ and Field− wires are internally connected in the alternator 705 as nets L and F, respectively. A wire (not shown) is connected to L inside the alternator and brought out for connection to externally mounted suppression FET Q1303 drain. The FET Q1303 is an ON Semiconductor/Fairchild FDH44N50. Suppression circuit 1340 zener diode D1312 and resistor R1307 are also connected externally to the alternator 705. Zener diode D1312 is a Nexperia 16V BZX79-B16,133 zener. Resistor R1307 is a 1 k-ohm resistor from RadioShack. A Fluke 80i-110s current clamp encircles the R and L wires near the circuit breaker 755 terminal. A 10:1 voltage probe measures the voltage at the battery 760. Phases A120, A000, and A240 are connected via stove wire (op, cit. Example 1) to the drains of decoupling FETs Q1321, Q1322, and Q1323, which are Nexperia parts PSMN1R1-30EL. Intra-stator resonant capacitors C1321, C1322, and C1323 each consist of five nominally 22 µF RDEC71H226MWK1H03B (op. cit. Example 2) ceramic capacitors in parallel. Also connected to the phase A120, A000, and A240 stove wires are resistors R1321, R1322, and R1323, which are 24 k Ohmite OF243JE available from Ohmite Mfg. Co. of Warrenville, Ill. Diodes D1321, D1322, and D1323 are 1N4148 available from RadioShack. Capacitor C1324 is a 1 µF capacitor available from RadioShack. Zener diode D1324 is an NXP Semiconductors 1N4740A.113 10V zener available from NXP Semiconductors of Netherlands. Zener diode D1325 is a Vishay 1N4743A-TAP 13V zener available from Vishay Intertechnology of Malvern, Pa. C1325 is a 1 µF capacitor available from RadioShack. R1324 and R1325 are 47 k ohm resistors available from RadioShack. FET Q1324 is an ON Semiconductor 2N7000. A 10:1 voltage probe monitors the decoupling circuit 1360 CPL gate control for FETs Q1321, Q1322, and Q1323. Although, in this example, some of the components are wired outside the alternator 705, it is possible to contain the components and circuitry within the alternator 705; however, higher-rated temperature components are advisable.

Figure 14:
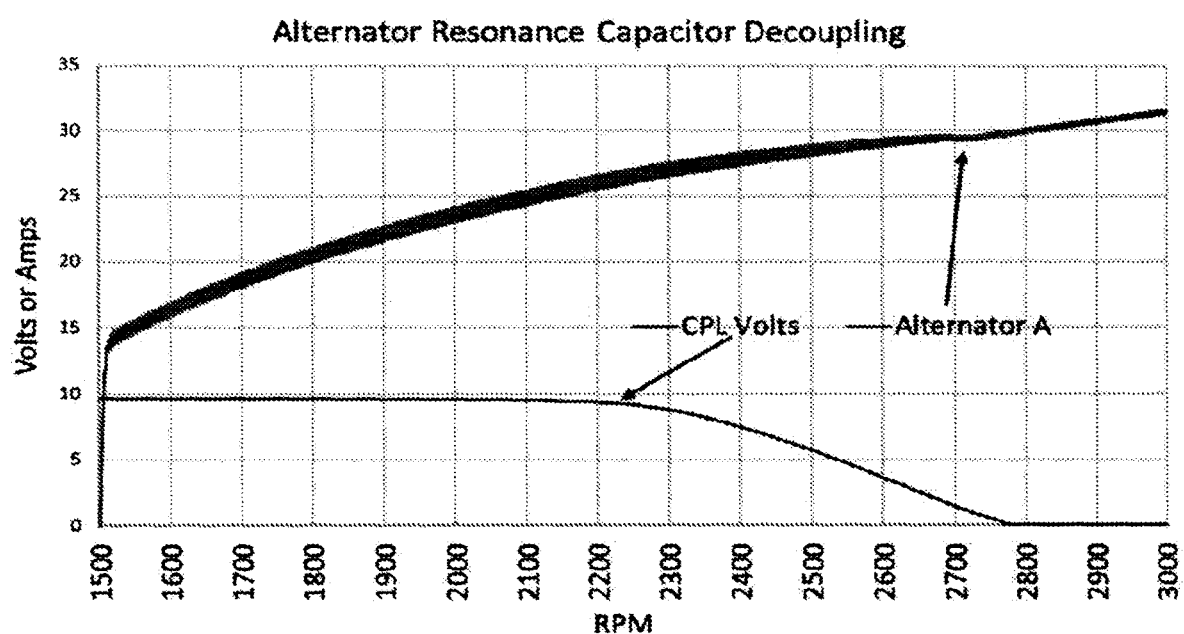
FIG. 14 shows a graph of test results.

Power supply 765 keeps the battery 760 voltage to a minimum of 13.3V. The electronic load 750 keeps the battery 760 voltage at a maximum of 13.6V. This avoids test interference by the alternator 705 regulator circuitry 1330. Power supply 745 starts at 0V and quickly increases until the alternator 705 is running at 1500 rpm. Then the power supply 745 is ramped slowly until the alternator runs at 3000 rpm. At approximately 2300-2700 rpm, gate CPL goes low and intra-stator FETs Q1321, Q1322, and Q1323 decouple the intra-stator resonant capacitors C1321, C1322, and C1323 from the phases A120, A000, and A240 and the stator 1310 inductors L1301, L1302, and L1303. The alternator 705 then has normal output. This coupling/decoupling of the intra-stator capacitors C1321, C1322, and C1323 is useful because, referring to FIG. 9, an intra-stator capacitance of 100 µF per phase produced a higher output from the alternator 705 starting at the idle speed of 1700 rpm until around 2700 rpm. Above around 2700 rpm, the excess stator temperatures can be avoided and there is little drop off in alternator 705 output. FIG. 14 shows the results of Example 4.

Optionally, one might directly connect two 22 µF intra-stator capacitors per phase similar to capacitors C1101, C1102, and C1103 as shown in FIG. 11 but have three 22 intra-stator capacitors C1321, C1322, and C1323 per phase as shown in FIG. 13 that are coupled and decoupled.

Optionally, one might replace the delta-connected intra-stator capacitors C1321, C1322, and C1323 with wye-connected intra-stator capacitors (see FIG. 5). The wye intra-stator capacitors C1321, C1322, and C1323 would be decoupled by intra-stator FETs Q1321, Q1322, and Q1323 in a similar manner to that in Example 4.

Example 5

Figure 15:
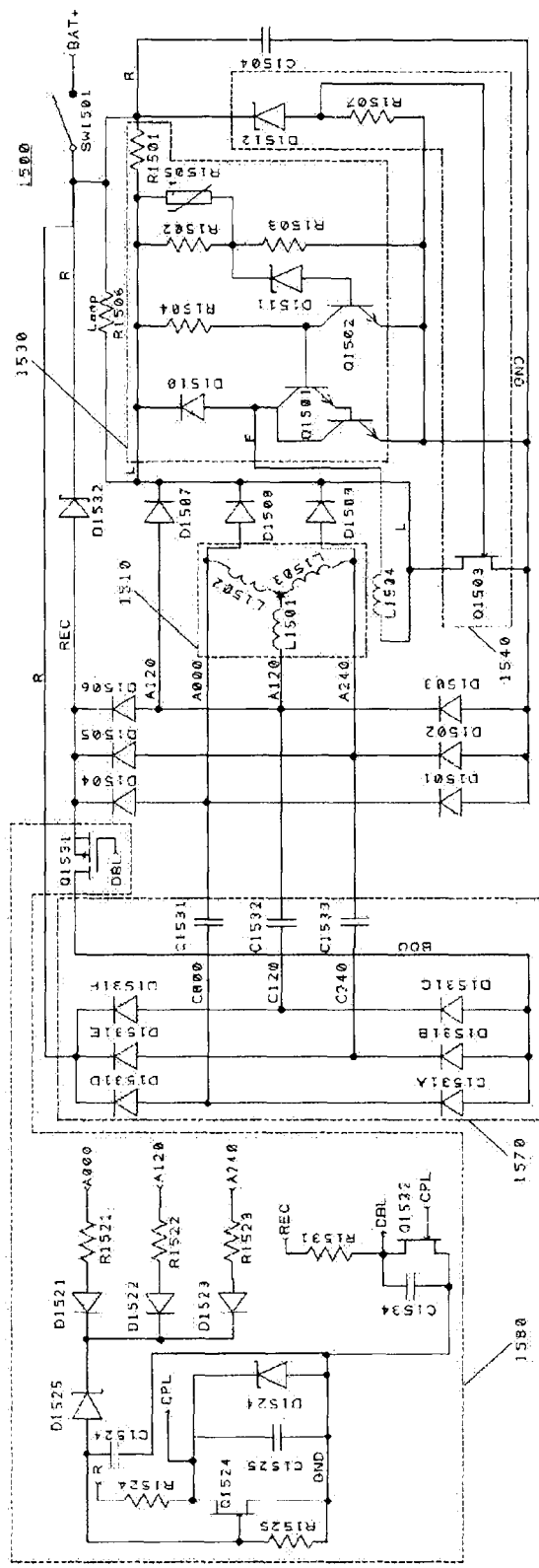
FIG. 15 shows a schematic circuit diagram of an exemplary embodiment of the disclosure.

FIG. 15 is a schematic circuit diagram of an alternator 1500 according to an embodiment of the disclosure. Alternator 1500 embodies an alternative passive resonant approach which involves the use of a voltage-boosting circuit 1570. In FIG. 15, most components are embodied in the alternator 1500 as a unit assembly. These components are bridge-rectifier diodes D1501, D1502, D1503, D1504, D1505, and D1506; trio diodes D1507, D1508, and D1509; stator 1510 inductors L1501, L1502, and L1503; rotor 710 inductor L1504; and capacitor C1504. Also embodied in the unit assembly of the alternator 1500 is a regulator circuit 1530 comprising resistors R1501, R1502, R1503, and R1504; diode D1510; zener diode D1511; thermistor R1505; and transistors Q1501 (as a Darlington transistor) and Q1502. The phase nets are A120, A000, and A240. Nets R, L, and F provide descriptions of important nodes in the alternator 1500. Nets R and GND also comprise terminal nodes on the alternator 705 that are connected to the battery 760 via circuit breaker 755. In normal installations, lamp R1506 and ignition switch SW1501 are provided elsewhere, for example, on an instrument panel. In this example, SW1501 is a circuit breaker 755 (op. cit. Example 2).

In Example 5, added to the alternator 1500, as part of the instant disclosure, are a phase voltage-sense decoupling circuit 1580 comprising resistors R1521, R1522, R1523, R1524, R1525 and R1531; diodes D1521, D1522, and D1523; capacitors C1524, C1525 and C1534; zener diodes D1524 and D1525; and, FETs Q1524, Q1531, and Q1532. Also added to the alternator 1500 is a spark suppression circuit 1540 comprising FET Q1503, zener diode D1512, and resistor R1507. Further added to the alternator 1500, in a voltage-boosting circuit 1570, are capacitors C1531, C1532, and C1533; and bridge-rectifier intra-stator diodes D1531A, D1531B, D1531C, D1531D, D1531E, and D1531F (hereinafter referred to as a bridge rectifier D1531). Also added, to the alternator 1500, is rectifier diode D1532. In this example, all the added components are assembled and connected via wires leading outside the alternator 1500.

In operation, stator 1510 generates AC power in the phases A000, A120, and A240. Some of that power is rectified by the first bridge rectifier comprised of diodes D1501-D1506. That first bridge rectifier generates a DC voltage on net REC that, when the coupling circuit 1580 allows, via FET Q1531, biases net BOO and the anode of the second bridge rectifier D1531 to a voltage greater than GND. Some of the phase A000, A120, and A240 AC power passes through voltage-boosting circuit 1570 resonant capacitors C1531-C1533 via phases C000, C120, and C240 for rectification by bridge-rectifier diode 1531. In effect, the voltage on power net R is greater than that of power net REC. As a practical matter, the voltage on power net R is just above the instant acceptance voltage of the battery 760, but the voltage-boosting circuit 1570 significantly increases current flowing into the battery 760.

In Example 5, components C1531, C1532, and C1533 each consist of ten nominally 22 µF RDEC71H226MWK1H3B capacitors (op. cit. Example 2) wired in parallel. Bridge rectifier D1531 is an IXYS chip FUS45-0045B available from IXYS Corporation of Milpitas, Calif. Component Q1531 is a P-Channel FET FDMS6681Z having a−25 Vgs rating available from ON Semiconductors. Rectifier diode D1532 is an IXYS DSS60-0045B. FETs Q1524 and Q1532 are each ON Semiconductor 2N7000 devices. Capacitor C1534 is a Kemet C320C475K3N5TA91707301 4.7 µF capacitor available from Kemet Corporation of Ft. Lauderdale, Fla. Resistor R1531 is a 1,500 ohm resistor available from RadioShack. Resistors R1521, R1522, and R1523 are Yageo MRF-25FBF52-3K4 3,400 ohm resistors available from Yageo Corporation of Taiwan. Diodes D1521, D1522, and D1523 are 1N4148 diodes available from RadioShack. Capacitor C1524 is a Kemet C320C475K3N5TA91707301 4.7 μF capacitor. Capacitor C1525 is a TDK Corporation 22 nF FA18X7R1H223KNU00 capacitor available from TDK Corporation of Japan. Diode D1524 is a 10V zener diode (op. cit. Example 4). Diode D1525 is a 1.3V zener diode (op. cit. Example 4). Resistor R1524 is a 15,000 ohm Vishay Dale CMF5515K000FHEB resistor. Resistor R1526 is a 22,000 ohm resistor available from RadioShack.

Figure 16:
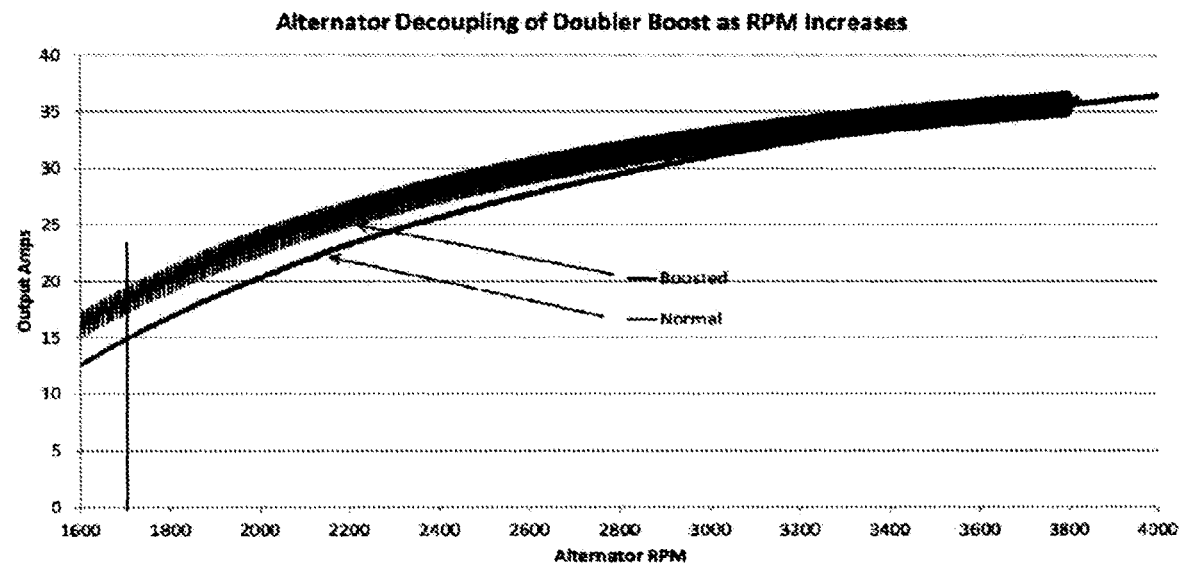
FIG. 16 shows a graph of results.

In Example 5, all the equipment is set up just like Example 4 except for the component changes detailed above. The power supply 745 is used to quickly accelerate the alternator 705 to 1500 rpm and then slowly accelerate the alternator 705 to around 4000 rpm. Two runs are made. During the first run, the boost circuitry is disabled, for normal alternator 1500 operation, by disconnecting the decoupling circuit 1580 FET Q1532 CPL gate connection and jumpering the decoupling circuit 1580 FET Q1531 gate to net R. The current in nets R and L are encircled and measured with the Fluke 80i-110s current clamp just before circuit breaker 755. The curve labeled Normal in FIG. 16 shows the results of this test. In a second run, the boost circuitry and the coupling option are enabled by reconnecting the decoupling circuit 1580 FET Q1532 gate to the CPL signal connection. The jumper between net R and FET Q1531 gate is also removed. The boosted output of the alternator 1500 is shown in FIG. 16. Above~3,800 rpm, the decoupling circuit 1580 disables the voltage-boosting circuitry 1570, and the alternator 1500 output returns to normal output.

Figure 17:
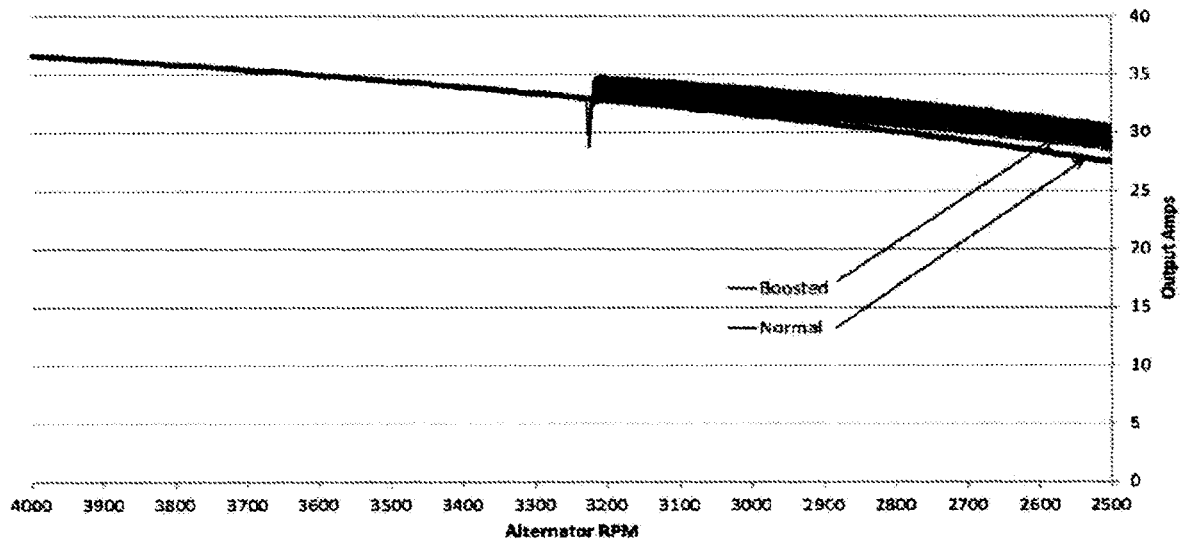
FIG. 17 shows a graph of results.

Two other runs are made with the alternator 705 being slowed from 4,000 rpm to around 2,500 rpm. The results of these runs are shown in FIG. 17. For the voltage-boosting run, coupling of the voltage-boosting circuit 1570 is enabled, and there is no jumper between net R and the Q1531 gate. The output is normal (i.e., not boosted) from 4,000 rpm until 3,200 rpm. Below 3,200 rpm, the decoupling circuit 1580 re-connects the voltage-boosting circuitry 1570 providing boosted alternator 1500 output. The final run shows the alternator 1500 output without boost measured by disabling the gate on FET Q1531 and jumpering FET Q1531 gate to net R. This run is labeled Normal.

In FIG. 16, comparing the alternator 1500 boost output of around 18.6 amps at 1,700 rpm alternator 1500 idle speed versus a normal output of around 15 amps at alternator 1500 idle speed, it is seen that the voltage-boosting method provides a~24% increase in output. Converting the resistor R1525 to a potentiometer allows an easy adjustment of the decoupling rpm for the alternator 1500. For example, if the alternator 1500 stator 1510 overheats over certain rpms, then the potentiometer R1525 can be adjusted to allow the decoupling circuit to disengage the boost circuit at lower alternator 1500 rpm. The decoupling circuit 1580 is designed such that coupling of the voltage-boosting circuit 1570 will not engage at rpms higher than the decoupling rpm.

The voltage-boosting approach can be further boosted by the addition of intra-stator resonant capacitors in delta configuration and/or in wye configuration.

Some alternators comprise multiple stators coupled with multiple bridge rectifiers. For example, a ProStart 13868 alternator available from Pep Boys comprises two three-phase stators, each stator clocked 30° relative to the other, and two three-phase bridge rectifiers.

Figure 18A:
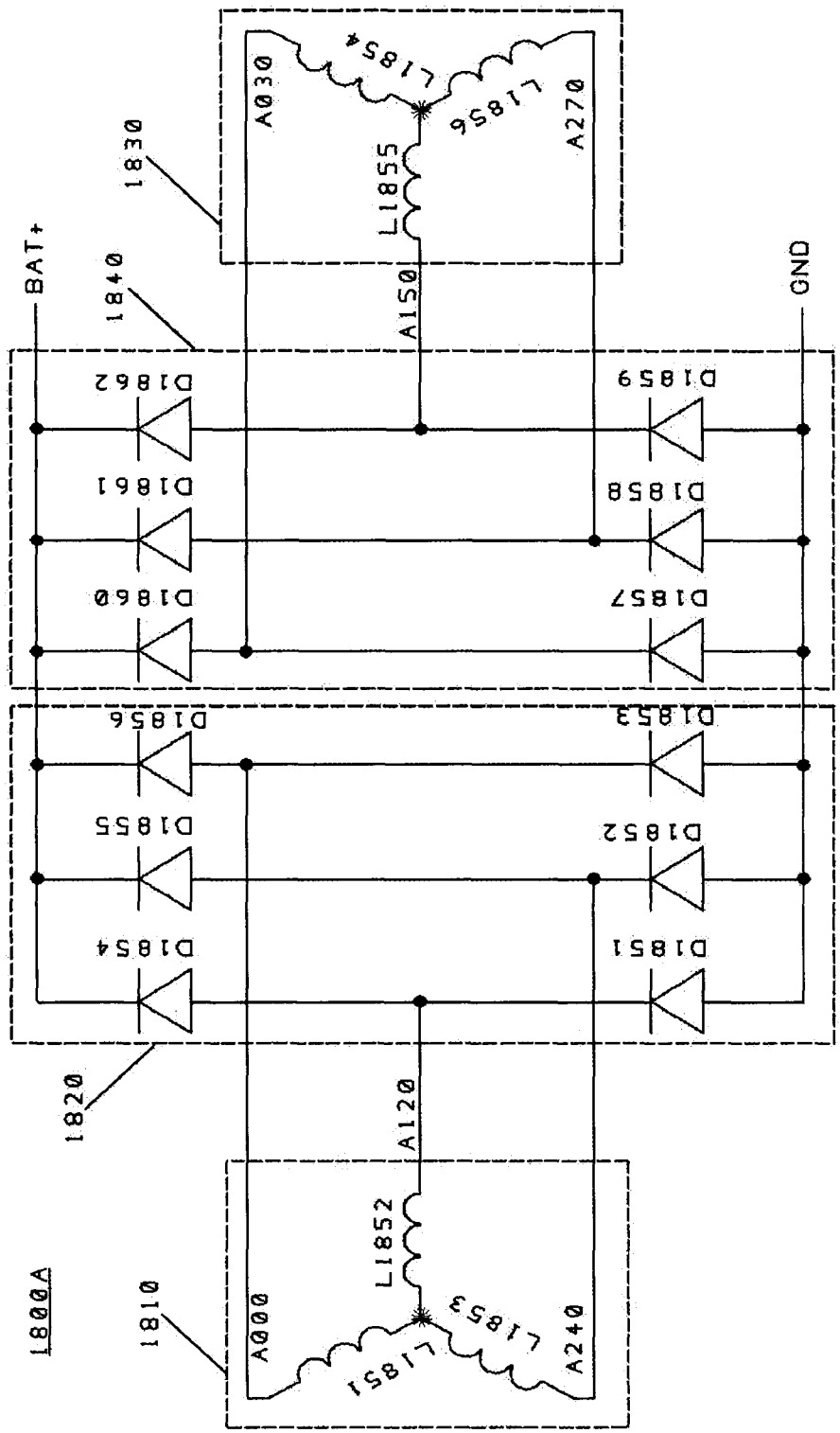
FIG. 18A shows a schematic circuit diagram of a prior-art, dual-stator alternator with a dual-bridge rectifier.

FIG. 18A shows a diagram of the connections between two three-phase stators 1810 and 1830 and two three-phase bridge rectifiers 1820 and 1840 in an alternator 1800A. As shown in FIG. 18A, inductor coils L1851, L1852, and L1853 of the first stator 1810 are respectively connected through power nets A000, A120, and A240 to the first three-phase bridge rectifier 1820 comprising diodes D1851, D1852, D1853, D1854, D1855, and D1856. Similarly, inductor coils L1854, L1855, and L1856 of the second stator 1830 are respectively connected through power nets A030, A150, and A270 to the second three-phase bridge rectifier 1840 comprising diodes D1857, D1858, D1859, D1860, D1861, and D1862. The net names relate to the phase differences between the connections. For example, net A000 is 30° out of phase with net A030. In FIG. 18A, the bridge rectifiers 1820 and 1840 are shown connected to BAT+ and GND, although there may be intermediate switches and other electrical components which are not shown and are between the bridge rectifiers 1820 and 1840 and the battery 760 of FIG. 7.

The phases of the stators 1810 and 1830 were determined by first opening up the alternator 1800A and identifying the connections between the bridge-rectifier pairs. For example, referring to FIG. 18A, the connection between diodes D1853 and D1856 was identified by visual inspection. Next, #12 gauge stove wire (op. cit. Example 1) was soldered in connection with each of the six bridge-rectifier diode connections. Then, the alternator 1800A was reassembled bringing the phase wires outside the alternator 1800A. Next, the resistance between phases was measured. The phases of one stator will have low resistance phase-to-phase. Each phase of one stator will have high or infinite resistance to all the phases of the other stator. This is used to distinguish the phase wires of the first stator 1810 from the phase wires of the second stator 1830. Next, the alternator 705 was mounted on the drill press 720 of FIG. 7 and connected to net GND and net R which eventually lead to battery 760 via net BAT+. The rotor field coil 710 was connected to power supply 715 via net Field+ and net Field−. The power supply 715 current was set to 6 amps. 10:1 voltage probes were connected to the first stator phases and to the Fluke 190-204 4-channel scope (op. cit. Example 1). A phase of the first stator 1810 was arbitrarily assigned the phase net name A000. The other phases of both the first stator 1810 and the second stator 1830 were identified by measuring the phase offset of the sinusoidal AC output relative to phase net A000.

In FIGS. 18B-18E, all the ProStart 13868 alternator components and phase net names remain the same as in FIG. 18A. The inventive changes that occur relate to the addition of inter-stator capacitors and the order by which the inter-stator capacitors are connected to the phase nets. For example, in alternator 1800B of FIG. 18B, inter-stator capacitor C1851 is connected to first stator 1810 phase net A000 and second stator 1830 phase net A030. In operation, the inter-stator capacitor C1851 is connected between two phases 30° offset. Similarly, inter-stator capacitors C1852 and C1853 are both connected between two phases 30° offset.

Figure 18B:
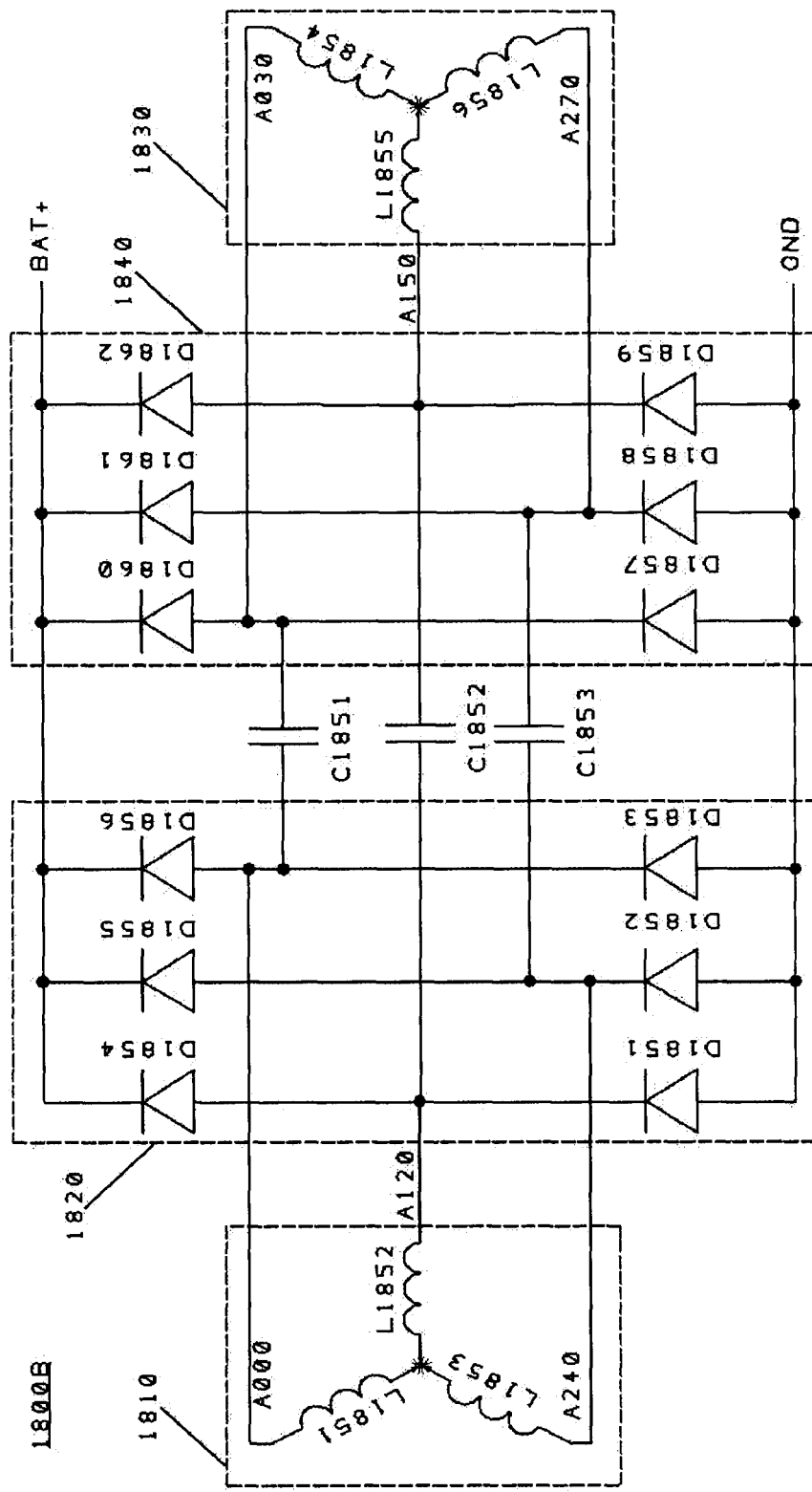
FIGS. 18B-18E show schematic circuit diagrams of dual-stator alternators with dual-bridge rectifiers, modified with inter-stator resonant boost components according to exemplary embodiments of the disclosure.
Figure 18C:
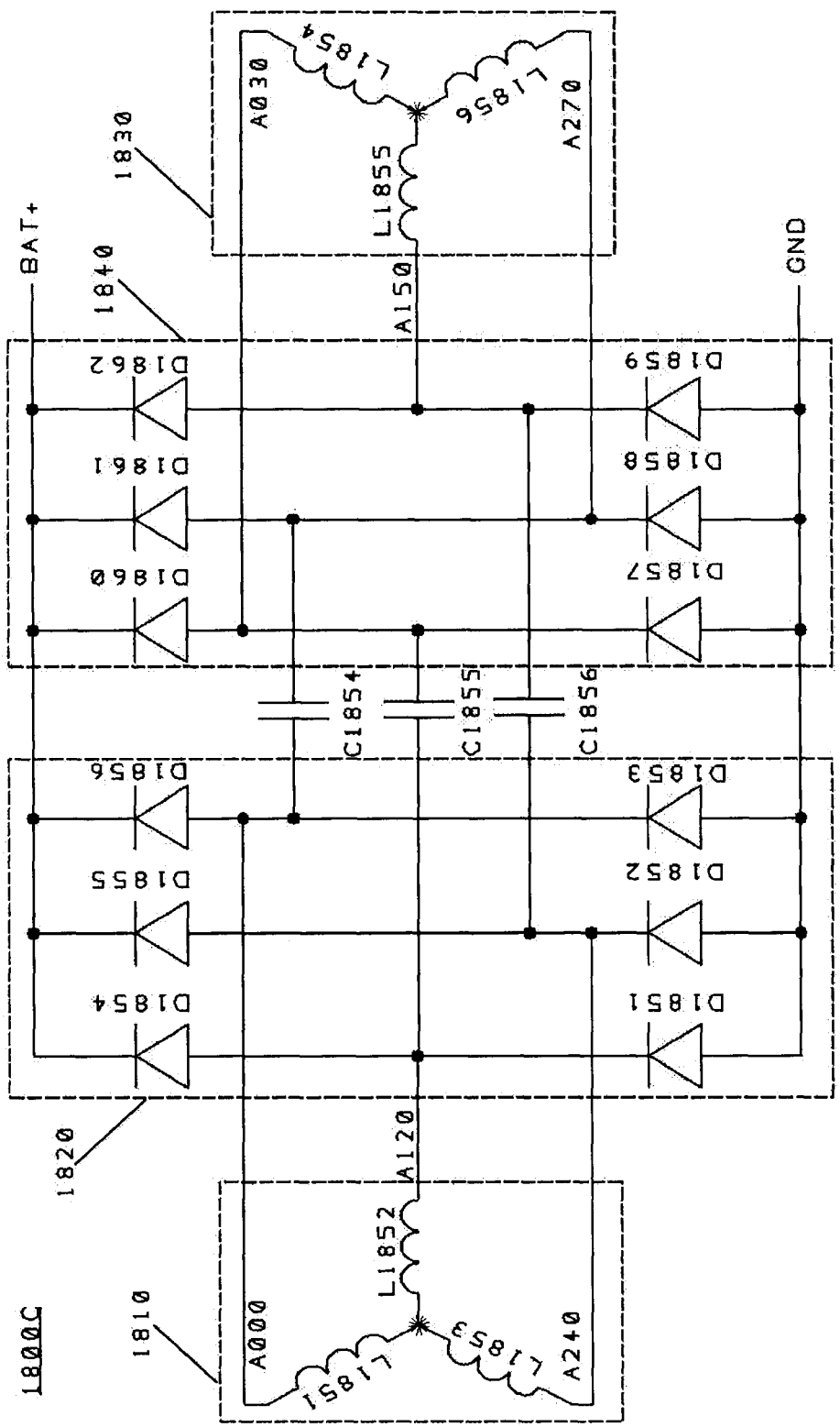

In alternator 1800C of FIG. 18C, inter-stator capacitors C1854, C1855, and C1856 are connected 90° offset between two phases of the first stator 1810 and the second stator 1830.

Figure 18D:
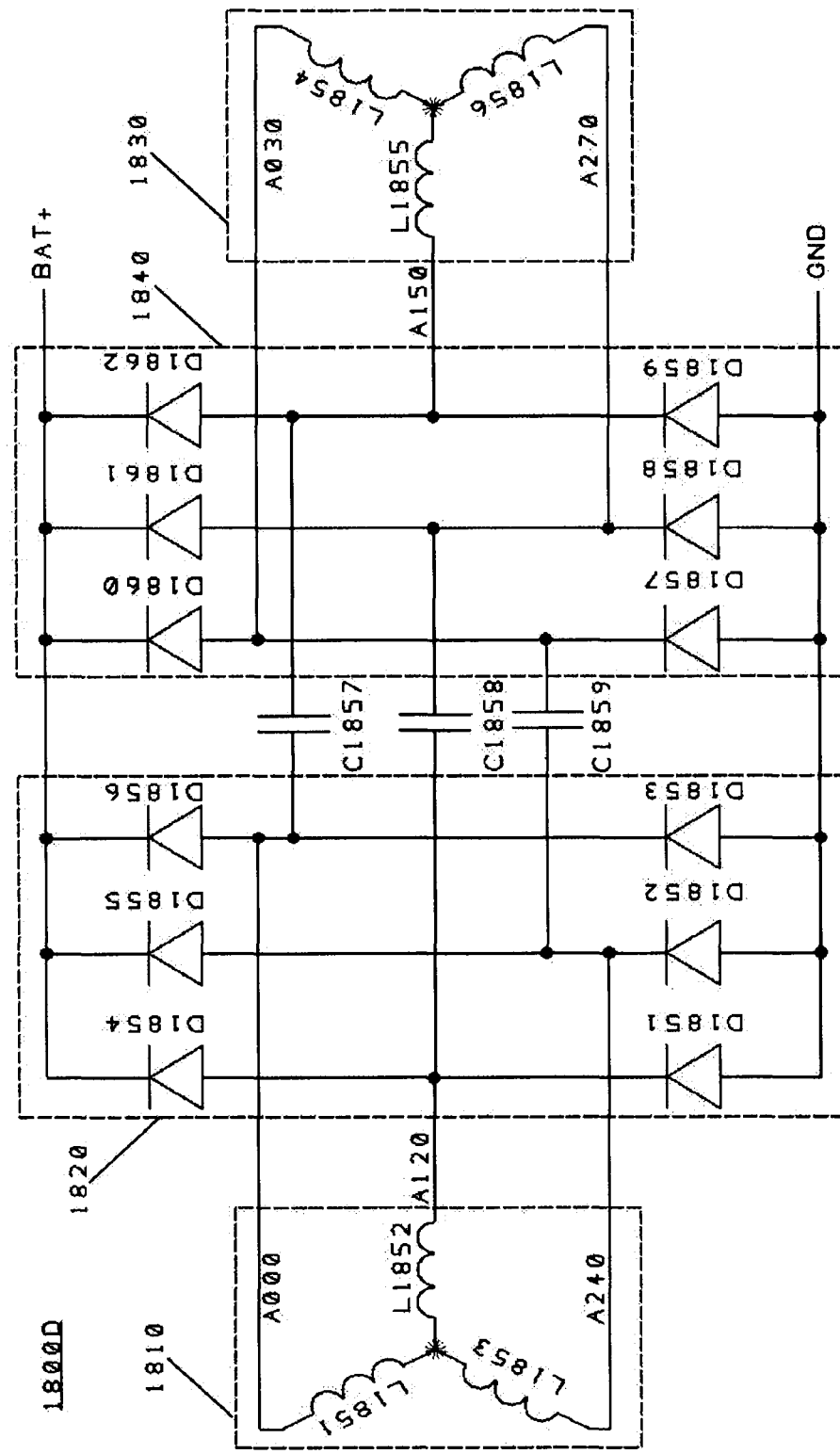

In alternator 1800D of FIG. 18D, inter-stator capacitors C1857, C1858, and C1859 are connected 150° offset between two phases of the first stator 1810 and the second stator 1830.

Figure 18E:
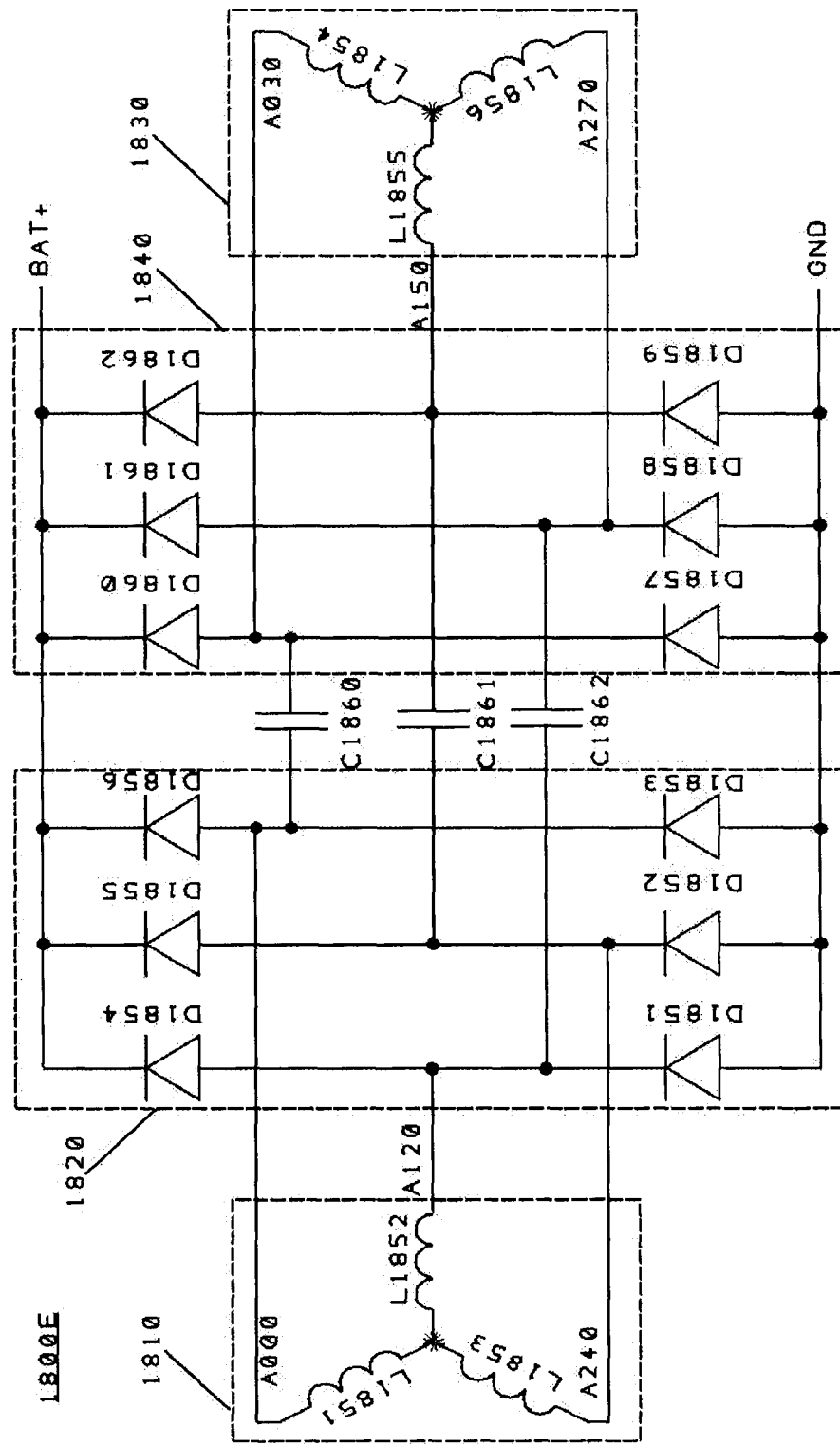

In alternator 1800E of FIG. 18E, inter-stator capacitors C1860, C1861, and C1862 are connected 30°, 90°, and 150°, respectively, offset between two phases of the first stator 1810 and the second stator 1830. Such a condition would occur if a manufacturer did not first identify the phases and began randomly connecting the phase nets of each stator, taking care to only connect one inter-stator capacitor lead to one phase net for all leads and nets.

In Example 6, the ProStart 13868 alternator was used to compare the performance of the various configurations of FIGS. 18A-18E. This alternator 705 of FIG. 7 does not have a regulator and does not have a diode trio for internally powering the field coil rotor 710. The field coil rotor 710 was powered by power supply 715 at a fixed 6-amp current for all tests. The alternator 705 was mounted in the drill press 720 and rotated at 1300 rpm for all tests. When establishing the tests for Example 6, it was found that different states of battery 760 charge and different battery 760 charge-acceptance rates led to a significant variation in results. For this testing, the battery 760 was not used. Instead, the electronic load 750 was set up for constant-current load operation to simulate a non-variable battery 760 load or a non-variable grid load. In this set of tests, an additional electronic load 750A (not shown) was placed in parallel with the Kikusui unit 750. This additional electronic load 750A was a B&K Precision 8540 electronic load available from B&K Precision Corporation of Yorba Linda, Calif., providing 150W of additional load absorption. Net BAT+ in FIGS. 18A-18E was the same as net R and net Load+ in FIG. 7. Amperage readings for the alternator 705 output were measured just before circuit breaker 755 on net using the Fluke 80i-1105 current clamp (op. cit. Example 1) and collected using the Fluke 190-204 4-channel scope (op. cit. Example 1). Voltage measurements were made using a 10:1 probe on net R.

The constant-current settings on the electronic load 750 were changed every 6 minutes in steps of 10, 15, 21, 26, 31, 36, 41, 46, 51, 56, and 65 amp loads. To achieve this test-to-test, a Tekpower TP3005P programmable power supply (not shown, available from Tekpower.us of Monclair, Calif.) was programmed to increment the amp loads for the 6-minute period by outputting a voltage that controlled the electronic load 750 current load for that period. The actual amp data and volt data of the alternator 705 output was recorded by the Fluke scope. This data was transferred to a spreadsheet and then the average amps and average volts for each period were calculated. From time to time during the testing, the rpm of the alternator 705 was checked using the Cen-Tech™ 66632 tachometer (op. cit. Example 1). Adjustments to the power supply 745 controlling the motor controller 740 were made to keep the alternator 705 at approximately 1300 rpm.

In Example 6, the inter-stator resonant capacitors C1851 through C1862 each consist of ten nominally 22 µF RDEC71H226MWK1H03B capacitors (op. cit. Example 2) wired in parallel to form nominally 220 µF in total. That is, for example, inter-stator capacitor C1851 had a total nominal capacitance of 220 µF. Table 6 shows the measured average volts and amps output, from the alternator, when tested with no capacitors in the FIG. 18I (No Boost) columns and when tested with inter-stator resonant capacitors in the remaining columns.

TABLE 6

| FIG. 18A Volts | No Boost Amps | FIG. 18B Volts | 30° Offset Amps | FIG. 18C Volts | 90° Offset Amps | FIG. 18D Volts | 150° Offset Amps | FIG. 18E Volts | 30°, 90°, 150° Offsets Amps |
|---|---|---|---|---|---|---|---|---|---|
| 15.0 | 10.1 | 15.5 | 10.2 | 15.6 | 10.2 | 16.5 | 10.1 | 15.8 | 10.2 |
| 14.6 | 15.3 | 14.7 | 15.4 | 15.1 | 15.4 | 15.7 | 15.4 | 15.2 | 15.4 |
| 14.2 | 20.5 | 14.2 | 20.6 | 14.8 | 20.6 | 15.1 | 20.6 | 14.7 | 20.6 |
| 13.8 | 25.8 | 13.9 | 25.8 | 14.4 | 25.8 | 14.8 | 25.8 | 14.3 | 25.8 |
| 13.4 | 30.8 | 13.5 | 30.9 | 14.1 | 30.8 | 14.4 | 30.8 | 13.9 | 30.9 |
| 13.0 | 36.0 | 13.2 | 36.0 | 13.7 | 36.0 | 14.1 | 36.0 | 13.5 | 36.0 |
| 12.6 | 41.0 | 12.9 | 41.0 | 13.3 | 41.0 | 13.6 | 41.0 | 13.0 | 41.0 |
| 12.2 | 46.0 | 12.6 | 46.0 | 12.9 | 46.0 | 13.2 | 46.0 | 12.6 | 46.0 |
| 11.8 | 50.8 | 12.2 | 50.8 | 12.5 | 50.8 | 12.6 | 50.8 | 12.2 | 50.9 |
| 11.3 | 55.7 | 11.9 | 55.8 | 12.1 | 55.7 | 12.1 | 56.0 | 11.9 | 55.8 |
| 10.3 | 65.3 | 11.2 | 65.3 | 11.2 | 65.3 | 11.1 | 65.5 | 11.1 | 65.4 |

Figure 19:
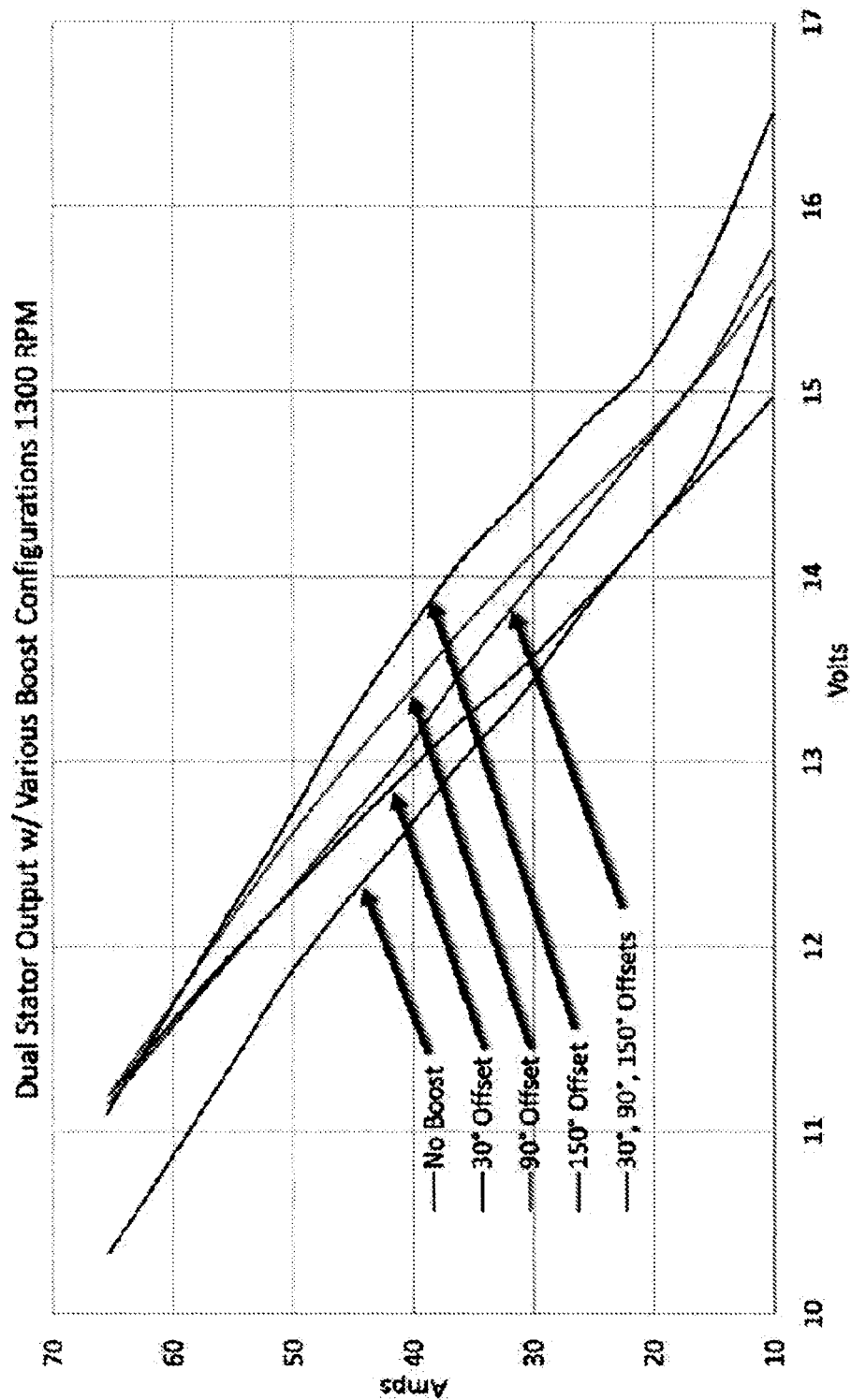
FIG. 19 shows a graph of test results.

The results of Example 6 are easier to interpret in FIG. 19. The boost from the FIG. 18D 150° offset inter-stator resonant capacitors C1857, C1858, and C1859 provides the preferred performance relative to the other FIG. 18B 30° offset, FIG. 18C 90° offset, and FIG. 18E 30°, 90°, 150° offset inter-stator resonant boost configurations.

Many configurations are possible with dual-stator alternators. For example, intra-stator resonance capacitors can be embodied in just one stator or both stators as shown in FIGS. 20A through 20D. In these figures, the alternator 705 of FIG. 7 comprises two stators. A first stator 2010 comprises inductors L2051, L2052, and L2053. A second stator 2030 comprises inductors L2054, L2055, and L2056. The first and second stators 2010 and 2030 are clocked 30° different from each other. The first stator 2010 has phase nets A000, A120, and A240. The second stator 2030 has phase nets A030, A150, and A270. The phase nets of each stator are connected to bridge-rectifier diodes. The phase nets of the first stator 2010 are connected to diodes D2051, D2052, D2053, D2054, D2055, and D2056. The phase nets of the second stator 2030 are connected to diodes D2057, D2058, D2059, D2060, D2061, and D2062. All the inductors L2051 through L2056, phase nets A000 through A270, and diodes D2051 through D2062 are internal to the alternator as an integral unit. The phases A000 through A270 were identified as described earlier. All the intra-stator resonant capacitors of FIGS. 20A through 20D were connected to the phases via the stove wires outside the alternator.

Figure 20A:
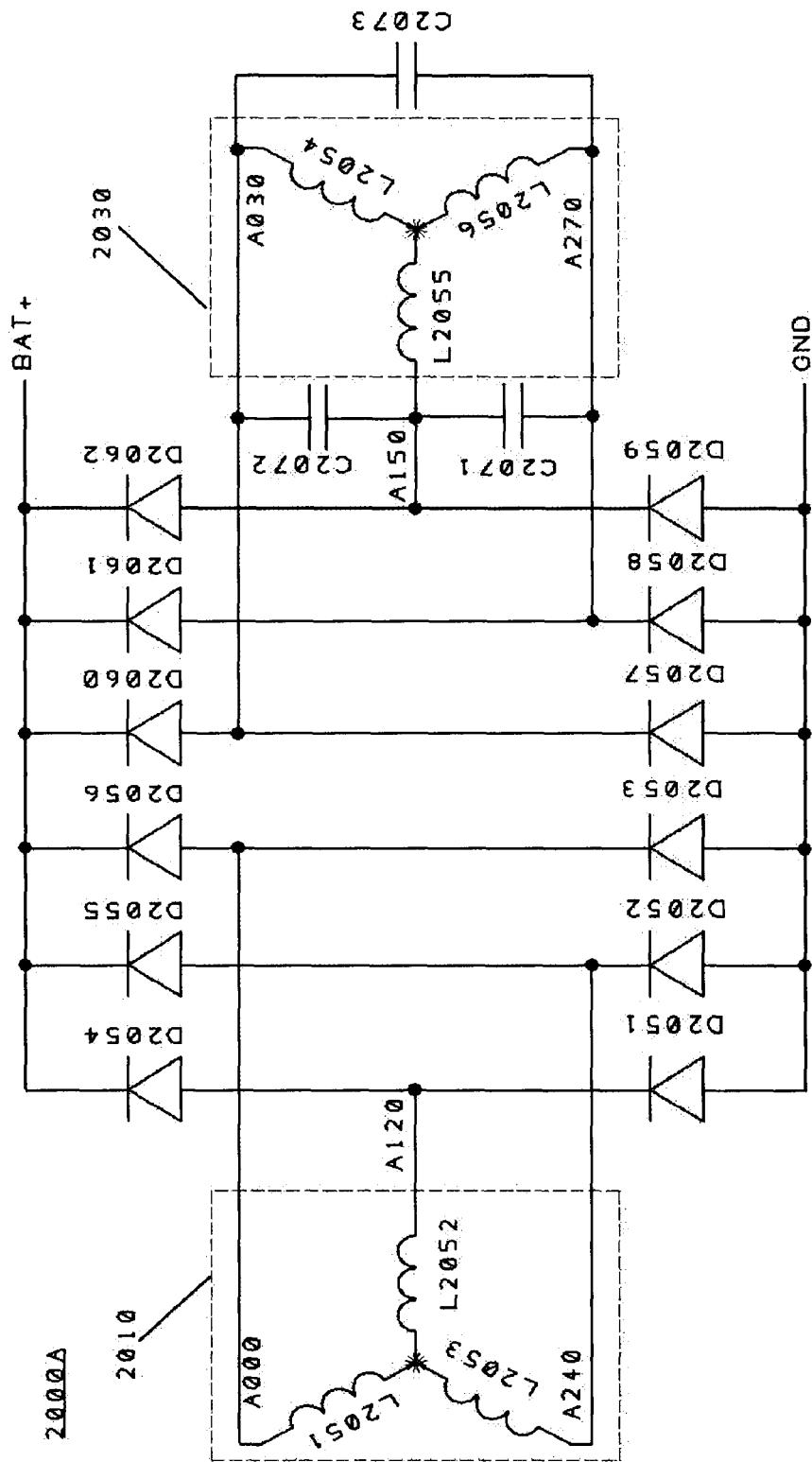
FIGS. 20A-20D show schematic circuit diagrams of dual-stator alternators with dual-bridge rectifiers, modified with intra-stator resonant boost components according to exemplary embodiments of the disclosure.

FIG. 20A shows alternator 2000A having three intra-stator resonant capacitors C2071, C2072, and C2073 connected in delta configuration among the phases A030, A150, and A270 of the second stator 2030.

Figure 20B:
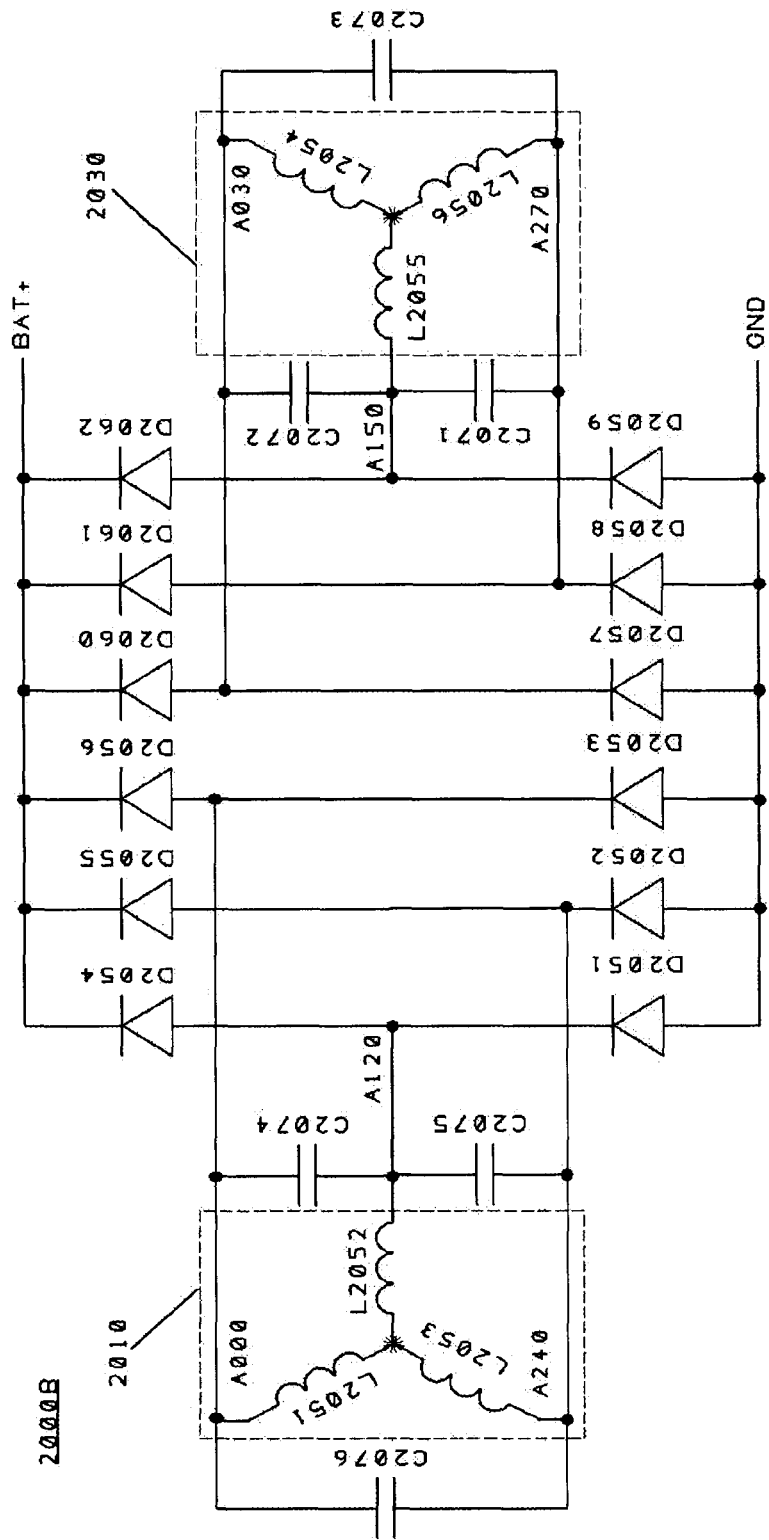

Alternator 2000B of FIG. 20B adds three intra-stator resonant capacitors C2074, C2075, and C2076 connected in delta configuration among the phases A000, A120, and A240 of the first stator 2010 leaving the intra-stator resonant capacitors C2071, C2072, and C2073 connected to the phases A030, A150, and A270 of the second stator 2030 as shown in FIG. 20A.

Figure 20C:
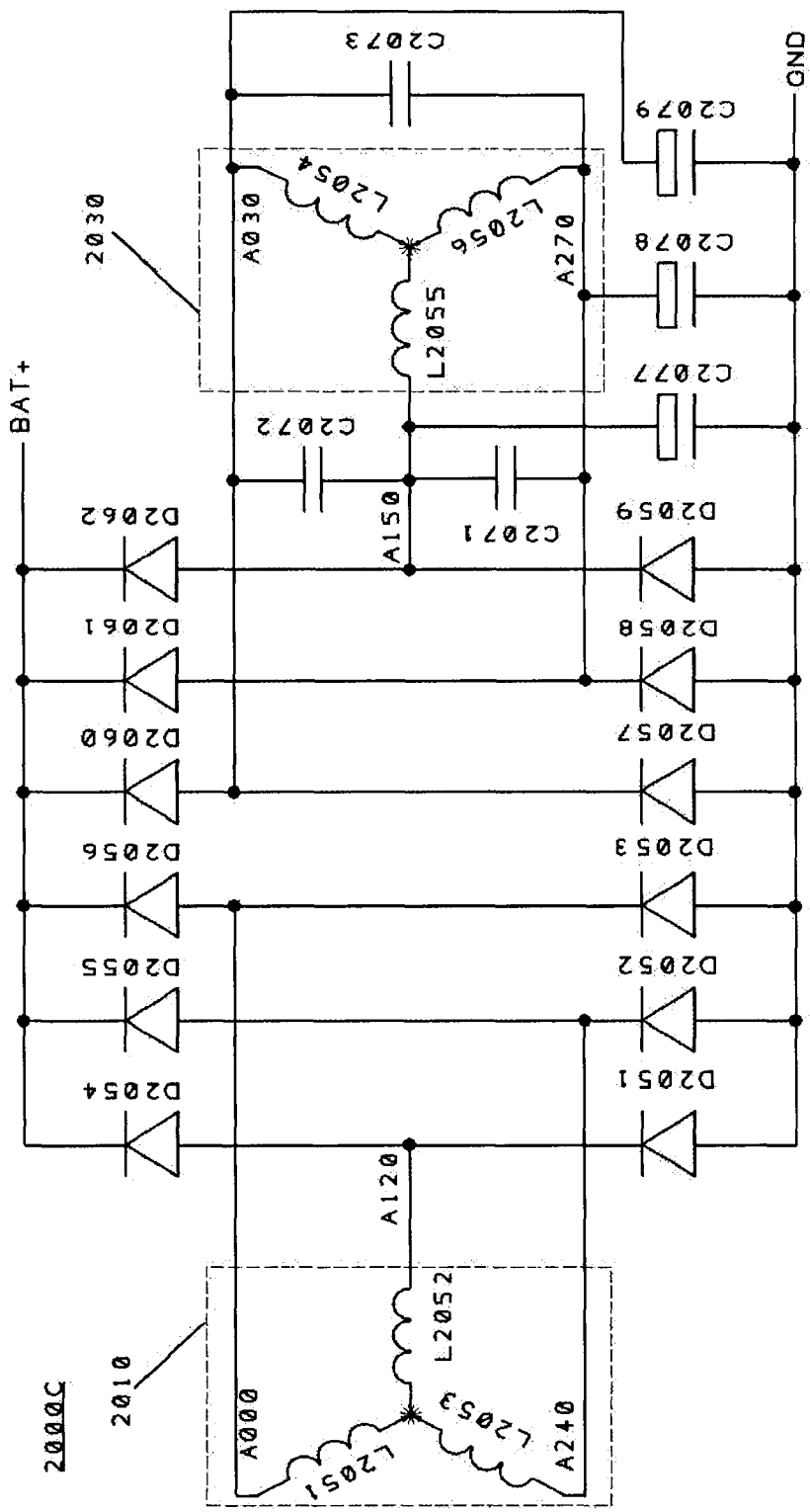

Alternator 2000C of FIG. 20C adds three intra-stator resonant capacitors C2077, C2078, and C2079 connected in a wye configuration among the phases A030, A150, and A270 of the second stator 2030 leaving the intra-stator resonant capacitors C2071, C2072, and C2073 connected to the phases A030, A150, and A270 of the second stator 2030 as shown in FIG. 20A.

Figure 20D:
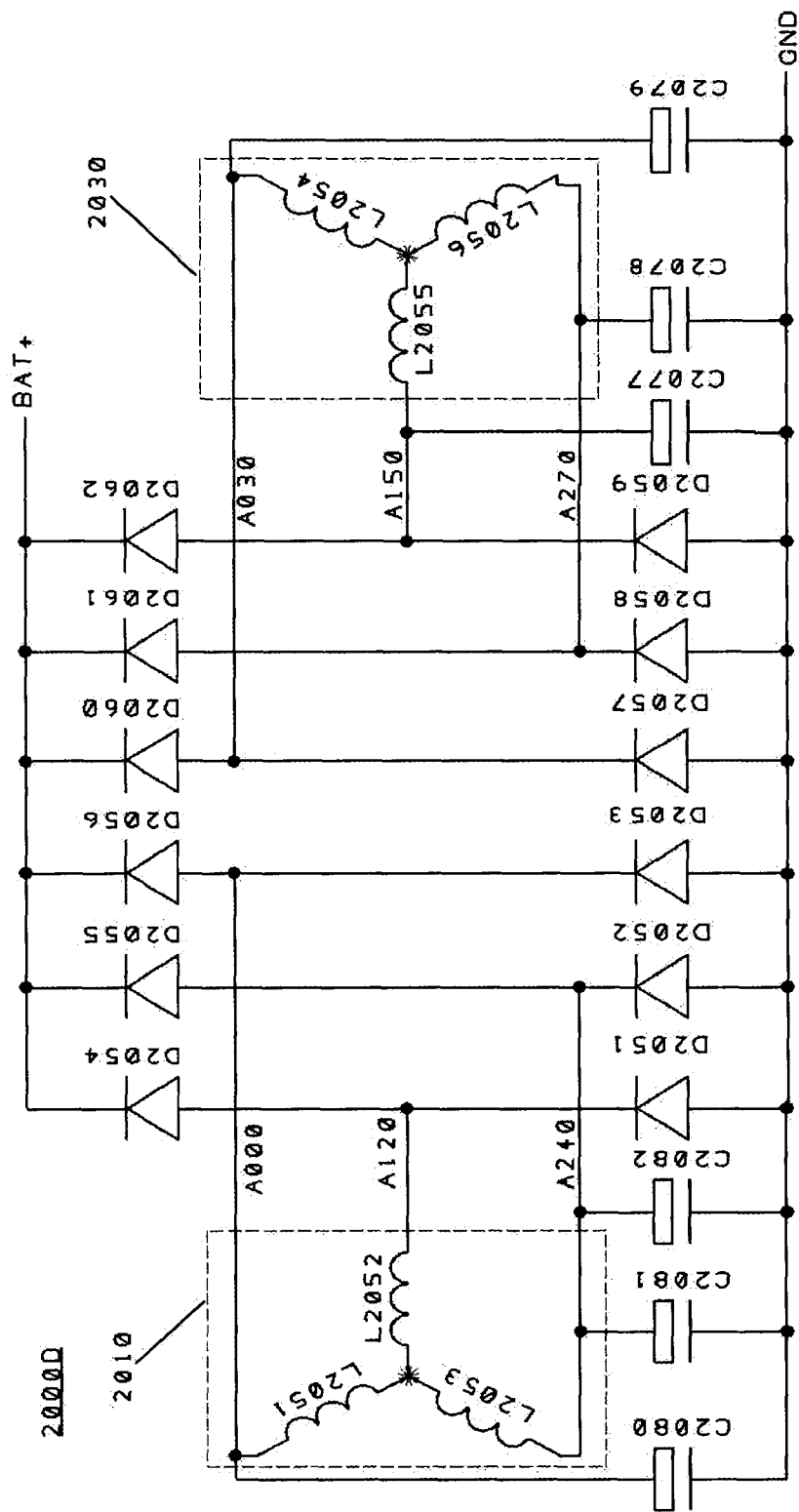

Alternator 2000D of FIG. 20D modifies FIG. 20C by removing intra-stator delta capacitors C2071, C2072, and C2073 and adding intra-stator resonant capacitors C2080, C2081, and C2082 in a wye configuration among the phases A000, A120, and A240 of the first stator 2010.

Example 7

In Example 7, the alternator 705 of FIG. 7 was the ProStart 13868 as described in Example 6. The alternator 705 was connected just as in Example 6 except for the phase connections to the resonant capacitors. As in Example 6, the delta-configured resonant capacitors C2071, C2072, C2073, C2074, C2075, and C2076 each consist of ten nominally 22 µF RDEC71H226MWK1H03B capacitors (op. cit. Example 2) wired in parallel to form nominally 220 µF. That is, for example, intra-stator resonant capacitor C2071 had a nominal capacitance of 220 µF in total. The wye-configured intra-stator resonant capacitors C2077, C2078, C2079, C2080, C2081, and C2082 each consist of five 220 µF United Chemi-Con EKYB800ELL221MJ25S aluminum electrolytic capacitors wired in parallel to form nominally 1100 µF capacitance each. That is, for example, intra-stator resonant capacitor C2077 had a nominal capacitance of 1100 µF in total. As in Example 6, the alternator 705 rpm was kept at 1300 rpm for all tests. As in Example 6, there was no battery 760 connection, and the electronic load 750 was put in constant-current mode controlled by the same programmable power supply to provide multiple steps of constant-current load for 6-minute periods. The electronic load 750A was also used in the testing. As in Example 6, the voltage and amperage output from the alternator 705 was collected, by the Fluke current clamp and 10:1 probe on net R. The data from each test were collected by the Fluke scope and then transferred to a spreadsheet where an average current and average voltage were calculated for each current load step. Table 7 shows the alternator boost performance for configurations as shown in FIGS. 20A through 20D.

TABLE 7

| FIG. 20A Volts | One Delta Stator Amps | FIG. 20B Volts | Two Delta Stators Amps | FIG. 20C Volts | One Delta Stator and One Wye Stator Amps | FIG. 20D Volts | Two Wye Stators Amps |
|---|---|---|---|---|---|---|---|
| 14.7 | 20.6 | 14.9 | 20.6 | 15.97 | 20.57 | 17.08 | 20.58 |
| 14.3 | 25.8 | 14.5 | 25.8 | 15.59 | 25.79 | 16.65 | 25.79 |
| 14.0 | 30.9 | 14.2 | 30.8 | 15.23 | 30.86 | 16.19 | 30.85 |
| 13.6 | 36.0 | 13.9 | 36.0 | 14.82 | 35.96 | 15.81 | 35.98 |
| 13.2 | 41.0 | 13.5 | 41.1 | 14.41 | 41.01 | 15.38 | 41.00 |
| 12.8 | 46.0 | 13.2 | 46.1 | 13.99 | 46.00 | 14.97 | 45.99 |
| 12.4 | 50.8 | 12.9 | 50.8 | 13.59 | 50.81 | 14.53 | 50.81 |
| 12.0 | 55.8 | 12.6 | 55.7 | 13.21 | 55.85 | 14.42 | 53.85 |
| 11.1 | 65.3 | 11.9 | 65.3 | 12.40 | 65.30 | 13.23 | 65.50 |

Figure 21:
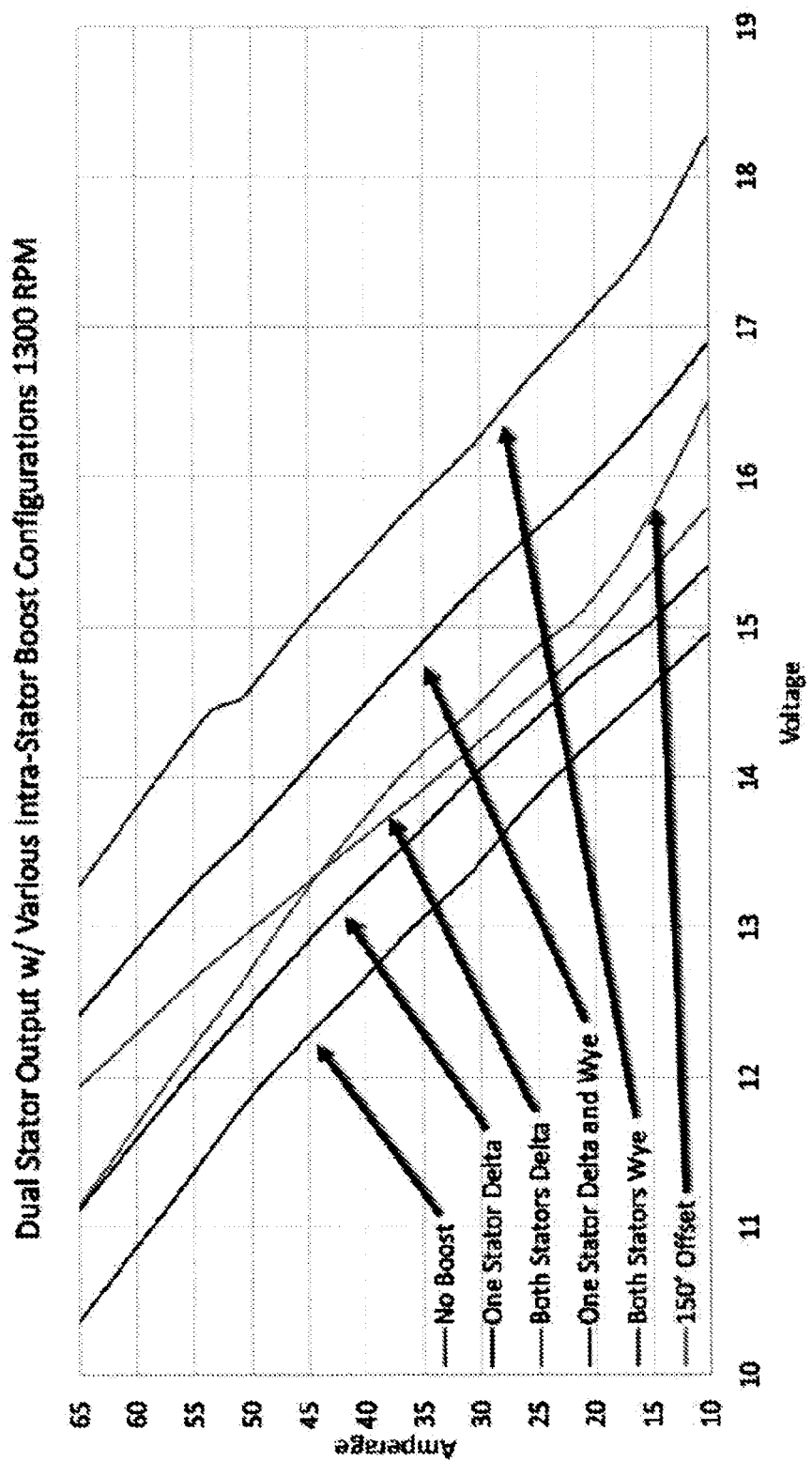
FIG. 21 shows a graph of test results.

The data from Example 7 is plotted in FIG. 21. As a point of comparison, data from Example 6 FIG. 18A No Boost and FIG. 18D 150° intra-stator boost is added to the plot.

Mixtures of intra-stator and inter-stator resonance capacitor configurations provide significant boost potential. In FIGS. 22A through 22D, some of the possible configurations are detailed. In these figures, the alternator comprises two stators. A first stator 2210 comprises inductors L2251, L2252, and L2253. A second stator 2230 comprises inductors L2254, L2255, and L2256. The first and second stators 2210 and 2230 are clocked 30° different from each other. The first stator 2210 has phase nets A000, A120, and A240. The second stator 2230 has phase nets A030, A150, and A270. The phase nets of each stator are connected to bridge-rectifier diodes. The phase nets of the first stator 2210 are connected to diodes D2251, D2252, D2253, D2254, D2255, and D2256. The phase nets of the second stator 2230 are connected to diodes D2257, D2258, D2259, D2260, D2261, and D2262. All the inductors L2251 through L2256, phase nets A000 through A270, and diodes D2251 through D2262 are internal to the alternator as an integral unit. The phases A000 through A270 were identified as described earlier. All the intra-stator resonant capacitors of FIGS. 22A through 22D were connected to the phases via the stove wires outside the alternator.

Figure 22A:
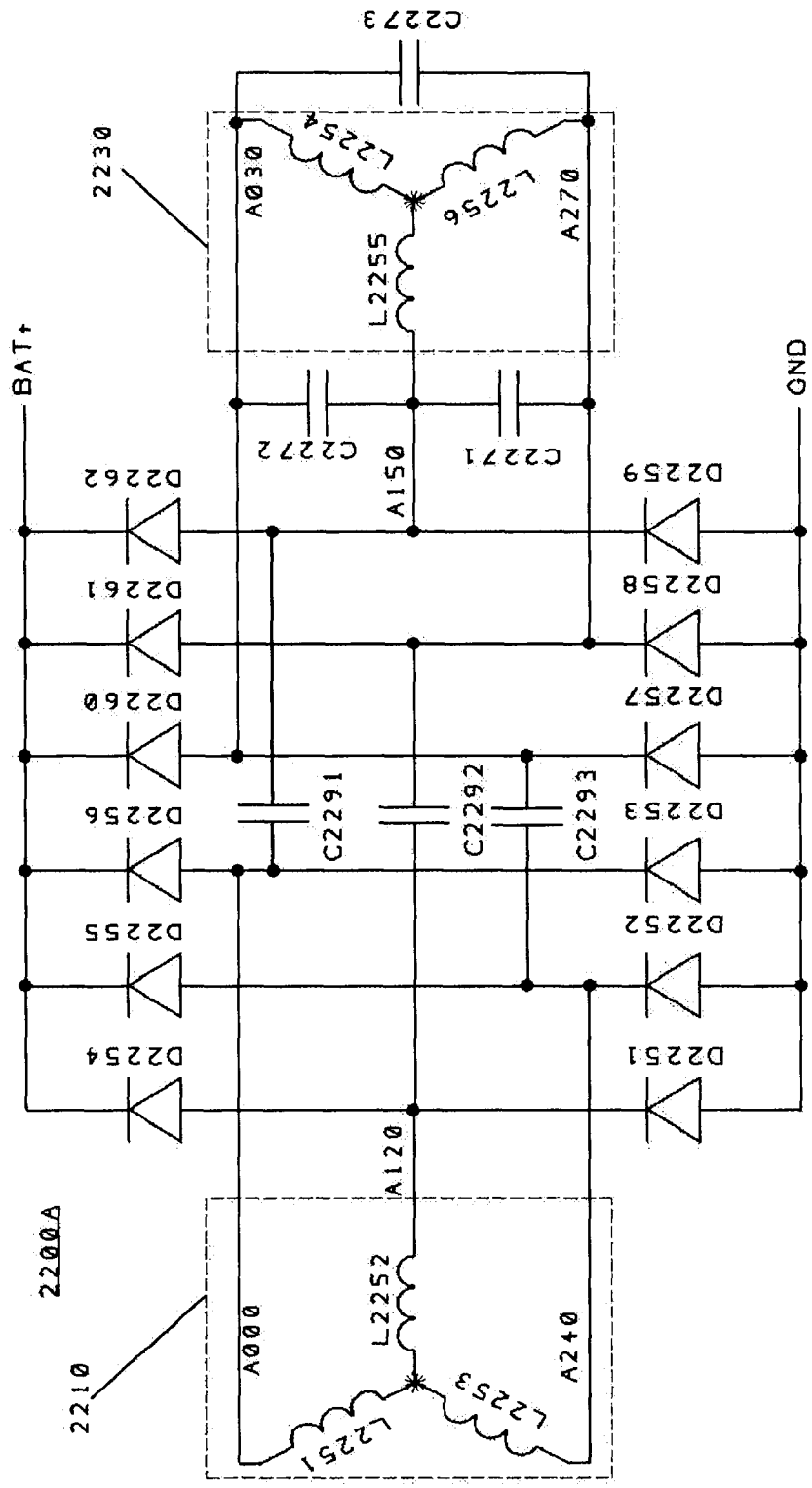
FIGS. 22A-22D show schematic circuit diagrams of dual-stator alternators with dual-bridge rectifiers, modified with intra-stator and/or inter-stator resonant boost components according to exemplary embodiments of the disclosure.

FIG. 22A shows alternator 2200A having three intra-stator resonant capacitors C2271, C2272, and C2273 connected in delta configuration among the phase nets A030, A150, and A270 of the second stator 2230. Three inter-stator resonant capacitors C2291, C2292, and C2293 were connected among the phases of the first and second stators, 2210 and 2230, such that the capacitors bridge the phases 150° offset. For example, inter-stator resonant capacitor C2271 was connected to the first stator phase net A000 and the second stator phase net A150.

Figure 22B:
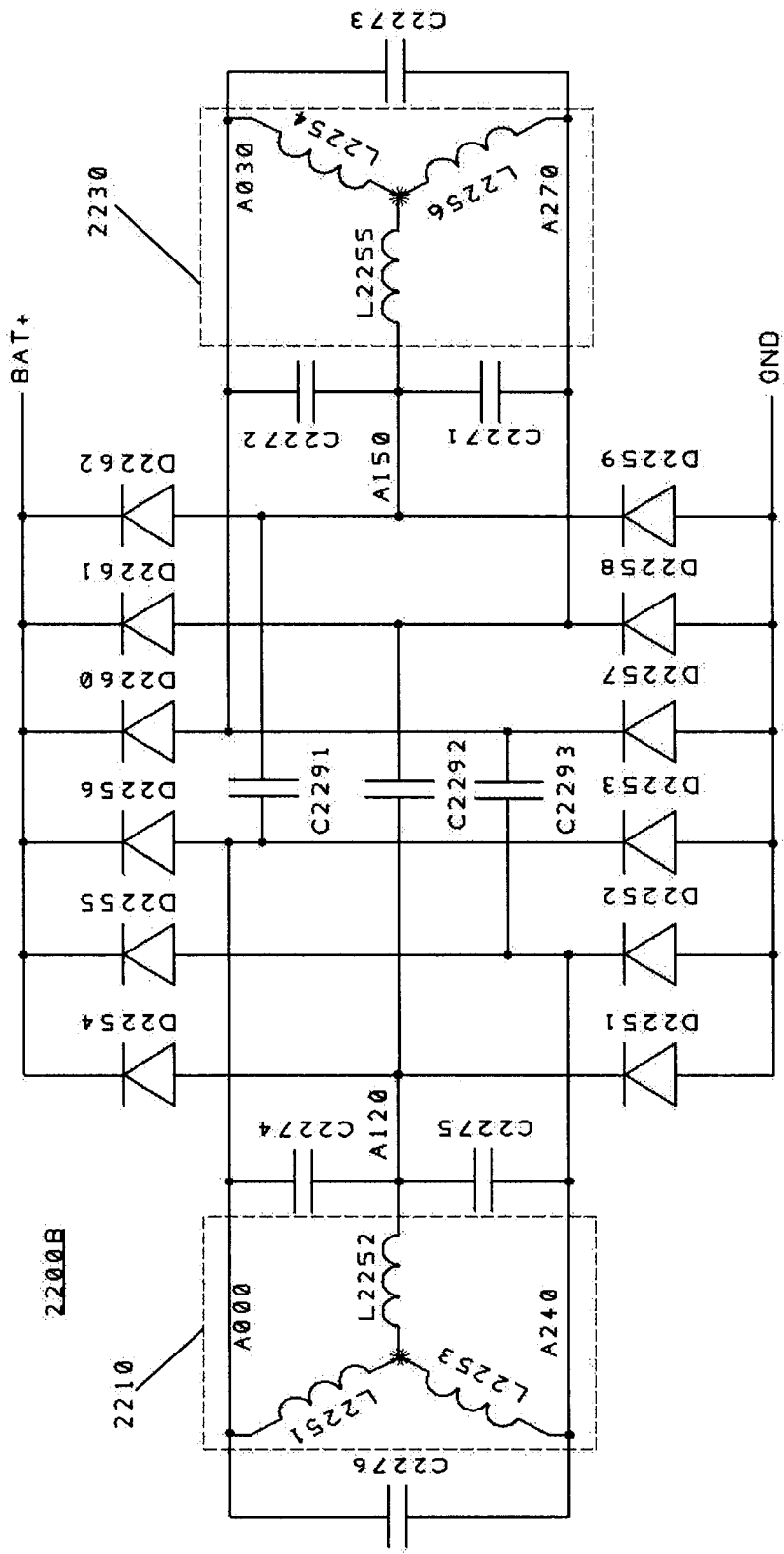

Alternator 2200B of FIG. 22B modified FIG. 22A by adding three more intra-stator resonant capacitors C2274, C2275, and C2276 in delta configuration to the first stator 2210.

Figure 22C:
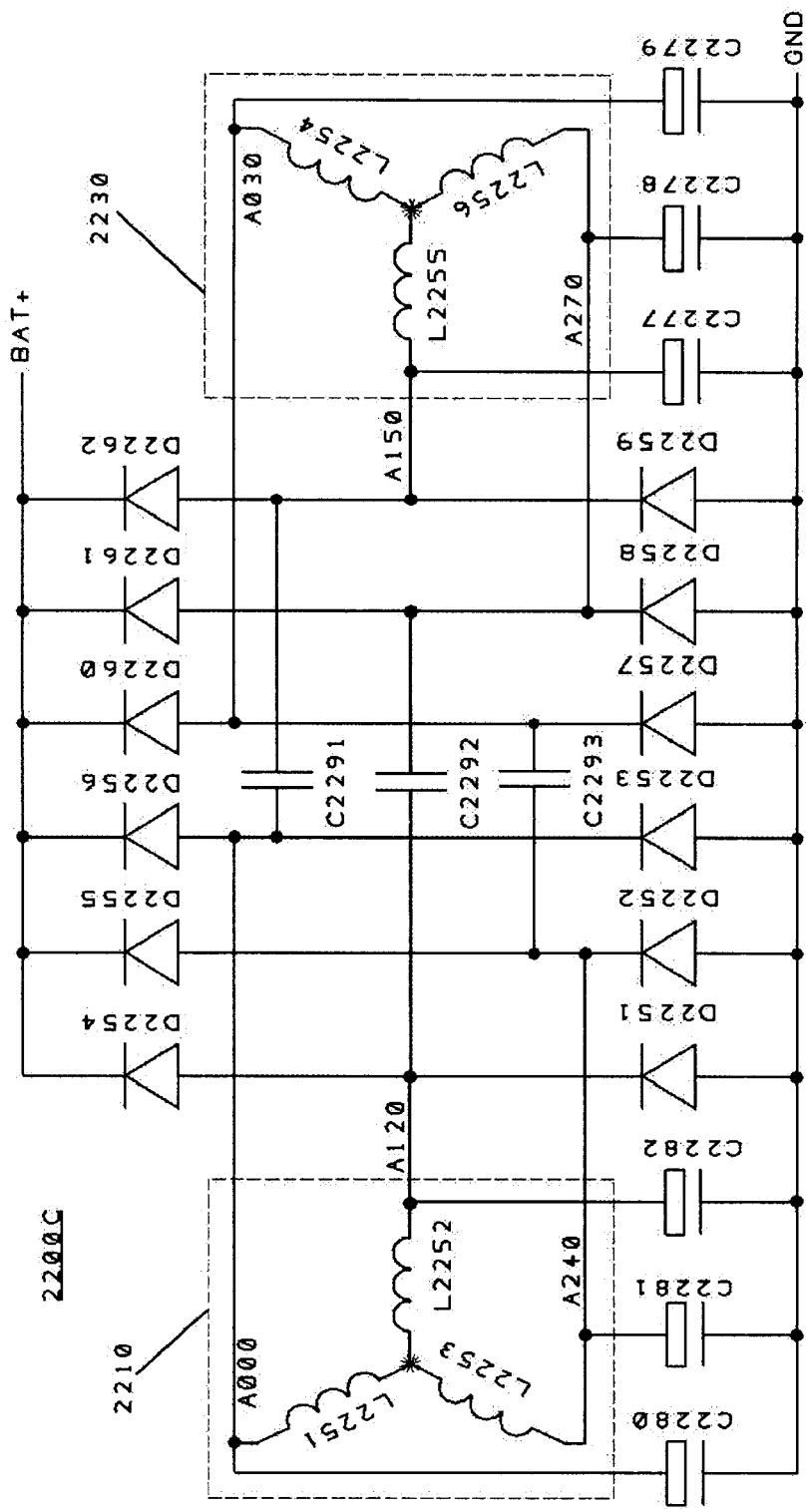

Rather than configuring the intra-stator resonance capacitors in delta configuration, alternator 2200C of FIG. 22C exhibits the intra-stator resonant capacitors C2277, C2278, C2279, C2280, C2281, and C2282 in wye configuration. As in FIGS. 22A and 22B, the inter-stator resonant capacitors C2291, C2292, and C2293 were connected 150° phase offset between the two stators 2210 and 2230.

Figure 22D:
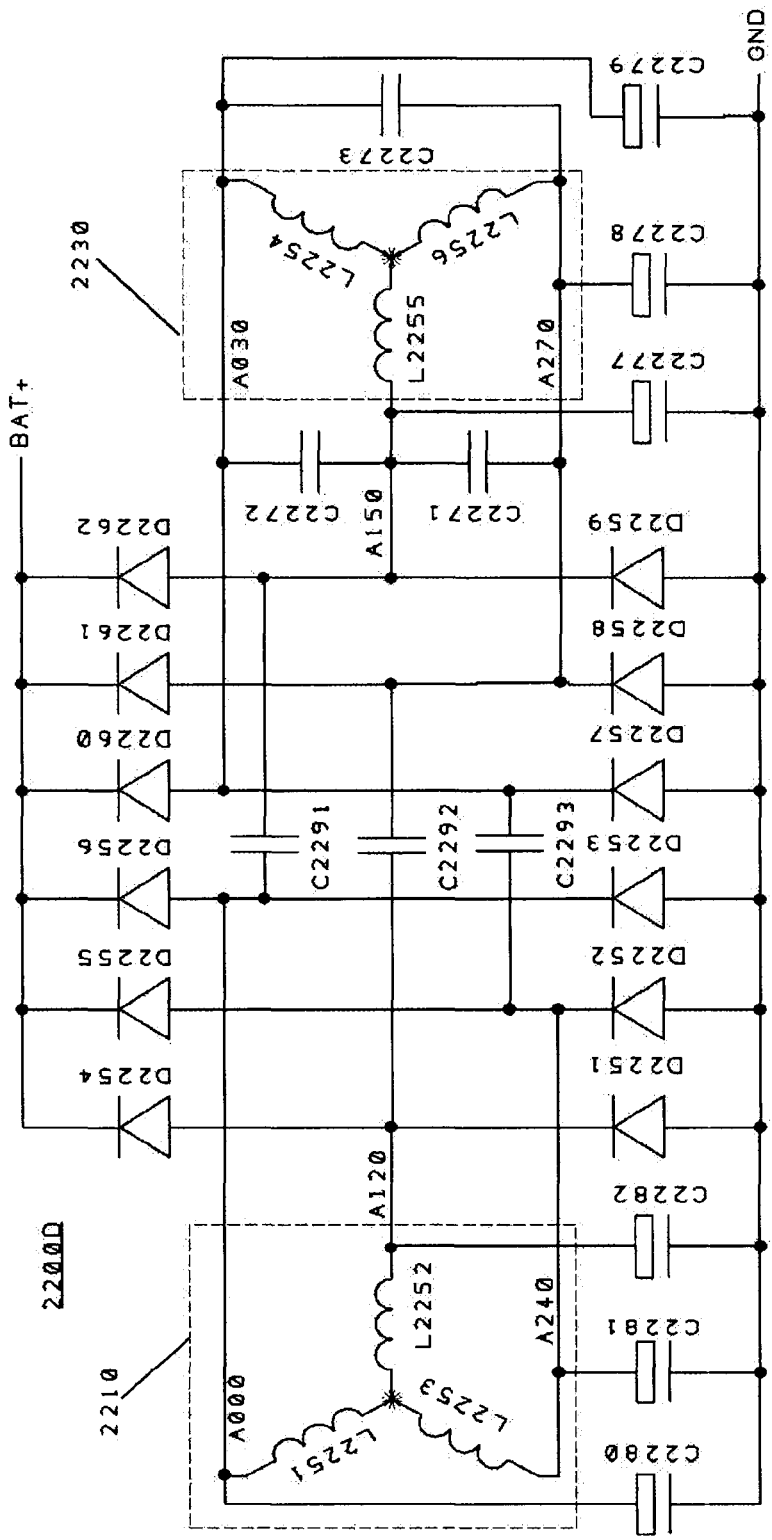

In alternator 2200D of FIG. 22D, three intra-stator resonance capacitors C2271, C2272, and C2273 are added in delta configuration to the second stator 2230.

In Example 8, the alternator 705 of FIG. 7 was the ProStart 13868 as described in Example 6 and Example 7. The alternator 705 was connected just as in Example 6 except for the phase connections to the resonance capacitors. As in Example 6, the delta-configured resonant capacitors C2271, C2272, C2273, C2274, C2275, and C2276 each consist of ten nominally 22 µG RDEC71H226MWK1H03B (op. cit. Example 2) capacitors wired in parallel to form nominally 220 µF in total. That is, for example, intra-stator capacitor C2271 had a nominal capacitance of 220 µF. The wye-configured intra-stator capacitors C2277, C2278, 02279, C2280, C2281, and C2282 each consist of five nominally 220 µF United Chemi-Con EKYB800ELL221MJ25S aluminum electrolytic capacitors wired in parallel to form nominally 1100 µF capacitance each. That is, for example, intra-stator resonant capacitor C2277 had a nominal capacitance of 1100 µF in total. As in Example 6, the alternator 705 rpm was kept at 1300 rpm for all tests. As in Example 6, there was no battery 760 connection, and the electronic load 750 was put in constant-current mode controlled by the same programmable power supply to provide multiple steps of constant-current load for 6-minute periods. The extra electronic load 750A was also wired in parallel. As in Example 6, the voltage and amperage output from the alternator 705 was collected by the Fluke current clamp and 10:1 probe on net R. The data from each test were collected by the Fluke scope and then transferred to a spreadsheet where an average current and average voltage were calculated for each current load step. Table 8 shows the alternator boost performance for configurations as shown in FIGS. 22A through 22D. At higher levels of boost and load for configurations shown in FIGS. 22C and 22D, the output from the alternators 2200A-2200D exceeded the load capacity of the paralleled electronic loads 750 and 750A.

TABLE 8

| FIG. 22A V Volts | One Stator Delta, 150° Offset Amps | FIG. 22B V Volts | Both Stators Delta, 150° Offset Amps | FIG. 22C V Volts | Both Stators Wye, 150° Offset Amps | FIG. 22D V Volts | Both Stators Wye, One Delta, 150° Offset Amps |
|---|---|---|---|---|---|---|---|
| 17.0 | 10.2 | 17.0 | 10.2 | 19.3 | 10.2 | 19.81 | 10.14 |
| 16.2 | 15.5 | 16.3 | 15.4 | 18.6 | 15.5 | 19.09 | 15.37 |
| 15.8 | 20.6 | 15.8 | 20.6 | 18.0 | 20.6 | 18.45 | 20.56 |
| 15.5 | 25.8 | 15.5 | 25.8 | 17.4 | 25.8 | 17.91 | 25.79 |
| 15.1 | 30.8 | 15.1 | 30.8 | 16.9 | 30.9 | 17.41 | 30.80 |
| 14.5 | 36.0 | 14.7 | 36.0 | 16.5 | 36.0 | 16.91 | 35.93 |
| 14.0 | 41.0 | 14.4 | 41.0 | 16.0 | 41.1 | 16.47 | 40.99 |
| 13.5 | 46.0 | 14.0 | 46.0 | 15.6 | 46.0 | 16.13 | 44.00 |
| 12.9 | 50.8 | 13.7 | 50.8 | 14.8 | 56.0 | | |
| 12.5 | 55.9 | 13.3 | 55.8 | 14.3 | 60.6 | | |
| 11.6 | 65.3 | 12.6 | 65.3 | | | | |

Figure 23:
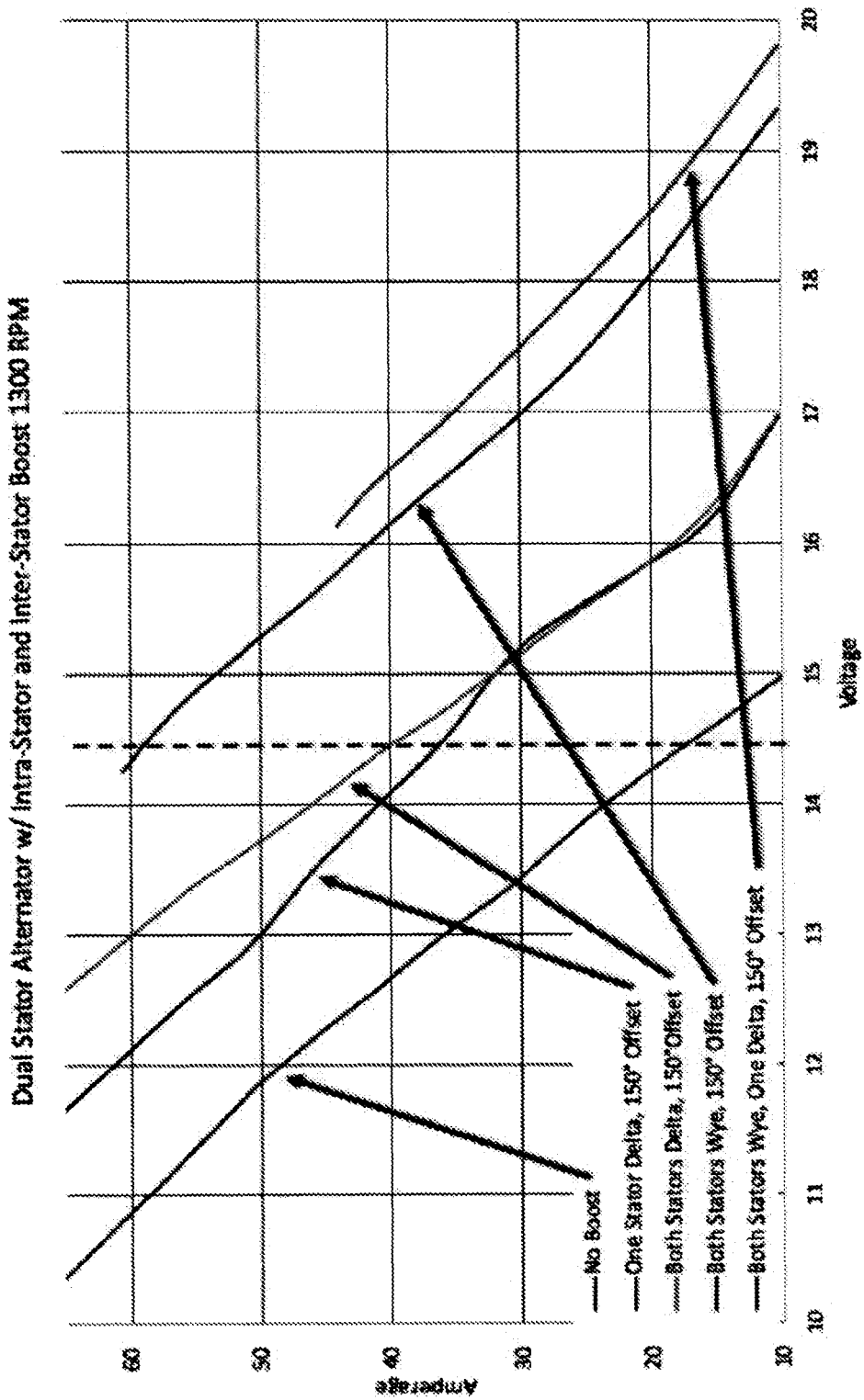
FIG. 23 shows a graph of test results.

FIG. 23 exhibits the results of testing the alternators 2200A-2200D with the intra-stator and inter-stator resonant boost configurations of FIGS. 22A through 22D. These are compared with the normal (No Boost) alternator of FIG. 18A. If the alternator output at ~1.4.4V is compared between the No Boost and the configuration of FIG. 22C (Both Stators Wye, 150° Offset), it can be calculated that there is a 350% increase in amperage output at 1300 rpm.

During each of the tests described in Examples 6, 7, and 8, the temperatures of an alternator stator, rectifier, and selected capacitors were measured using the Omega HH309A four channel data logger. During the test of the normal (No Boost) FIG. 18A alternator 2200A configuration, the maximum stator temperature was 96.3° C. Surprisingly, the highest stator temperature measured for the boosted alternator testing was 107.2° C. Although the temperatures measured were not equilibrium temperatures, the highest temperatures were always at the end of the 66-minute test. This low increase in stator temperature even when boosted is important at the low 1300 rpm, because the cooling fan on the alternator 705 provides the least cooling at low rpm.

Alternatively, fewer inter-stator capacitors than the number of phases could be utilized. For example, in FIG. 22D, capacitor C2293 could be deleted.

Alternatively, additional inter-stator capacitors could be added to connect the stators in different phase-offset ways. For example, in FIG. 22D, all the capacitors C2291, C2292, and C2293 are connected between the stators with a phase offset of 150°. The additional inter-stator capacitors could connect between the stators with a phase offset of 90° or 30°.

Figure 24:
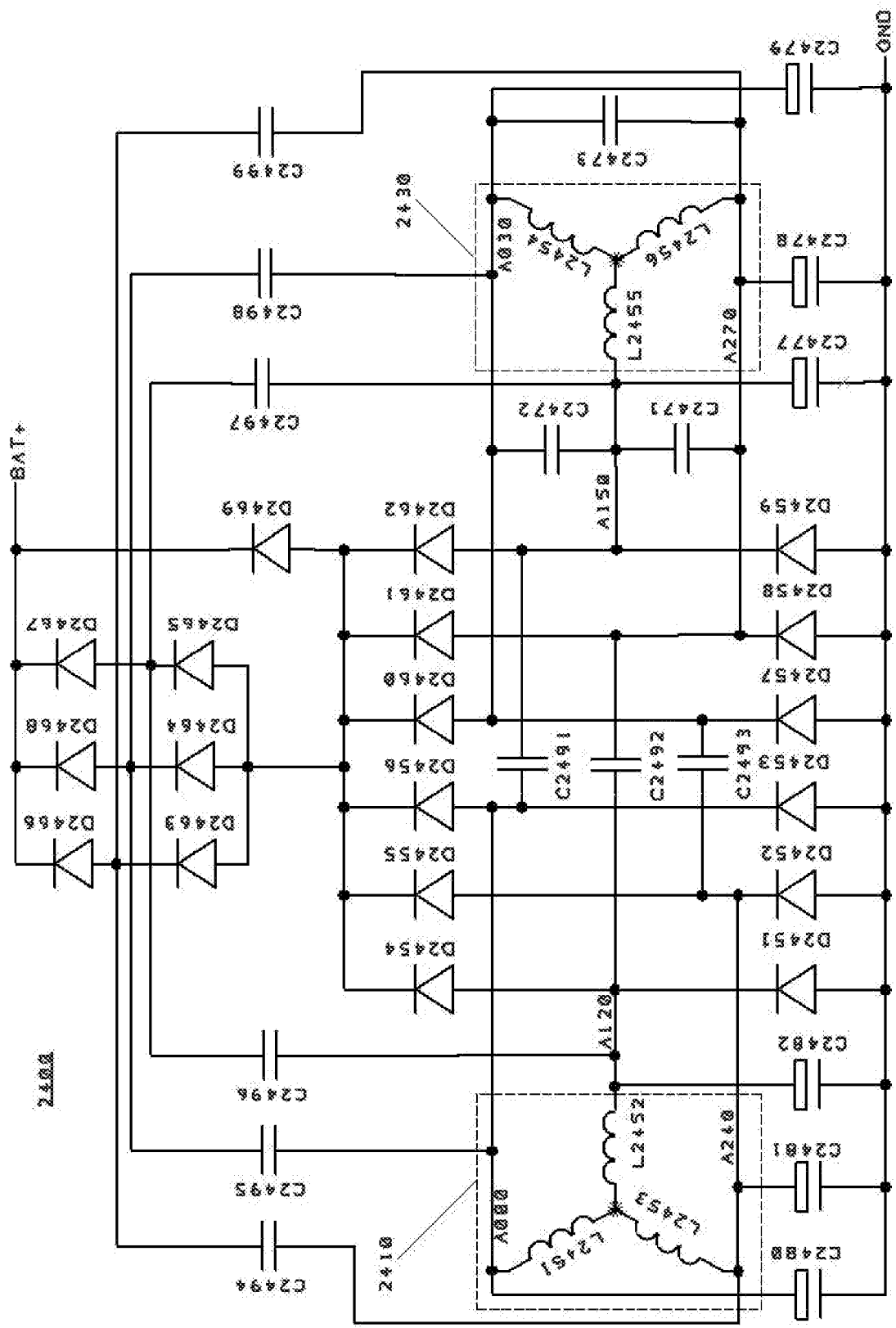
FIG. 24 shows a schematic circuit diagram of a dual-stator alternator with a dual-bridge rectifier modified with voltage-boosting components, inter-stator resonant boost components, and intra-stator resonant boost components according to an exemplary embodiment of the disclosure.

Other boost configurations are possible with dual-stator alternators. For example, a voltage-boosting circuit could be added to the configuration shown in FIG. 22D. Such an approach is exhibited in alternator 2400 of FIG. 24. The stator inductors L2451 through L2456 are part of the Pro-Start 13868 alternator 2400. The rectifier diodes D2451 through D2462 are part of the alternator 2400. Intra-stator resonance delta-configured capacitors C2471 through C2473 are the same as in Example 7. The inter-stator resonance capacitors C2491 through C2493 are the same as in Example 6. The intra-stator wye-configured resonance capacitors C2479 through C2482 are the same as in Example 7. In FIG. 24, added to the circuitry of FIG. 22D are the voltage-boosting components. Intra-stator voltage-boosting capacitors C2494, C2495, C2496, C2497, C2498, and C2499 each consist of ten nominally 22 μRDEC71H226MWK1H03B capacitors (op. cit. Example 2) wired in parallel. Voltage-boosting bridge-rectifier diodes D2463, D2464, D2465, D2466, D2467, and D2468 are embodied in a Micro Commercial Components MD200S08M5 bridge rectifier available from Micro Commercial Components of Simi Valley, Calif. Voltage-boosting bypass rectifier diode D2469 is a Vishay VS-249NQ150PbF diode.

Example 9

The alternator 2400 of FIG. 24 with the intra-stator resonant capacitors, the inter-stator resonant capacitors, and the voltage-boosting circuitry is mounted in the drill press 720 and rotated at 1300 rpm. The alternator 705 is connected to the battery 760 via power net R, through circuit breaker 755, and power net BAT+. The alternator 705 is also connected to battery 760 ground through GND. The rotor 710 field coil is powered by power supply 715, providing 6 amps current, via power nets Field+ and Field−. The alternator 705 configured as in FIG. 24 exhibits boosted power output.

Alternative embodiments for FIG. 24 would include a decoupling circuit for the boost capacitors and/or an active FET bypass to replace bypass rectifier D2469.

Alternatively, fewer intra-stator voltage-boosting capacitors than the number of phases could be utilized. For example, in FIG. 24, intra-stator voltage-boosting capacitor C2499 could be deleted.

Alternator stators comprise inductors that are usually connected in wye or delta configuration. Some alternators, with two stators, employ one stator connected in a wye configuration and the other stator connected in a delta configuration. The previous examples of this disclosure depict wye-configured stators; however, delta-configured stators can be boosted by resonant capacitors in much the same manner. Typically, wye-stator alternators have higher voltage and lower current. The higher voltage allows the alternator to be run at a lower rpm in order to reach the acceptance voltage of a battery. Delta-stator alternators would need to be run at higher rpm for the voltage output to reach the acceptance voltage of a battery. But once a higher rpm is reached, the delta-stator alternator often provides higher current than would a wye-stator alternator. Since the boost from resonant capacitors increases the voltage of the output, the resonant capacitors would allow delta-configured stator alternators to reach the battery acceptance-voltage at lower rpm.

EEGs. 25A through 25D are schematic diagrams of alternators 2500A-2500D that embody a delta-configured stator 2510 and a bridge rectifier 2520. The stator 2510 comprises inductors L2501, L2502, and L2503. The bridge rectifier 2520 comprises diodes D2501, D2502, D2503, D2504, D2505, and D2506. Phase nets A000, A120, and A240 connect the nodes of the stator 2510 to the bridge rectifier 2520. Power nets BAT+ and GND indicate that the alternator 2500A terminals eventually connect to battery 760 terminals.

Figure 25A:
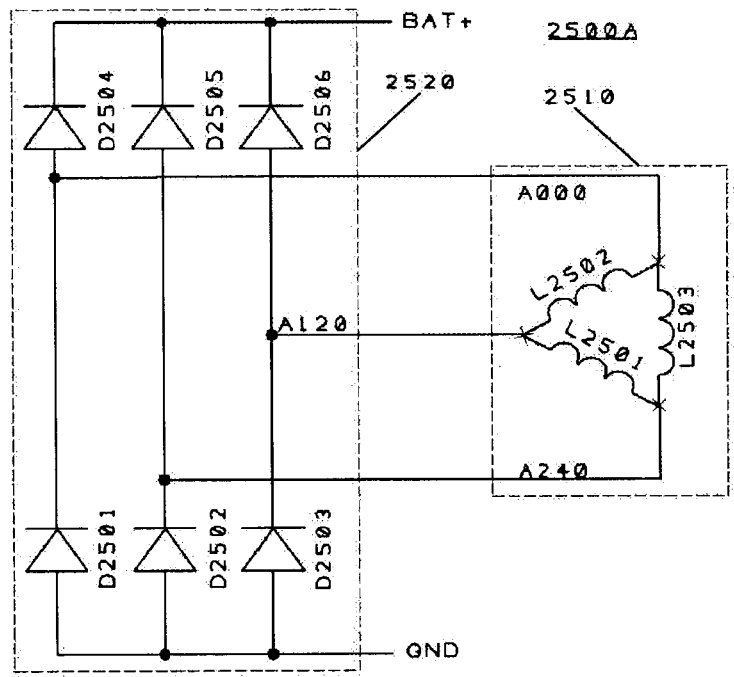
FIG. 25A shows a schematic circuit diagram of a prior-art delta-stator configured alternator.
Figure 25B:
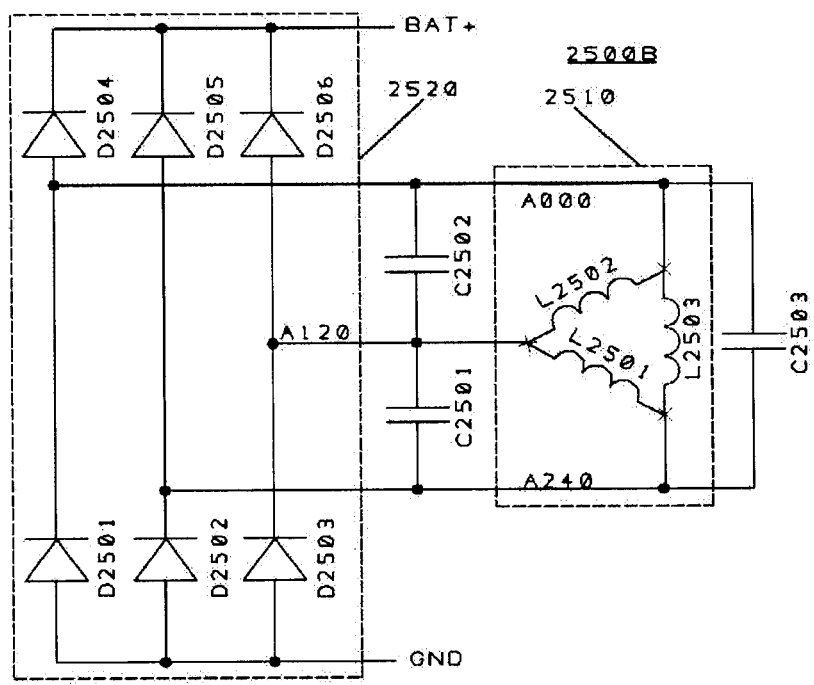
FIGS. 25B-25D show schematic diagrams of various embodiments of delta-stator configured alternators with intra-stator resonant capacitors and/or intra-stator voltage-boosting circuits.

Alternator 2500B of FIG. 25B modifies FIG. 25A by further comprising intra-stator resonant capacitors C2501, C2502, and C2503 in a delta configuration, connected among the phases A000, A120, and A240.

Figure 25C:
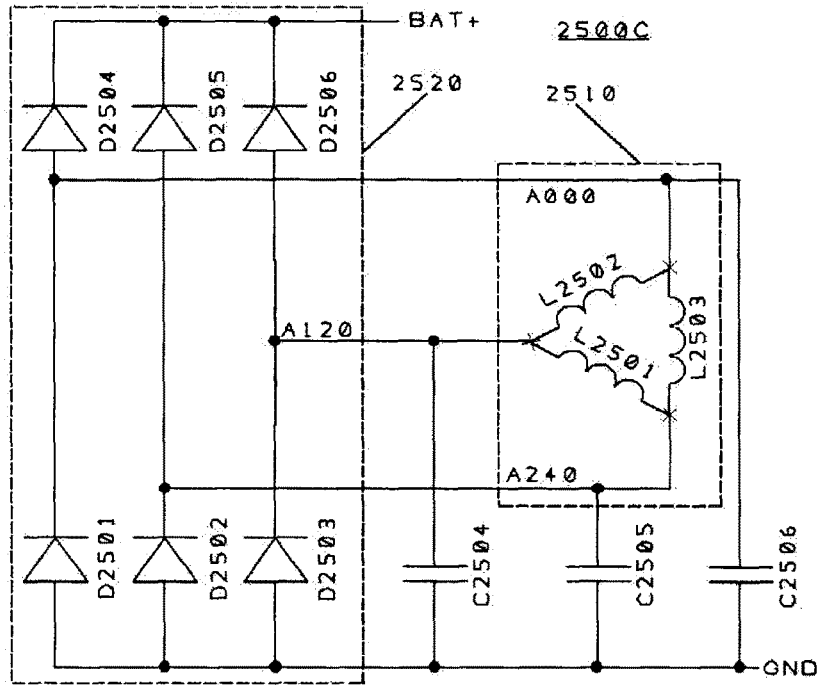

Alternator 2500C of FIG. 25C modifies FIG. 25A by further comprising intra-stator resonant capacitors C2504, C2505, and C2506 in a wye configuration, respectively connected between each phase A120, A240, and A000 and GND.

Figure 25D:
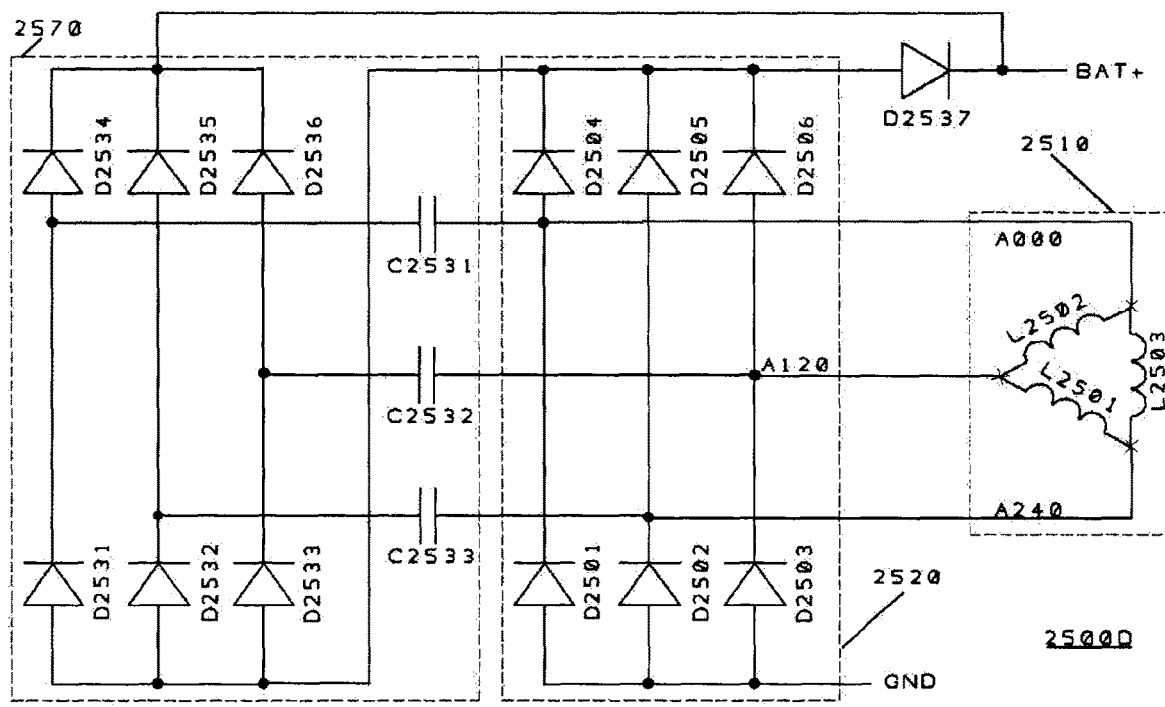

Alternator 2500D of FIG. 25D modifies FIG. 25A by further comprising a voltage-boosting resonant circuit 2570 and rectifier diode D2537. The voltage-boosting resonant circuit 2570 comprises capacitors C2531, C2532, and C2533 and bridge rectifier diodes D2531, D2532, D2533, D2534, D2535, and D2536.

Example 10

In Example 10, a Delco 10si (op. cit. Example 1) alternator is disassembled. The diode trio and the regulator are removed. The stator 2510 inductors L2501, L2502, and L2503 are rewired to a delta-connected configuration, as shown in FIG. 25A. Stove wires (op. cit. Example 1) are crimped and soldered to each of the phases A000, A120, and A240. These wires are brought outside the alternator casing.

The modified 10si alternator 705 is mounted to the drill press 720 as shown in FIG. 7. The field wires Field+ and Field− of the rotor 710 are connected to power supply 715 which is adjusted to output a fixed 4 amps through the rotor 710 coil of the alternator 705. Power supply 765 is configured to provide a maximum voltage of 13.9V. The BAT+ terminal of the alternator 705 is connected as net R to the circuit breaker 755. The electronic load 750 is set for absorbing the current while holding the battery 760 voltage to a maximum of 14V. The current produced by the alternator 705 is measured using a Fluke 80i-110S current clamp (op. cit. Example 1) and collected using the Fluke 190-204 4-channel scope (op. cit. Example 1). Voltage measurements are made using a 10:1 probe on net R. The alternator 705 is set to run at 1600 rpm and then slowly accelerated to 2400 rpm. Two runs are made. In the first run, the alternator 2500A is configured as in FIG. 25A. That is, the stove wires are left disconnected. In the second run, the alternator 2500B stove wire phase A000, A120, and A240 connections are connected to intra-stator resonant capacitors C2501, C2502, and C2503 configured as shown in FIG. 25B. Ten nominally 22 uF ceramic capacitors (op. cit. Example 1), wired in parallel to form a nominally 220 uF capacitor, are used for each intra-stator resonant capacitor C2501, C2502, and C2503.

Figure 26:
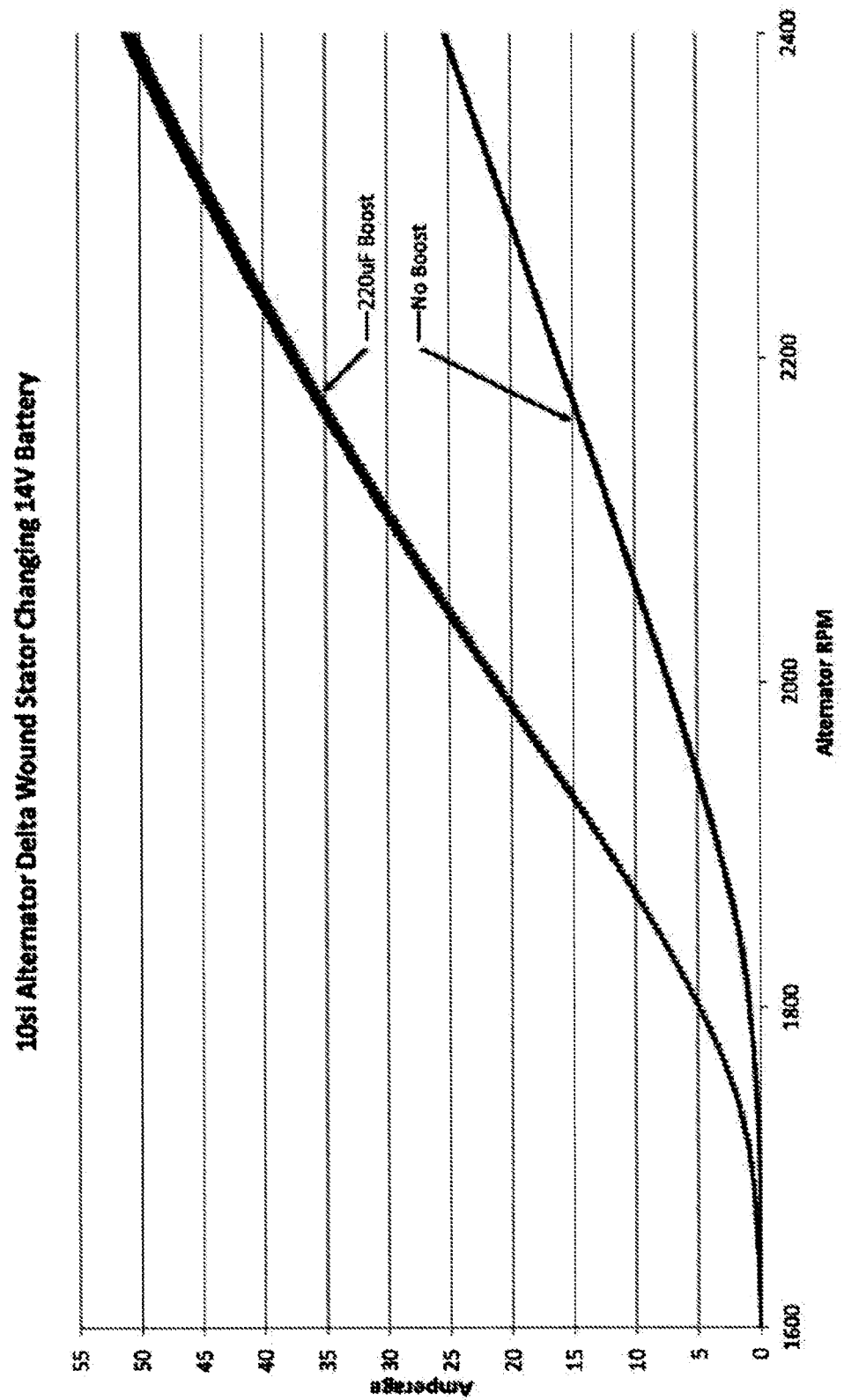
FIG. 26 shows a graph of test results.

FIG. 26 shows the results of the testing in Example 10. The intra-stator resonance boost allows the delta stator 2510 alternator to transfer current to the battery 760 at lower rpm and boosts the alternator output from 1600 rpm to 2400 rpm.

This disclosure contains figures showing a number of specific embodiments. However, there are other embodiments of the disclosure that are not shown in the figures. In general, certain embodiments of the disclosure are alternators having some combination of the following features:

a rotor;
a first stator wherein (i) the rotor is configured to rotate relative to the first stator and (ii) the first stator comprises one or more first inductors, each first inductor configured to generate phased AC power when the rotor rotates relative to the first stator;
a first bridge rectifier connected between (i) the one or more first inductors and (ii) two output terminals of the alternator and configured to convert the phased AC power into a DC output current at the two output terminals;
one or more first capacitors connected to one or more of the first inductors, wherein the one or more first capacitors and the one or more corresponding first inductors are configured to electro-magnetically resonate when the rotor rotates relative to the first stator to increase peak amplitudes of the phased AC power and thereby increase the level of the DC output current;
the first inductors are connected in either a wye or delta configuration;
the first capacitors are connected in either a wye or delta configuration;
a second stator wherein (i) the rotor is configured to rotate relative to the first and second stators and (ii) the second stator comprises one or more second inductors, each second inductor configured to generate phased AC power when the rotor rotates relative to the first and second stators;
a second bridge rectifier connected between (i) the one or more first or second inductors and (ii) the two output terminals of the alternator and configured to convert the phased AC power into the DC output current at the two output terminals;
one or more sets of one or more additional capacitors, each set connected in a wye configuration, in a delta configuration, or between a first inductor and a second inductor;
a regulator circuit;
a spark-suppression circuit;
a decoupling circuit configured to selectively couple and decouple the first capacitors from the first inductors;
a voltage-boosting circuit; and
a decoupling circuit configured to selectively couple and decouple the voltage-boosting circuit from the alternator.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding terminals, nodes, ports, or paths may be referred to by the same name and are interchangeable for purposes here.

Transistors are typically shown as single devices for illustrative purposes. However, it is understood by those with skill in the art that transistors will have various sizes (e.g., gate width and length) and characteristics (e.g., threshold voltage, gain, etc.) and may consist of multiple transistors coupled in parallel to get desired electrical characteristics from the combination. Further, the illustrated transistors may be composite transistors.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention/disclosure may be made by those skilled in the art without departing from embodiments of the invention/disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention/disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

The invention claimed is:

1. A power generator comprising:
    a rotor comprising a rotor inductor, the rotor inductor having a first side and a second side;
    a first stator, wherein:
        the rotor is configured to move relative to the first stator; and
        the first stator comprises one or more first-stator inductors configured to induce first stator phase voltages, each first-stator inductor configured to generate phased AC power when the rotor moves relative to the first stator;
    a first bridge rectifier connected between (i) the one or more first-stator inductors and (ii) two output terminals of the power generator and configured to convert the phased AC power into a DC output power at the two output terminals; and
    at least one of (i) an internally connected spark-suppression circuit connected to the rotor inductor to inhibit inductive spikes from damaging at least one stator-connected capacitor in the power generator by grounding the rotor inductor and (ii) a second bridge rectifier connected as a voltage-boosting circuit.

2. The power generator of claim 1, wherein the power generator further comprises:
    the internally connected spark-suppression circuit connected to at least one of (i) the rotor inductor and (ii) the first-stator inductors and configured to suppress at least one of (i) inductive spikes from damaging one or more electronic components internal to the power generator as well as one or more electronic components external to the power generator and (ii) inductive spikes during re-excitation of the first-stator field.

3. The power generator of claim 2, wherein the at least one stator-connected capacitor comprises one or more first capacitors connected to one or more of the first-stator inductors, wherein:
    the one or more first capacitors and the one or more corresponding first-stator inductors are configured to electro-magnetically resonate, when the rotor moves relative to the first stator, to increase peak amplitudes of the phased AC power and thereby increase the level of the DC output power.

4. The power generator of claim 3, wherein the power generator further comprises a decoupling circuit configured to selectively couple and decouple the first capacitors from the first-stator inductors, wherein the decoupling circuit is a voltage-sense circuit, a temperature sense circuit, or an rpm sense circuit.

5. The power generator of claim 3, wherein the internally connected spark-suppression circuit is configured to inhibit inductive spikes from damaging the first capacitors.

6. The power generator of claim 3, wherein:
    the power generator further comprises the second bridge rectifier having an output connected to a first output terminal of the power generator;
    the first bridge rectifier has an output connected to (i) the first output terminal via a rectifier and connected to (ii) an input of the second bridge rectifier; and
    each first capacitor is connected between a first node interconnecting a pair of diodes of the first bridge rectifier and a second node interconnecting a pair of diodes of the second bridge rectifier.

7. The power generator of claim 6, wherein the power generator further comprises a decoupling circuit configured to selectively couple and decouple the input of the second bridge rectifier from the output of the first bridge rectifier.

8. The power generator of claim 7, wherein the decoupling circuit decouples the second rectifier and capacitors using a temperature sense circuit.

9. The power generator of claim 7, wherein the decoupling circuit decouples the second rectifier and capacitors using a voltage-sense circuit.

10. The power generator of claim 5, wherein:
    the at least one stator-connected capacitor comprises one or more first capacitors connected to one or more of the first-stator inductors, wherein the one or more first capacitors and the one or more corresponding first-stator inductors are configured to electro-magnetically resonate when the rotor moves relative to the first stator to increase peak amplitudes of the phased AC power and thereby increase the level of the DC output power; and
    the power generator further comprises:
    a second stator wherein:
        the rotor is configured to move relative to the second stator; and the second stator comprises a plurality of second-stator inductors configured to induce second stator phase voltages, each second-stator inductor configured to generate phased AC power when the rotor moves relative to the first and second stators; and the second bridge rectifier connected between (i) the second-stator inductors and (ii) the two output terminals of the power generator and configured to convert the phased AC power into DC output power at the two output terminals.

11. The power generator of claim 10, wherein the first stator phase voltages differ from the second stator phase voltages.

12. The power generator of claim 11, wherein:
a first-stator inductor of the first stator is connected to a first node interconnecting a pair of diodes in the first bridge rectifier;
a second-stator inductor of the second stator is connected to a second node interconnecting a pair of diodes in the second bridge rectifier; and
a first capacitor is connected between a first-stator inductor at a corresponding first node and a second-stator inductor at a corresponding second node.

13. The power generator of claim 10, wherein the power generator further comprises:
one or more second capacitors each second capacitor connected to at least one of (i) one or more of the first-stator inductors and (ii) one or more of the second-stator inductors, wherein the one or more second capacitors and the one or more corresponding first and second-stator inductors are configured to electro-magnetically resonate when the rotor moves relative to the first and second stators to increase peak amplitudes of the phased AC power and thereby increase the level of the DC output power.

14. The power generator of claim 13, wherein the power generator further comprises one or more third capacitors connected to one or more of the second-stator inductors wherein the one or more third capacitors and the one or more corresponding second-stator inductors are configured to electro-magnetically resonate when the rotor moves relative to the first and second stators to increase peak amplitudes of the phased AC power and thereby increase the level of the DC output power.

15. The power generator of claim 14, wherein the power generator further comprises one or more fourth capacitors connected to one or more of the first-stator inductors, wherein the one or more fourth capacitors and the one or more corresponding first-stator inductors are configured to electro-magnetically resonate when the rotor moves relative to the first and second stators to increase peak amplitudes of the phased AC power and thereby increase the level of the DC output power.

16. The power generator of claim 10, wherein the power generator further comprises the internally connected spark-suppression circuit connected to the second side of the rotor inductor and configured to inhibit inductive spikes from damaging one or more electronic components internal to the power generator as well as one or more electronic components external to the power generator.

17. The power generator of claim 10, wherein the power generator further comprises a decoupling circuit configured to selectively couple and decouple the first capacitors from the first-stator inductors, wherein the decoupling circuit is a voltage-sense circuit, a temperature sense circuit, or an rpm sense circuit.

18. The power generator of claim 2, wherein the internally connected spark-suppression circuit is configured to keep the inductive spikes at a voltage less than 100V.

19. The power generator of claim 2, wherein the internally connected spark-suppression circuit is configured to keep the inductive spikes at a voltage less than 25V.

20. The power generator of claim 1, wherein:
the at least one stator-connected capacitor comprises one or more first capacitors connected to one or more of the first-stator inductors, wherein the one or more first capacitors and the one or more corresponding first-stator inductors are configured to electro-magnetically resonate when the rotor moves relative to the first stator to increase peak amplitudes of the phased AC power and thereby increase the level of the DC output power; and
the power generator further comprises the second bridge rectifier having an output connected to a first output terminal of the power generator;
the first bridge rectifier has a first output connected to (a) the first output terminal via a rectifier and to (b) an input of the second bridge rectifier, and the first bridge rectifier has a second output connected to the output terminal of the power generator; and
each first capacitor is connected between a first node interconnecting a pair of diodes of the first bridge rectifier and a second node interconnecting a pair of diodes of the second bridge rectifier.

21. The power generator of claim 20, wherein the power generator further comprises the internally connected spark-suppression circuit (a) connected to at least one of (i) the rotor inductor and (ii) the first-stator inductors and (b) configured to suppress at least one of (i) inductive spikes from damaging one or more electronic components internal to the power generator as well as one or more electronic components external to the power generator and (ii) inductive spikes during re-excitation of the first-stator field.

22. The power generator of claim 21, wherein the DC output power is connected to an energy collection system.

23. The power generator of claim 1, wherein the power generator is configured for an energy collection system and the DC output power is connectable to the energy collection system.

* * * * *